United States Patent [19]
Boreland

[11] Patent Number: 4,926,355
[45] Date of Patent: May 15, 1990

[54] DIGITAL SIGNAL PROCESSOR ARCHITECTURE WITH AN ALU AND A SERIAL PROCESSING SECTION OPERATING IN PARALLEL

[75] Inventor: Charles P. Boreland, Waterbury, Conn.

[73] Assignee: General DataComm, Inc., Middlebury, Conn.

[21] Appl. No.: 69,433

[22] Filed: Jul. 2, 1987

[51] Int. Cl.$^5$ .................... G06F 15/31; G06F 15/16
[52] U.S. Cl. .................... 364/200; 364/240.1; 364/221.4; 364/228; 364/232; 364/232.93; 364/244.6; 364/258; 364/263; 364/736
[58] Field of Search ... 364/200 MS File, 900 MS File, 364/736; 381/31, 32

[56] References Cited
U.S. PATENT DOCUMENTS

| | | | |
|---|---|---|---|
| 3,694,642 | 9/1972 | Grannis | 364/769 |
| 3,768,077 | 10/1973 | Nier et al. | 364/900 |
| 3,840,861 | 10/1974 | Amdahl et al. | 364/200 |
| 3,930,232 | 12/1975 | Wallach et al. | 235/310 |
| 4,041,461 | 8/1977 | Kratz et al. | 364/200 |
| 4,079,447 | 3/1978 | Garziera | 364/200 |
| 4,156,927 | 5/1979 | McElroy et al. | 364/736 |
| 4,209,836 | 6/1980 | Wiggins et al. | 364/718 |
| 4,258,429 | 3/1981 | Raymond, Jr. | 364/736 |
| 4,272,808 | 6/1981 | Hartwig | 364/718 |
| 4,365,312 | 12/1982 | Nakano et al. | 364/900 |
| 4,367,524 | 1/1983 | Budde et al. | 364/200 |
| 4,393,468 | 7/1983 | New | 364/736 |
| 4,450,525 | 5/1984 | Demuth et al. | 364/200 |
| 4,467,444 | 8/1984 | Harmon, Jr. et al. | 364/736 |
| 4,520,347 | 5/1985 | Campbell, Jr. | 340/347 DD |
| 4,542,476 | 9/1985 | Nagafuji | 364/749 |
| 4,551,841 | 11/1985 | Fujita et al. | 364/900 X |
| 4,574,348 | 3/1986 | Scallon | 364/200 |
| 4,608,660 | 8/1986 | Hascke | 364/736.5 |
| 4,615,004 | 9/1986 | Chevillat et al. | 364/200 |
| 4,622,680 | 11/1986 | Zinser | 381/29 |
| 4,639,886 | 11/1987 | Hashimoto et al. | 364/736 |
| 4,649,508 | 3/1987 | Kanuma | 364/748 |
| 4,700,319 | 10/1987 | Steiner | 364/736 |
| 4,785,393 | 11/1988 | Chu et al. | 364/736 |

FOREIGN PATENT DOCUMENTS 0171190 2/1986 European Pat. Off. ............ 364/736

OTHER PUBLICATIONS

"PCB 5010 and PCB 5011 Programmable DSPs", Signetic, Feb. 1986, pp. 1-15.
"TMS 32010 User's Guide", Digital Signal Processor Products, 1983, pp. 2-1 to 2-11.
J. Posa, "Microcomputer Fills Many Phone Roles", Electronics, Nov. 8, 1979, p. 42.
Hallmark, *The Master IC Cookbook*, pp. 372-375, 1980, TAB Books, U.S.A.
Larsen et al., *the Bugbook II*, pp. 10-25-10-28, 1974, E&R Instruments, Inc., 61 1st, St. Derby, CN 06418.

*Primary Examiner*—Raulfe B. Zache
*Assistant Examiner*—Florin Munteanur
*Attorney, Agent, or Firm*—David P. Gordon

[57] ABSTRACT

A digital signal processor (DSP) for conducting arithmetically complex functions, is provided. The DSP is preferably embodied as a single integrated circuit chip and generally includes a microinstruction sequencer (MIS) section, an arithmetic logic unit (ALU), a serial arithmetic processor section, a RAM section, and a system data bus. The MIS includes a coded ROM, a circuit for addressing the ROM, a ROM decoder for decoding the ROM code into control and data signals, and circuitry for sending the control and data signals to desired locations, and controls the functioning of the DSP. The ALU performs arithmetic and logic functions under the control of the ROM, while the serial arithmetic processor section conducts arithmetically complex functions under the control of the ROM. The RAM, under control of the ROM receives and stores data which is sent to the RAM via a system data bus directly from the ROM, from the ALU, from the serial arithmetic processor, and from circuitry exterior to the DSP. The RAM also sends via the data bus data to the ALU, the serial arithmetic processor, the microinstruction sequencer and the circuitry exterior to said digital signal processor under control of the ROM. The provided DSP is particularly advantageous in carrying out ADPCM algorithms.

8 Claims, 23 Drawing Sheets

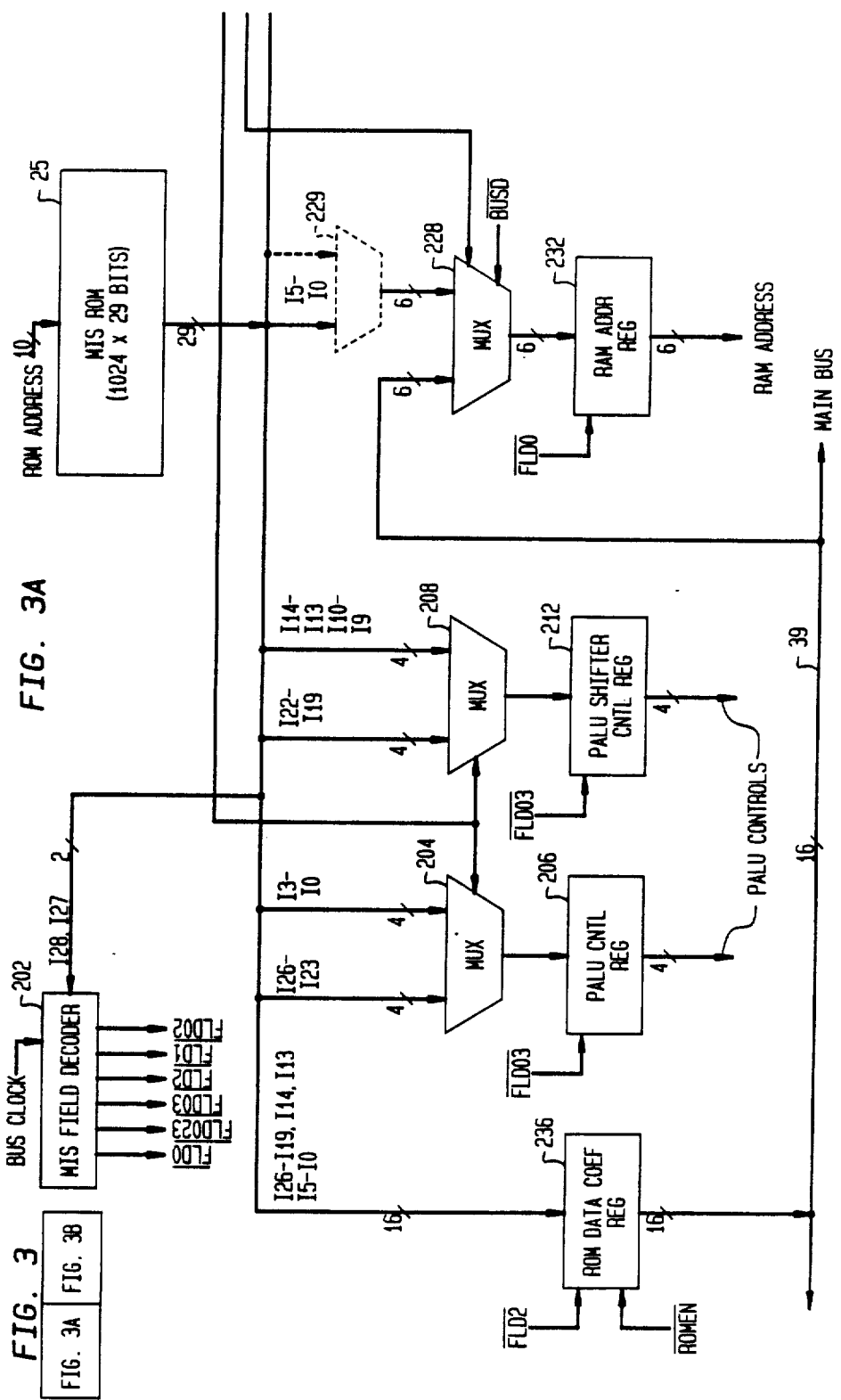

| FIG. 6A |
| FIG. 6B |

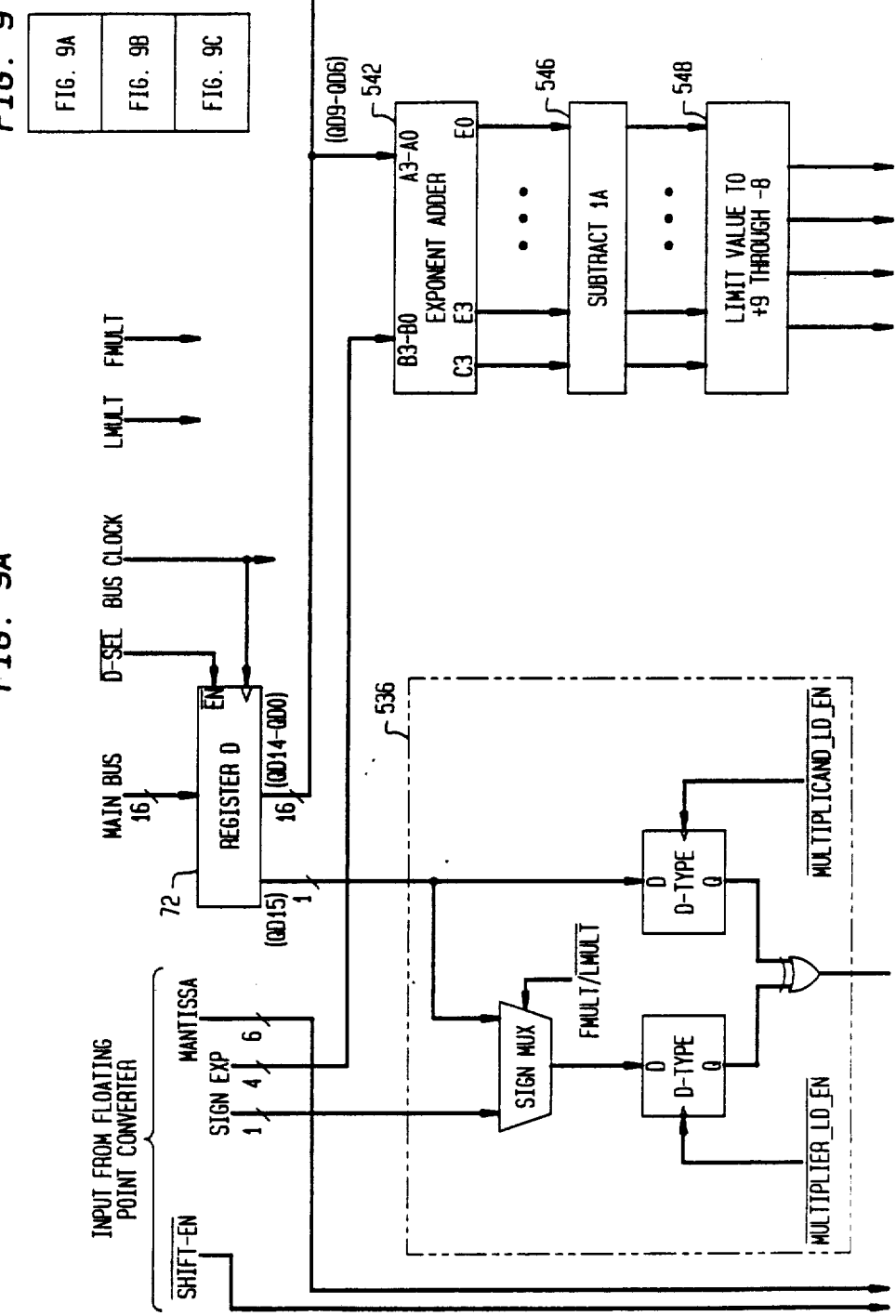

DIGITAL SIGNAL PROCESSOR ARCHITECTURE WITH AN ALU AND A SERIAL PROCESSING SECTION OPERATING IN PARALLEL

This application is related to commonly-owned, concurrently filed applications entitled "Microinstruction Sequencer Capable of Instructing Arithmetic, Logical and Data Move Operations in a Conditional Manner" (Pat. #4,891,754), "Serial Arithmetic Processor" (Pat. #4,858,163), and Parallel Arithmetic-Logic Unit for Use as an Element of a Digital Signal Processor (Pat. # 4,888,722) all of which are hereby incorporated by reference herein.

BACKGROUND

This invention relates to digital signal processing microchips (DSP's) and more particularly to the architecture of a digital signal processor embodied in a single very large scale integrated silicon chip (VLSI) which is capable of conducting adapative differential pulse code modulation (ADPCM) telecommunication algorithms.

Digital signal processors have been known in the art for some time. (See e.g., L. Robert Morris, "Digital Signal Processing Microprocessors: Forward to the Past?" *IEEE MICRO*, Vol. 6, No. 6, pp. 6-8, December 1986). Typically they are high speed reduced instruction set devices which are capable of carrying out limited tasks such as addition, subtraction, multiplication, division, and shifting operations in a much quicker time frame then the slower, more powerful microprocessors. The DSP's of the art typically include a microinstruction sequencer (MIS) including a read only memory (ROM), a random access memory RAM, an arithmetic-logic unit (ALU), a high speed multiplier, and related storage registers. The MIS typically acts to control the functioning of the DSP. The ALU typically performs arithmetic and logic functions under the control of the DSP. The RAM is used to store values which are sent to the DSP from circuitry exterior to the DSP as well as values which are computed by the ALU or directly generated in the ROM of the MIS. The registers are typically used as input or output storage for each of the elements of the DSP.

While the combination of a MIS, a RAM, a multiplier, and an ALU in a DSP permit a DSP to perform a wide range of functions in an efficient manner, it will be appreciated that complex algorithms such as the ADPCM algorithm are not as easily accommodated by such an arrangement. Indeed, in attempting to perform the ADPCM algorithm with the DSP's of the art, several DSP's have had to be utilized.

SUMMARY OF THE INVENTION

It is therefore an object of the invention to provide a digital signal processor architecture which can accommodate the performance of functions and algorithms of a complex nature.

It is a further object of the invention to provide a digital signal processor capable of performing at least one ADPCM algorithm wherein the digital signal processor is embodied in a single VLSI.

It is another object of the invention to provide a digital signal processor having an arithmetic processor and an ALU wherein the arithmetic processor conducts repetitively used mathematically complex functions through the use of hardware.

In accord with the objects of the invention, a digital signal processor is provided and comprises:

(a) a microinstruction sequencer for controlling the functioning of the digital signal processor, including a coded ROM, means for addressing the ROM, means for decoding the ROM code into control and data signals, and means for sending the control and data signals to desired locations;

(b) an arithmetic-logic unit (ALU) for performing arithmetic and logic functions under the control of said control code; and (c) an arithmetic processor means for conducting under the control of said control code complex arithmetic functions;

(d) a RAM for receiving and storing data which is sent to the RAM under control of said control signals from at least one of said microinstruction sequencer, said ALU, said arithmetic processor means, and circuitry exterior to said digital signal processor, and for sending data to at least one of said ALU, said arithmetic processor means, said microinstruction sequencer and said circuitry exterior to said digital signal processor under control of said control signals; and (e) a data bus capable of being written to and read by said arithmetic processor means, said ALU means, said microinstruction sequencer, and said RAM means.

Preferably, the microinstruction sequencer, the RAM, the ALU, and the arithmetic processor all include registers at their input and/or output for storing data which has been or is to be processed and/or for controls. Because the RAM, ALU and arithmetic processor are all controlled by the MIS, they are all connected thereto. Likewise, because the MIS, the ALU, and the arithmetic processor all receive data from and are capable of writing to the RAM, they and the RAM are interconnected via the data bus. Moreover, preferably, the arithmetic processor and arithmetic logic unit are capable of functioning in parallel so that algorithms with arithmetically complex functions may be conducted in an expeditious manner.

The entire digital signal processor preferably shares the VLSI chip in which it is embodied with an input/output section. The I/O section interfaces the DSP with the "outside world" such as with one or more buses carrying telecommunication data as well as with user control lines where an ADPCM algorithm is to be implemented. In this manner data to be encoded or decoded is received by the DSP, properly processed, and then sent to its proper destination outside of the DSP. Likewise, "external" flags may be set by a user or system to help control various aspects of the MIS.

Other objects, features, and advantages of the invention will become apparent to those skilled in the art upon reference to the following detailed description of the invention and the accompanying drawings.

DETAILED DESCRIPTION OF THE PREFERRED EMBODIMENT

Figure 1A:
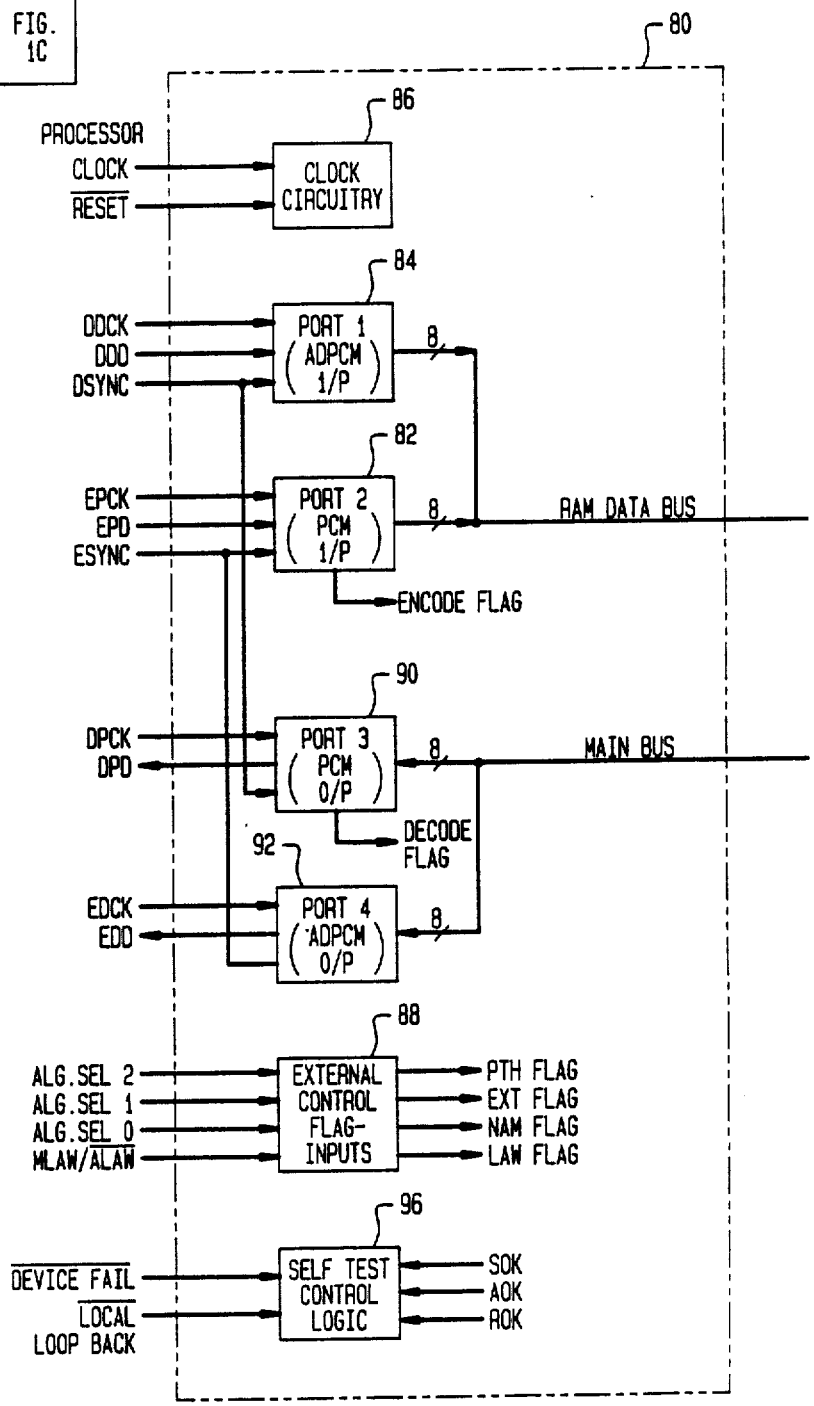
FIG. 1 shows the placement of FIGS. 1A, 1B and 1C which are block diagrams of the digital signal processor of the invention in conjunction with an I/O section of the VLSI on which the digital signal processor is implemented.

The digital signal processor 10 of the invention basically comprises a microinstruction sequencer 20 having a ROM 25, a parallel-arithmetic logic unit (PALU) 40, a data RAM section 60, and a serial arithmetic processor 70. Because at least the microinstruction sequencer, the arithmetic-logic unit and the serial arithmetic processor each contain novel arrangements, the detals of each will be set forth hereinafter in separate sections. However, how these elements interact with each other to provide a unique DSP, and how the ADPCM algorithm may be expeditiously implemented therein is the focus of this separate invention.

Before focusing on the elements of the DSP, it is noted that the DSP does not function in a void. Thus, a data and control input/output section 80 is provided on the VLSI with the DSP and interfaces the DSP to other circuits. It will be appreciated, however, that the functioning of the DSP is not dependent on the data and control I/O structure. Indeed, depending on the desired application of the DSP, different I/O structures would be desired.

For purpose of example, the DSP of the invention is described herein with reference to performing the ADPCM algorithm. Thus, the I/O section includes: a PCM serial input data port 82 for receiving a mu-law or A-law compressed PCM bit stream in accod with CCITT Recommendation G.711; an ADPCM serial input data port 84 for receiving an ADPCM bit stream; clock circuitry 86 for synchronizing and controlling the DSP clocking; a PCM serial output data port 90 for transmitting a reconstructed PCM bit stream; an ADPCM serial output data port 92 for transmitting an ADPCM bit stream; and self test control circuitry 96 for testing the functioning of the DSP. In addition, the I/O section includes three flag inputs 88 for selecting eight possible algorithms as set forth with reference to FIG. 2b, and a law flag for selecting the PCM law to be followed (A-law or mu-law). Also, internal encode and decode flags are generated in response to external synchronization information and respectively control the encode and decode cycles of the DSP. The flags are sent as inputs to the microsequencer controller 32 of the MIS 20 so that the microsequencer controller can perform conditional branch, conditional arithmetic, conditional logical, and conditional data move operations.

While the MIS of the DSP is controlled to a certain extent by the supplied flags, it will be appreciated that the DSP is able to control the I/O 80 hardware through the microinstructions of the ROM in the MIS. As will be seen in detail hereinafter, two primary microinstructions of the MIS are used to control the two data input ports. These microinstructions are designated Move Port 1 (MVP1) and Move Port 2 (MVP2) and are used to input data from the data input ports 82 and 84 to a desired location in the DSP. In addition, in the secondary microinstruction field of the MIS, two microinstructions are provided for loading data ports 90 and 92 as well as three microinstructions for setting three self test flags.

Figure 2A:
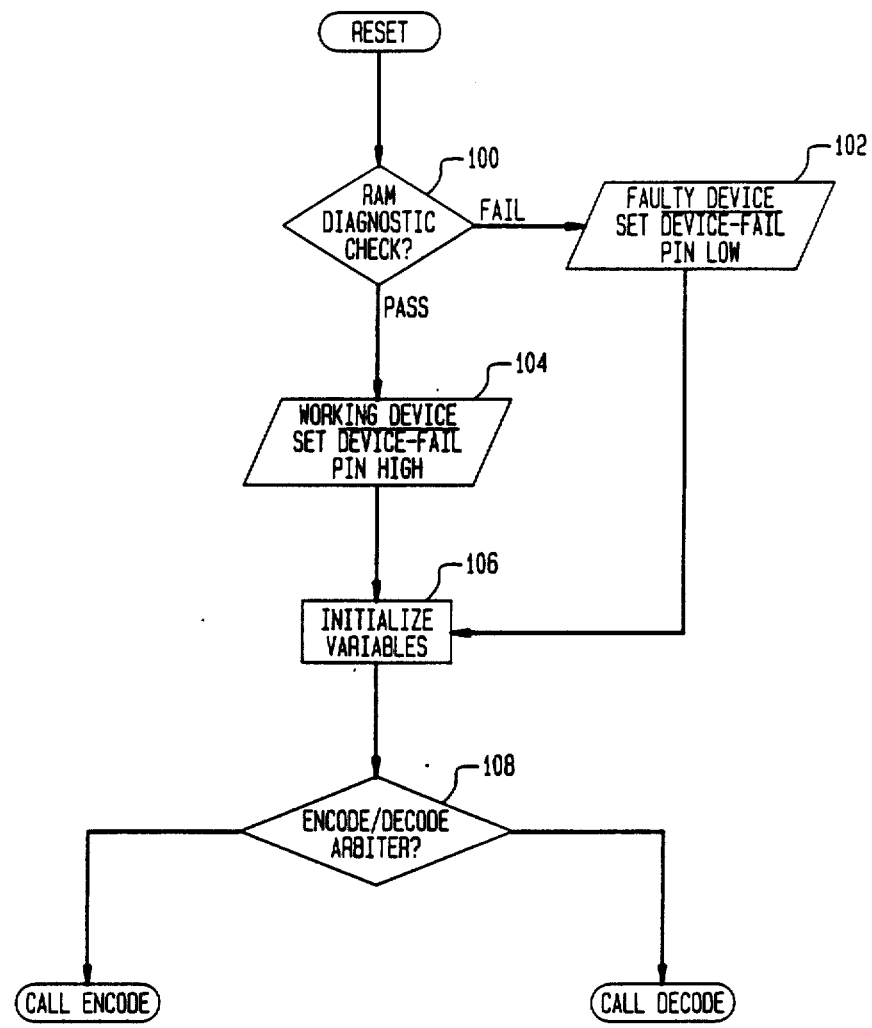
FIGS. 2a-2e are top level flow diagrams for accomplishing the ADPCM algorithm with the DSP of the invention.

Before returning to the elements of the DSP invention, it is instructive to review the ADPCM algorithm which is advantageously carried out by the DSP invention. The steps of the ADPCM algorithm may be seen by reference to the top level flow charts of FIGS. 2a-2e. With reference to FIG. 2a, upon receipt of an external reset signal, the DSP VLSI device performs at 100 a diagnostic check of the RAM section of the DSP. In performing the diagnostic test, other sections of the device such as the PALU and MIS sections are also exercised. If the test is successful, the external pin labelled "DEVICE FAIL" is set high at 104. If the test should fail, the DEVICE FAIL pin is left in the low condition at 102. Regardless, the reset routine continues and initializes both the encoder and decoder at 106 by setting the variables of the algorithm to predefined conditions. At 108 the reset routine enters the encode/decode arbiter where the program idles and waits for either an encode or decode flag to be set so as to trigger the encode or decode process. Where an encode flat is set, the routine continues as is shown in FIGS. 2b and 2c, whereas where the decode flag is set, the routine continues as is shown in FIGS. 2d and 2e.

Figure 2B:
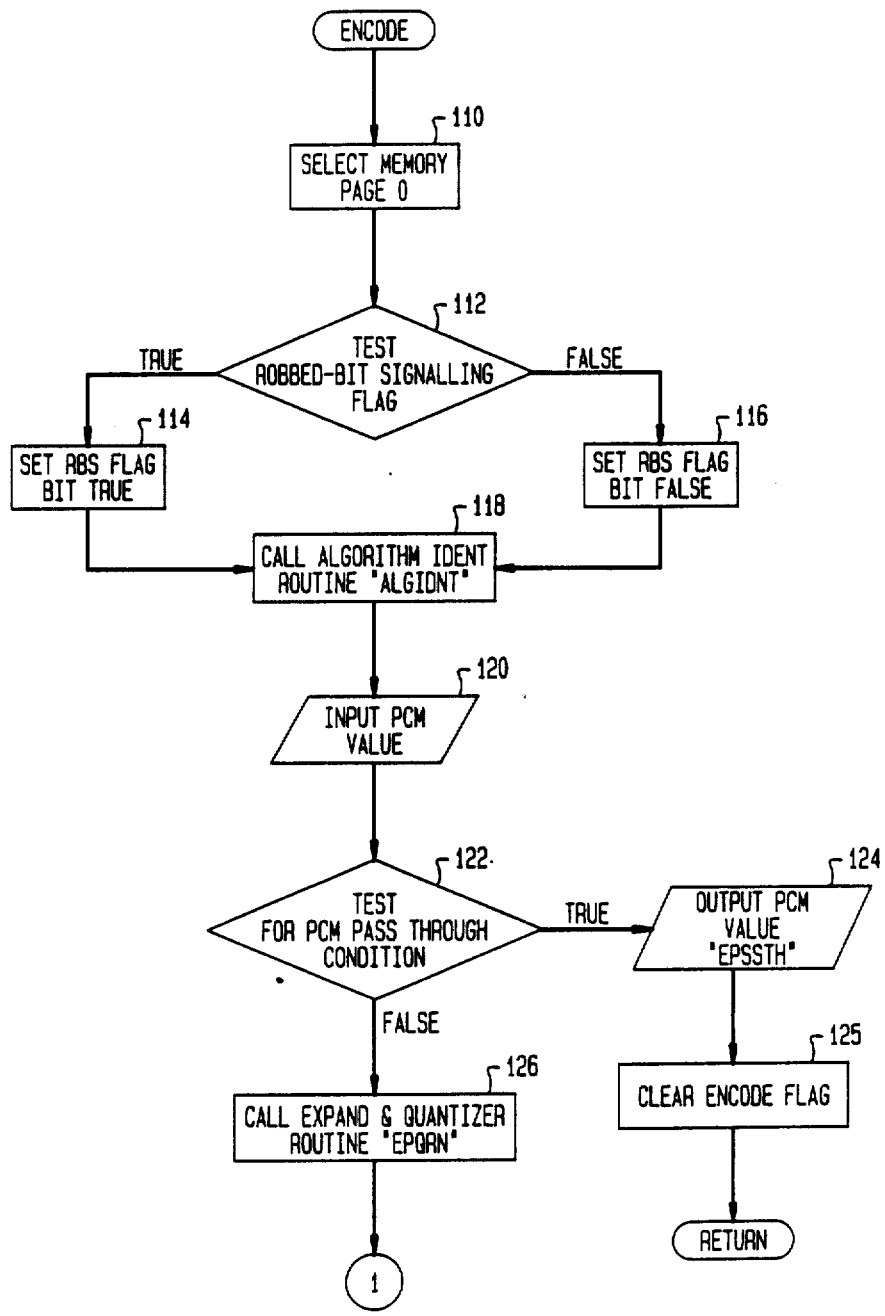
Figure 2C:
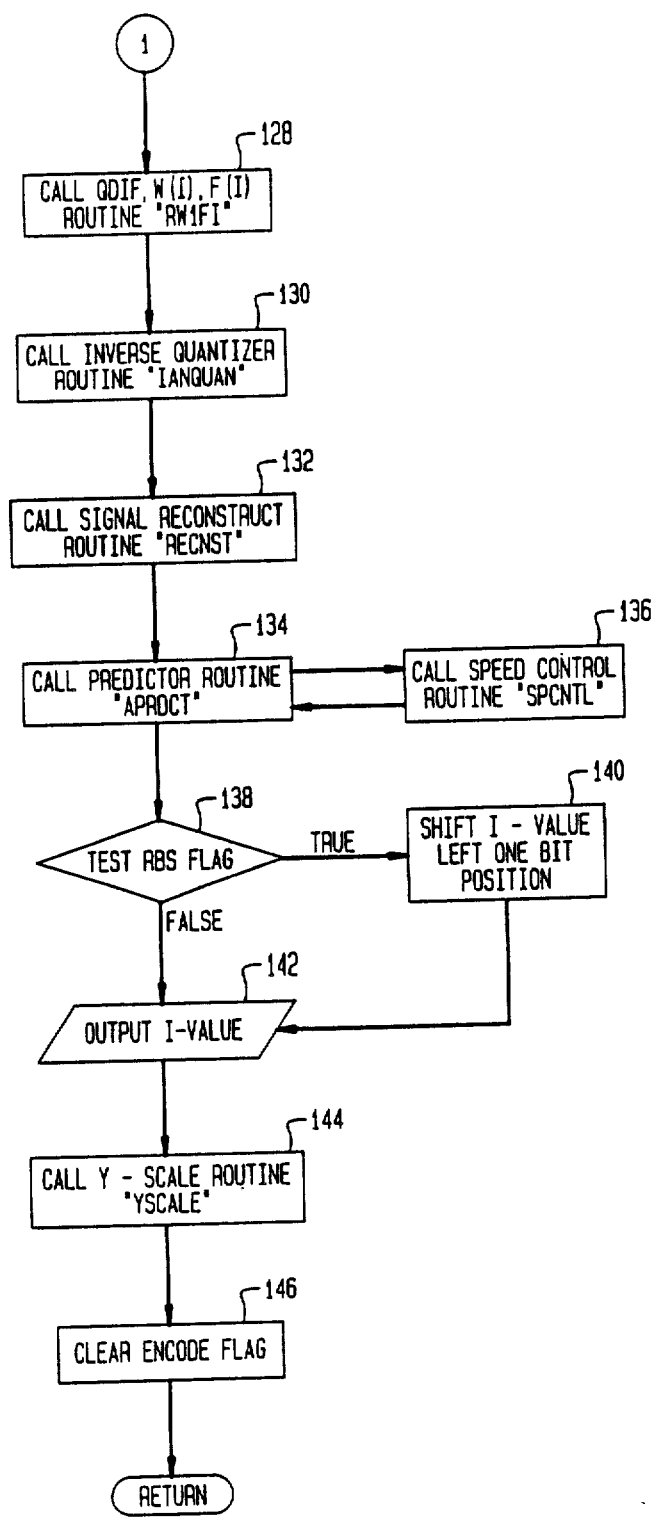
Figure 2D:
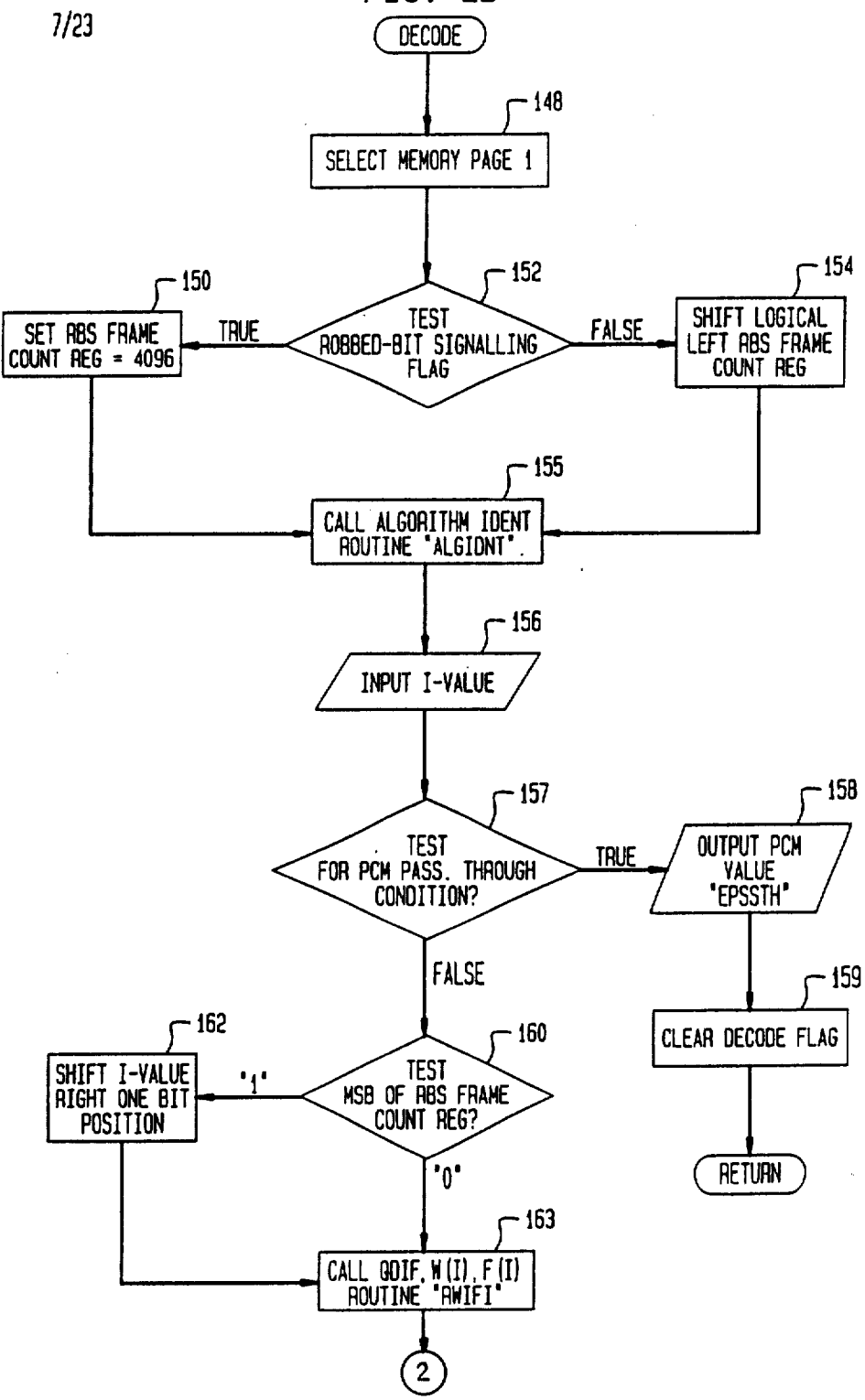
Figure 2E:
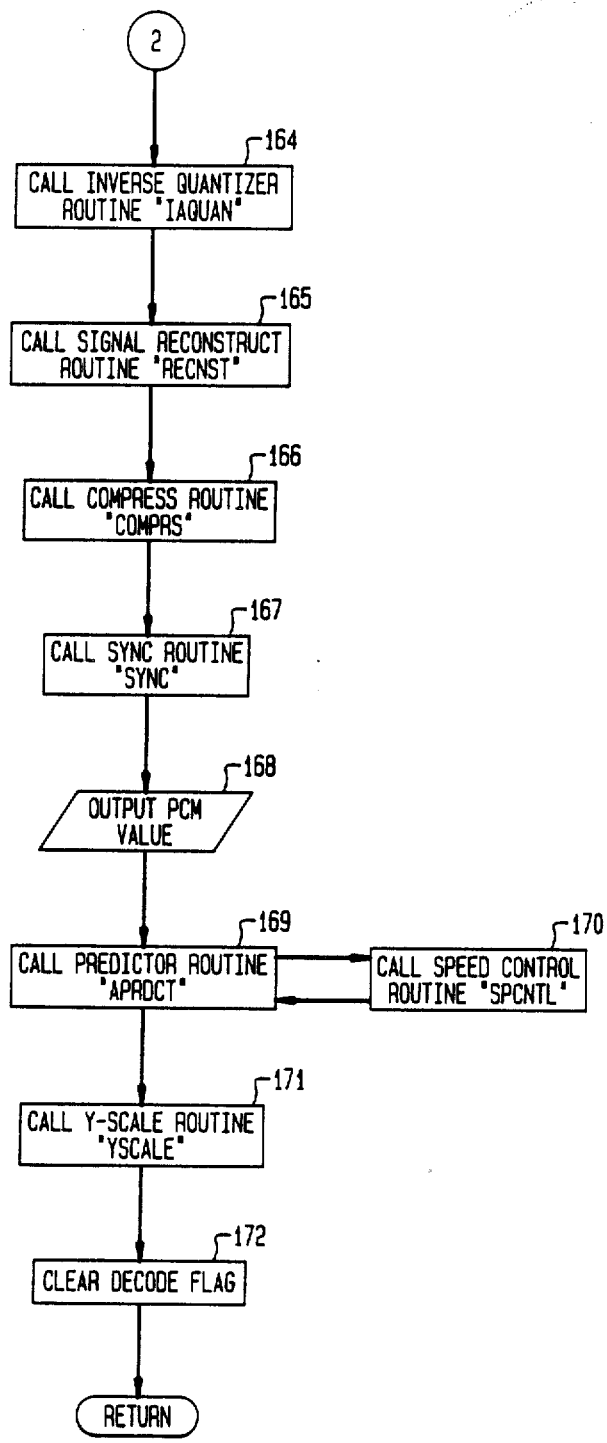

Turning to FIGS. 2b and 2c where the encode flow diagrams show the main operations accomplished by the encoder, RAM page zero is selected at 110 as it is used exclusively by the encoder. The robbed-bit signalling flag (OVFLG), which is set in response to the external signalling frame signal SGNF it tested at 112. If the robbed-bit signalling flag is true (high), the software defined robbed-bit signalling flag RBS is set high (true) at 114. Otherwise, the RBS flag is set false (low) at 116. The RBS flag together wth the external flag inputs PTH, EXT, and NAM representing the external algorithm select inputs ALGSEL2, ALGSEL 1, and ALGSEL0, respectively, are at 118 used by the algorithm identification subroutine to determine the appropriate encoding algorithm and bit-rate to execute. For example, if the nominal bit-rate selected is thirty-two kbps, and if the RBS flat is true indicating that this frame should be processed for robbed-bit signalling, then the twenty-four kbps algorithm will be selected. This switching allows the signalling bit to be inserted into the shifted outgoing ADPCM data word in a controlled manner, where the signalling bit is inserted into the lsb position by the transmit ADPCM data port. On the other hand, if the RBS flag is false, the thirty-two kbps algorithm will be selected at 118.

According to the provided embodiment, the definition for the algorithm select bits used by the algorithm identification routine is as follows:

| ALGSEL2 | ALGSEL1 | ALGSEL0 | DESCRIPTION |
|---|---|---|---|
| 0 | 0 | 0 | 32 kbps CCITT G.721 |
| 0 | 0 | 1 | 32 kbps ANSI (3/85) |
| 0 | 1 | 0 | 40 kbps (reserved) |
| 0 | 1 | 1 | 24 kbps |
| 1 | 0 | 0 | 32 kbps CCITT/ANSI (7/86) |
| 1 | 0 | 1 | 32 kbps other |
| 1 | 1 | 0 | 16 kbps (reserved) |
| 1 | 1 | 1 | PCM Pass-through |

The algorithm identification carried out at 118 leaves software defined flags set. These flags are subsequently used by the encode subroutines to control the encode process.

Following the algorithm identification subroutine, the PCM input data port 82 is read at 120. The external flags PTH, EXT and NAM are tested at 122 to determine the pass-through condition. If the condition is true, the input PCM value is immediately output at 124 as the ADPCM data word via the ADPCM data output port 92, and a return from the encode routine is issued. In returning from the encode routine, the encode flag is cleared at 125 and control of the program returns to the encode/decode arbiter at 108. If the pass-through condition is false, the encode program continues by executing a series of subroutines. The detailed description of each of the subroutines is given in the ANSI Committee T1 "Draft Proposed American Standard 32 kbps ADPCM Algorithm and Line Format," document No. T1/LB 81, July 23, 1986 which is hereby incorporated by reference herein. Thus, at 126, sections 6.2.1, 6.2.2, and 6.2.3 of the said document No. T1/LB 81 are executed. At 128, the inverse quantizer values, W[I(k)], and F[I(k)] are determined. At 130, the inverse adaptive quantizer routine (section 6.2.4) is called, while at 132, the signal reconstruct routine (section 6.2.7) is called. At 134 the adaptive predictor and tone transition detector sections (6.2,7 and 6.2.8) are called, with the quantizer scale factor adaptation speed control subroutine (section 6.2.6) being called from within the adaptive predictor routine. Upon return and completion of the predictor subroutine at 134, the RBS flag is interrogated at 138. If the flag is high (true), the value I is shifted one bit position to the left at 140 to allow the signalling bit to be inserted into the lsb position by the transmit ADPCM port 92. Regardless, the value I, whether shifted or not, is outpt to the ADPCM data port 92 at 142. The quantizer scale factor adaptation routine (section 6.2.5) is then called and executed at 144. Finally, the encode routine ends with the clearing of the encode flag at 146 and a return to the encode/decode arbiter which waits at 108.

Turning to FIGS. 2d and 2e, the shown decode flow diagrams outline the main operations accomplished by the decoder. Thus, at 148, page one of the RAM which is used exclusively by the decoder is selected. The robbed-bit signalling flag (OVFLG) which is set in response to the external signalling frame signal SGNF is tested at 152, and if true causes the robbed-bit signalling frame counter to be loaded a 150 with a value of 4096. Otherwise, at 154 the robbed-bit signalling frame counter is logically shifted one bit position to the left. The reason for maintaining a signalling frame counter arises from the need to determine the second frame following the occurrence of the signalling frame sync signal SGNF.

The robbed-bit signalling flag (OVFLG) together with the external flag inputs PTH, EXT, and NAM are then used at 155 by the algorithm identification subroutine (as previously described with reference to the encoder), which leaves software defined flags set. These flags are subsequently used by the decode subroutines to control the decode process.

Following the algorithm select routine, the PCM input data port 82 is read at 156. The external flags are then tested at 157 to determine whether the pass-through condition is present. If the condition is true, the input PCM value is immediately output at 158 as the PCM data word via the PCM output port 90 and a return from the decode routine is issued. In returning from the decode routine to the encode/decode arbiter waiting at 108, the decode flag is cleared at 159. If the pass-through condition is false, the msb of the robbed-bit signalling frame counter is tested at 160 for a value of one. If the msb has a value of one, the received I value is shifted at 162 by one bit position to the right to compensate for the fact that the lsb was used to convey signalling information. Regardless, the program continues and a series of subroutines defining the decode process are executed. It is of note that if the robbed-bit signalling flag is never set, the robbed-bit signalling frame counter will always be zero and the signalling frame condition will never be detected. It is also of note that if, for example, the selected bit rate is thirty-two kbps, that the algorithm will switch to the twenty-four kbps algorithm during the frame in which the msb of the robbed-bit frame counter is a value of one.

At steps 163, 164, and 165, the routines set forth at 128, 130, and 132 of the encoder algorithm are executed.

Then at 166 and 167, the output PCM format conversion routine (section 6.3.6) and the synchronous coding adjustment routine (section 6.3.7) are called and executed. After the execution of the synchronous coding adjustment routine, the reconstructed PCM value is output at 168 to the PCM output data port. Then at 169, 170, and 171, the routines set forth at 134, 136, and 144 of the encoder algorithm are executed. Finally, the decode routine ends with the clearing of the decod flag at 172, and a return to the encode/decode arbiter which is waiting at 108.

Figure 1B:
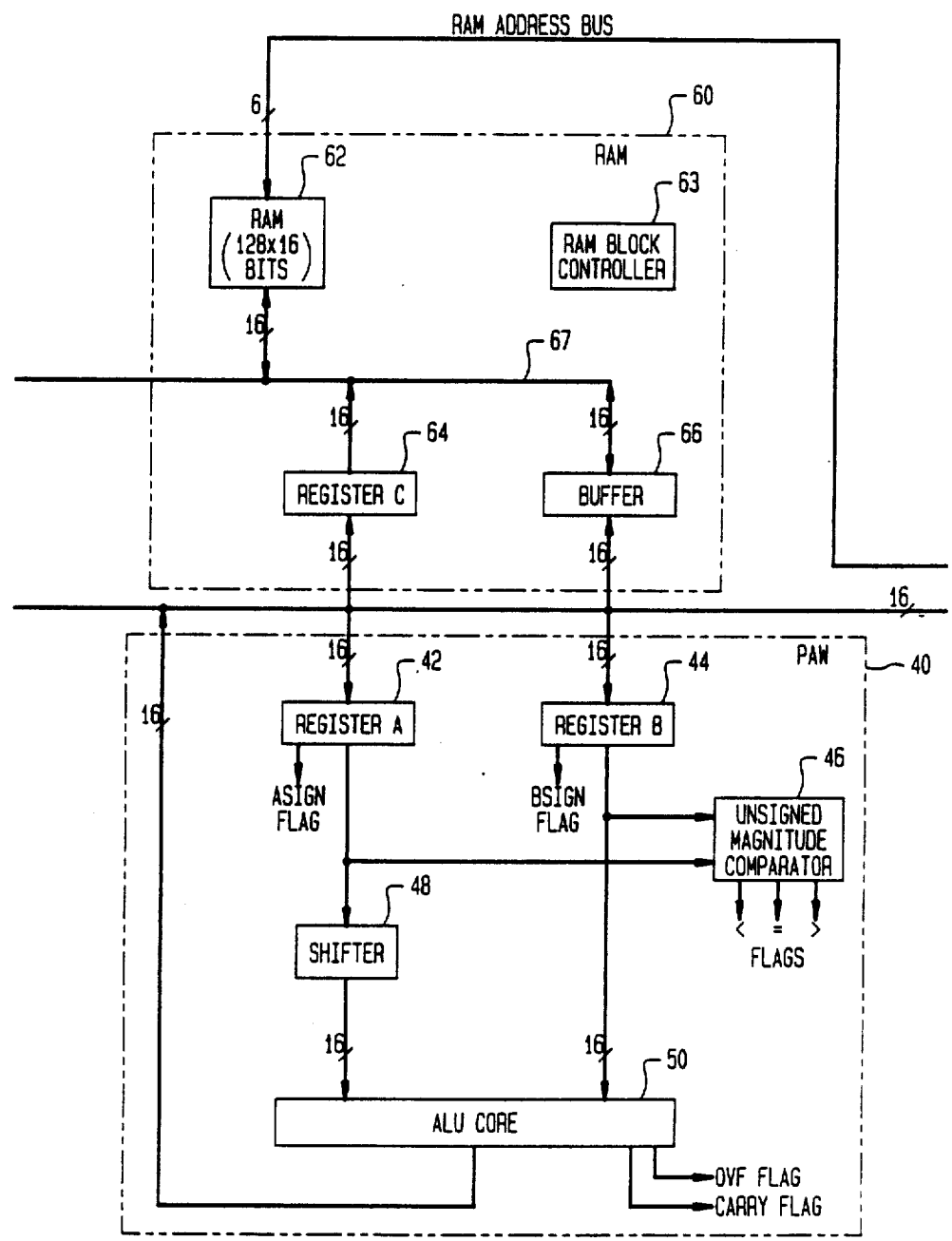
Figure 1C:
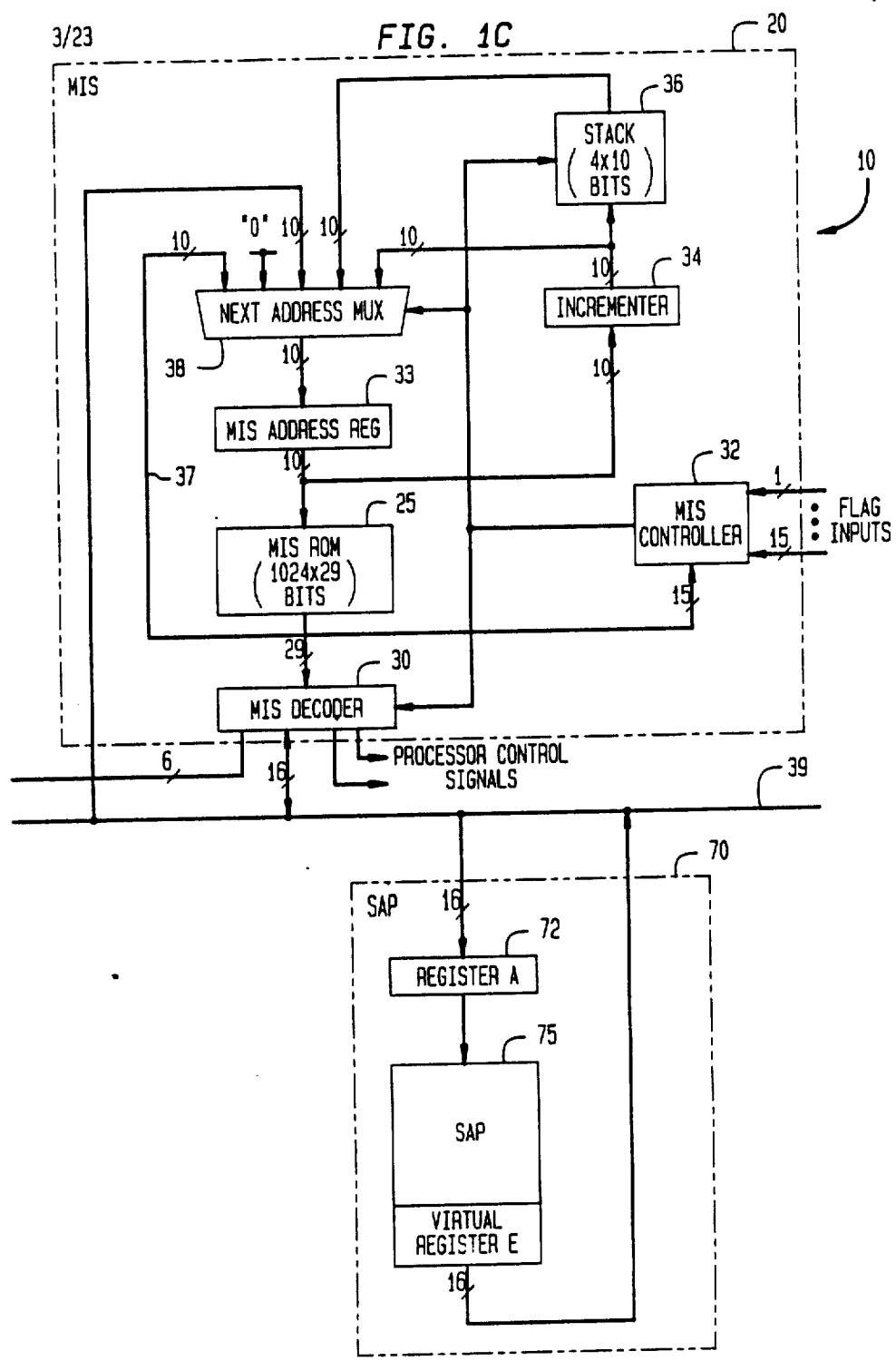

Returning to the DSP invention shown in FIG. 1, the data RAM section 60 preferably includes a one hundred twenty-eight by sixteen bit RAM array 62, a sixteen bit input register 64 (Register C), a sixteen bit bidirectional buffer 66, and a controller 68. The one hundred twenty-eight by sixteen bit RAM array 252 is preferably organized into two sixty-four by sixteen bit pages. This arrangement is advantageous for the implementation of the ADPCM algorithm as the encoder for the algorithm is assigned page zero and the decoder is assigned page one. As will be seen with reference to the MIS, the microcode permits page zero or page one of the RAM to be selected, and locations within the selected page to be addressed from the data bus 39 as well as by direct memory addressing by the ROM operand.

The input register 64 to the RAM array 62 is sixteen bits in length and may be used as a temporary register or as an input register to the RAM array. Input register 64 (register C) is loaded by selection according to the command (REG C SEL/) of an operand of the MIS ROM 25. A bus 67 internal to the RAM section 60 allows the data to be output back to the primary DSP data bus 39 via the bidirectional buffer 66, or alternatively to be written into the RAM 62 through the application of a STORE Register C secondary microinstruction (described hereinafter with regard to the Microinstruction Sequencer). As the STORE microinstruction is a secondary microinstruction, it may be implemented concurrently with some other operation.

The sixteen bit bidirectional buffer 66 provides a gateway (i.e. buffer) between the data bus of the DSP and the internal bus of the RAM. The buffer 66 also provides a means of outputting data directly from Register C or the RAM 62 onto the DSP data bus 39 and for writing data directly from the DSP data bus into the RAM. These operations are supported by the MOVE REG C (MVC) and LOAD DATA MEMORY (LDM) microinstructions and the STORE data memory secondary microinstruction respectively, all of which are described hereinafter with regard to the MIS. Also, the STORE REG C secondary microinstruction is used to write data from Register C into the RAM.

As indicated in FIG. 1, ports 1 and 2 (84 and 82) are connected to the internal RAM bus 67, and data from these ports must pass through the buffer 66. The selection of ports 1 and 2 to control the RAM bus is made by the RAM controller by using the MA1 and MA0 controls.

Finally, with regard to the RAM section 60, the RAM controller 68 acts as the brain of the RAM section. The RAM controller provides the necessary clocking and timing signals to the RAM array 62, register C 64 and the bidirectional buffer 66. In addition, the RAM controller 68 arranges the RAM section such that the signals from the decoder of the MIS (e.g. update register C; write register C into RAM; output register C onto data bus; write RAM location onto data bus; write data bus to RAM location, etc.) may be implemented by the RAM section. Thus, the RAM controller 68 (MA0 and MA1 as control inputs) decodes the received signals so as to enable the RAM memory 62, select register C 64, select the the page of the RAM memory, etc.

THE SERIAL ARITHMETIC PROCESSOR

Figure 5:
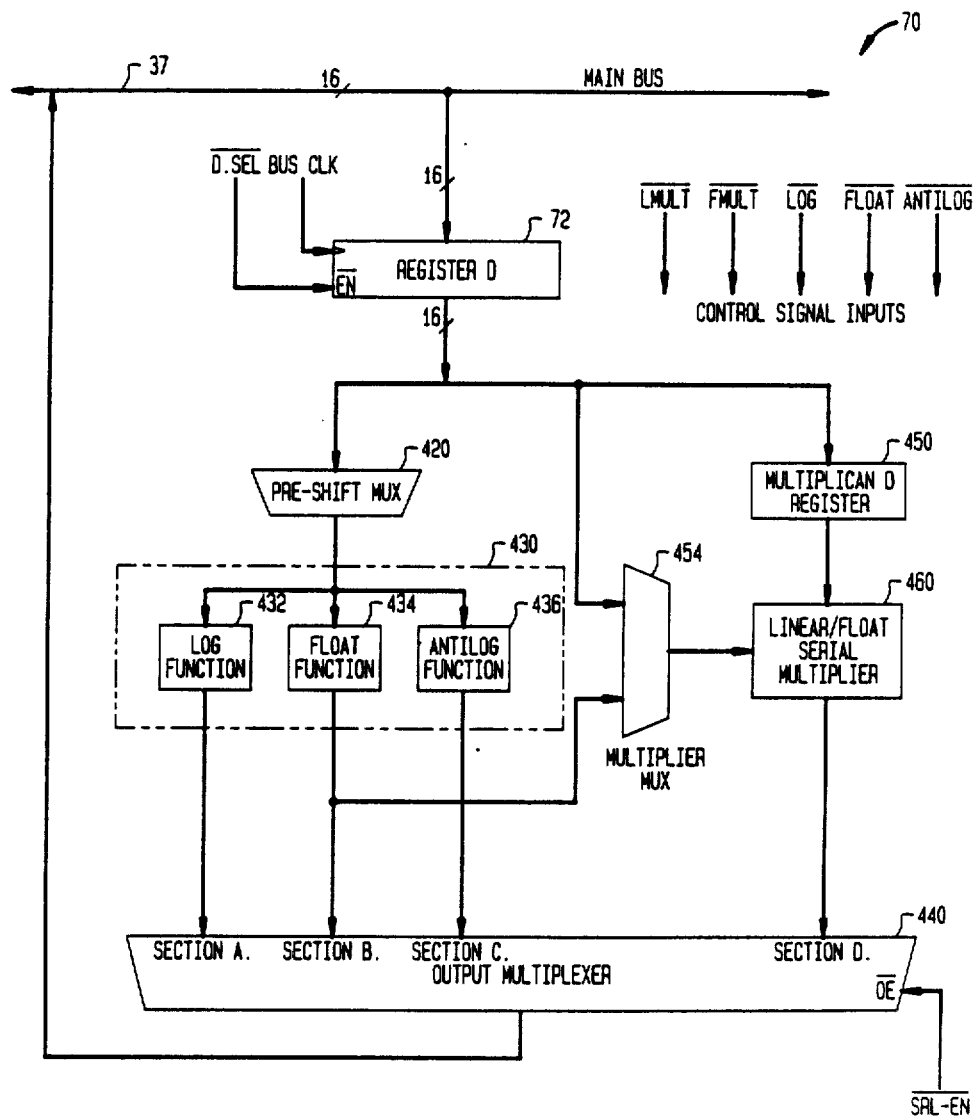
FIG. 5 is a simplified block diagram of the serial arithmetic processor of the DSP of FIG. 1.

Turning to FIG. 5, a simplified block diagram of the serial arithmetic processor 70 capable of performing the LOG, FLOAT, ANTILOG, MULTIPLICATION, and FLOATING POINT MULTIPLICATION functions on incoming data as is required by the ADPCM algorithm is seen. Typically, a sixteen bit word is received by the processor 70 via a data bus, and the sixteen bits are stored in a register 72 (Register D). Depending on the various control signals received, and in accord with a clock signal, the contents of the register 72 are sent via a pre-shift multiplexer 420, to a first common means 430, or to the multiplier means 460 via a multiplicand register 450 or a multiplexer 454. Thus, if the contents of the register 72 are to be processed according to the LOG, FLOAT, or ANTILOG functions, a first common means 430 is loaded via the pre-shift multiplexer 420. On the other hand, if a MULTIPLICATION function is to be accomplished, the common multiplier 460 is loaded with the multiplier via the multiplexer 454 and the multiplicand register 450 is loaded with the multiplicand. As will be described in detail hereinafter, if a FLOATING POINT MULTIPLICATION is to be carried out, the multiplier must first be processed by the float converter 434 prior to being sent via multiplexer 454 to the common multiplier 460 (the multiplicand typically having already undergone such a conversion and being stored in a floating point format).

Figures 6, 6A:
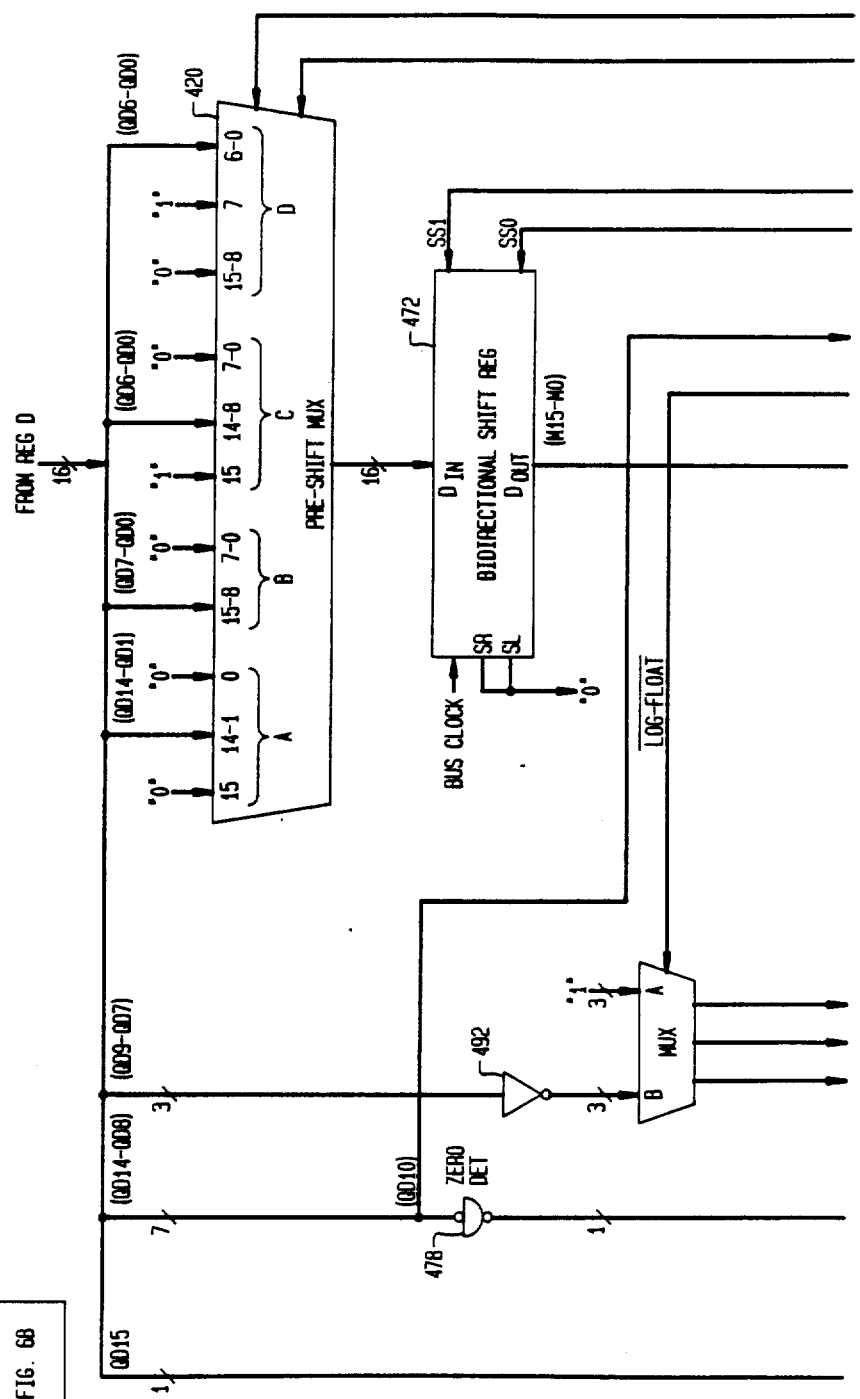
FIG. 6 shows the placement of FIGS. 6A and 6B which are block diagrams of the first common means of the serial arithmetic processor of the DSP of FIG. 5.
Figure 6B:
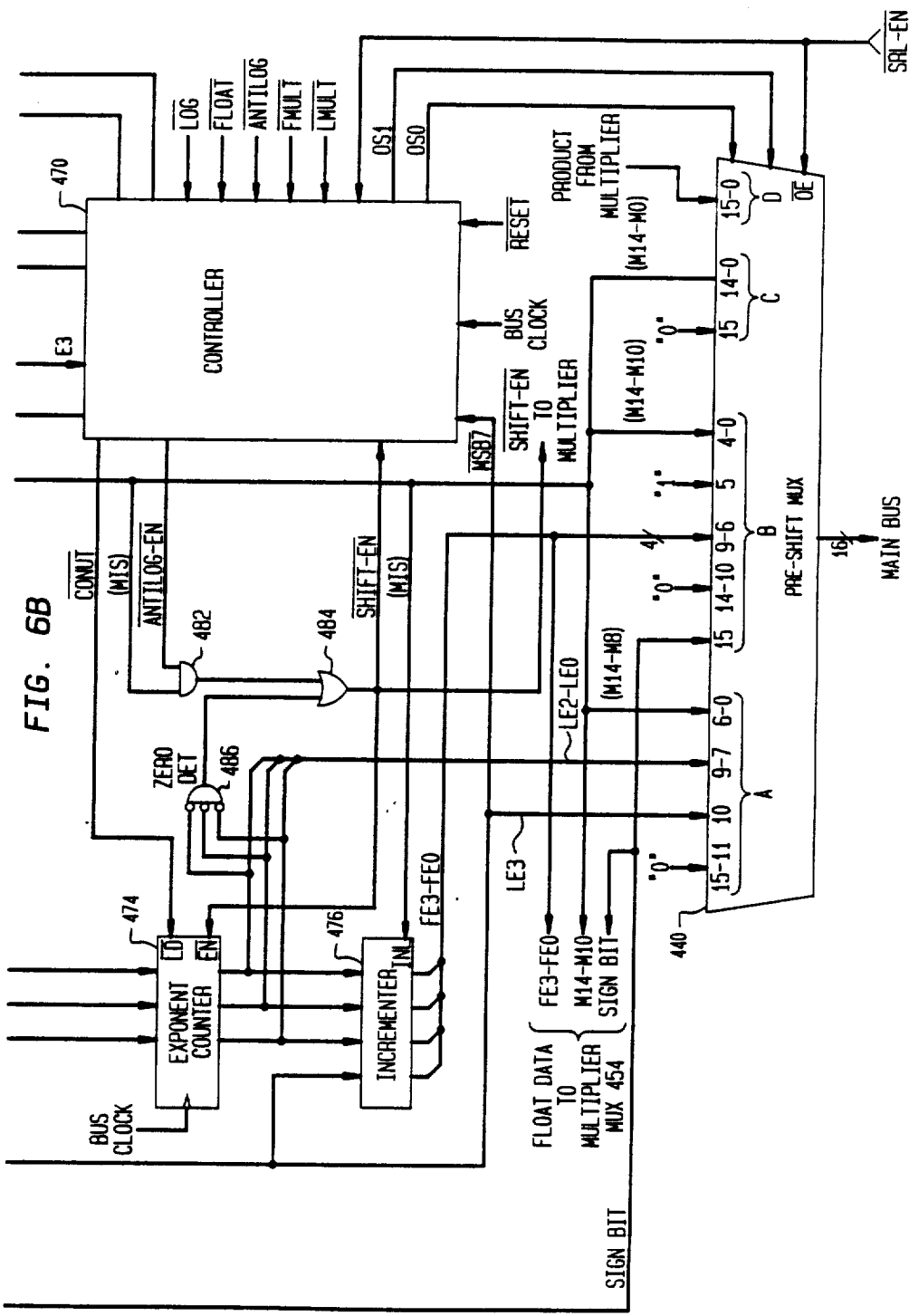

The manner in which data coming from the register 72 is pre-shifted by the pre-shift multiplexer 420 depends on control signals provided to the pre-shift multiplexer by a controller 470 seen in FIG. 6. The function of the data pre-shift multiplexer is to format the data via parallel bit selection so that common means can properly process the data to provide any of the required functions. Thus, the formatted data will be loaded into a first common means 430, which performs either a LOG, FLOAT, or ANTILOG function on the data as is suggested by boxes 432, 434, and 436. The particular manner in which the data is pre-shifted data is dependent on the function to be accomplished, and the pre-shift multiplexer 420 accomplishes the same under the control of the control signals. If the LOG 432 or ANTILOG 436 functions are utilized, the processed data is then sent out of the serial processor 70 via an output multiplexer 440 which formats the processed data. If the FLOAT 434 function is utilized, the processed data is output via output multiplexer 440 if the data undergoing the FLOAT function is not being used as the multiplier of a FLOATING POINT MULTIPLICATION. If the data undergoing the FLOAT function 434 is the multiplier of a FLOATING POINT MULTIPLICATION function, the processed floating point multiplier data is sent via multiplexer 454 to serial multiplier 460 such that it can be multiplied with the floating point multiplicand contained in register 450.

With either of the multiplication functions, the multiplicand register must be loaded with one word of data (the multiplicand) while a multiplier shift register of the multiplier 460 is loaded with a second word of data (the multiplier). The MULTIPLICATION and FLOATING POINT MULTIPLICATION functions may then be carried out by the second common (multiplier) means 460 which forwards the results to output multiplexer 440. However, as above-stated, in the FLOATING POINT MULTIPLICATION the multiplicand and multiplier are first converted via the FLOAT function in first common means 430 prior to being processed by second common means 460. Thus, a first word of data is processed by the first common means 430 to provide a floating point multiplicand which may be reentered into register 72 and stored in muliplicand register 450. A second word (the multiplier data) is then similarly processed. However, instead of reentering the information in register 72, the floating point multiplier is sent directly to the multiplier common means 460 via the multiplexer 454.

Before turning to FIG. 6, it is instructive to review the manner in which log conversions (LOG function), floating point conversions (FLOAT function), and antilog conversions (ANTILOG function) are accomplished algorithmically. In a log conversion (LOG), in accord with the ADPCM standards, an approximation is obtained by setting the integer part of the log equal to the exponent of the base two linear number (i.e. the digit of the left-most "1"), and setting the fractional part of the log (mantissa) equal to the remaining digits of the unsigned magnitude number. For example, if a unsigned number N is set as follows:

| 0 | 0 | 0 | 0 | 0 | 0 | 0 | 0 | 0 | 0 | 0 | 1 | 1 | 1 | 0 | 1 |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| 2 | 2 | 2 | 2 | 2 | 2 | 2 | 2 | 2 | 2 | 2 | 2 | 2 | 2 | 2 | 2 | it is readily seen that the digit having the left-most "1" value is the $2^4$ digit. The integer part of the log which is four bits long to accommodate all possible values in the sixteen bit word is therefore set to 0100 which is equal to the exponent value 4. The fractional part of the log which is preferably seven bits long is then set to the remaining digits with additional zeroes: i.e. 1101000. The log value for N is seen as the combination of the exponent and the mantissa: 0.100.1101000.

The log value for N may also be described and obtained by the following algorithm for a fifteen bit unsigned magnitude number:

| EXP = | 14 where $16384 <= N$ |
|---|---|
| | 13 where $8192 <= N <= 16383$ |

-continued

| | 1 where $2 <= N <= 3$ |
|---|---|
| | 0 where $0 <= N <= 1$ |
| MANT = | $((N <<7) >> EXP)$ AND 127 |

Thus, LOG (N) = EXP<<7 OR MANT, where << means shift left and >> means shift right. In finding the mantissa where the number N is shifted left by seven places and then shifted right by the number of places defined by the exponent value, with the resulting digits then being processed via a logical AND with the value 127 (1111111), it should be noted that the shifting occurs by originally placing the fractional point to the right of the $2^0$ digit and then shifting. Thus, after shifting N left by seven places, the number appears as 111010000000. After shifting right by four places, the number appears as 11101000. Using a logical AND with 01111111, the value 01101000 or 1101000 is derived. It will be appreciated by those skilled in the art that the effect of using a logical AND of 01111111 with a supplied number is to nullify the exponent defining bit while permitting the bits following the exponent defining bit to maintain their values.

The FLOAT operation is similar in some respects to the LOG operation. Four bits are used to define the exponent, and the exponent value is set equal to the LOG exponent plus one, except for the case where the number is zero, and the exponents take the same zero value. The format of the mantissa differs significantly, however, as only six bits are required for the mantissa, and the mantissa value is essentially a truncated portion of the number itself.

The algorithm for obtaining a floating point value for a sixteen bit signed magnitude linear number is as follows:

| SGN = | $N >> 15$ |
|---|---|
| MAG = | N AND 32767 |
| EXP = | 15 where $16384 <= MAG$ |
| | 14 where $8192 <= MAG <= 16383$ |
| | . |
| | . |
| | 2 where $2 <= MAG <= 3$ |
| | 1 where MAG = 1 |
| | 0 where MAG = 0 |
| MANT = | $1 << 5$ IF MAG = 0 |
| | $(MAG<<6)>>EXP$ otherwise |

Thus, FLOAT (N)=SGN<<15+EXP<<6+MANT. Using the number 1000000000011101 (−29 in signed decimal), the FLOAT function may be obtained by first recognizing that the value of the number N is 29. The exponent would therefore be set to five (one greater than the base two position of the first "1" bit), or 101 in base two. With the exponent so set, the mantissa is determined by shifting the number left by six positions: 11101000000, and then by shifting right by the value of the exponent (5): 111010. The FLOAT number is set to the OR value of the following numbers:

SGN = 1000000000000000   EXP = 101000000   MANT = 111010 such that the final number is 1000000101.111010. Those skilled in the art will appreciate that the original number 11101 (N) remains intact in the floating point representation as the purpose of the floating point representation is to essentially normalize the number N. The exponent is used to accomplish that normalization. It will also be appreciated that by shifting the number N left six places and then right by the value of the exponent, a mantissa of six bits in length containing the number N starting at its most significant will be obtained.

The ANTILOG function (log domain to linear domain conversion) is basically the inverse of the LOG function. The exponent value is determined, and a logic "1" is inserted into the bit position (two to the power of the exponent value) corresponding thereto. The mantissa is then positioned into the bit positions to the right of the bit position defined by the exponent. For example, the ANTILOG function of the log value 0100.1101000 is determined as follows: The exponent value 0100 is equivalent to the number four. Thus, a "1" is put in the two to the fourth bit position, and the mantissa 1101000 (or as much as will fit in the word) is located thereafter. The linear value becomes 0000000000011101. Reference to the LOG algorithm above shows that the same linear value produced the log value 0100.1101000 which was the starting value of this ANTILOG calculation.

Figure 7:
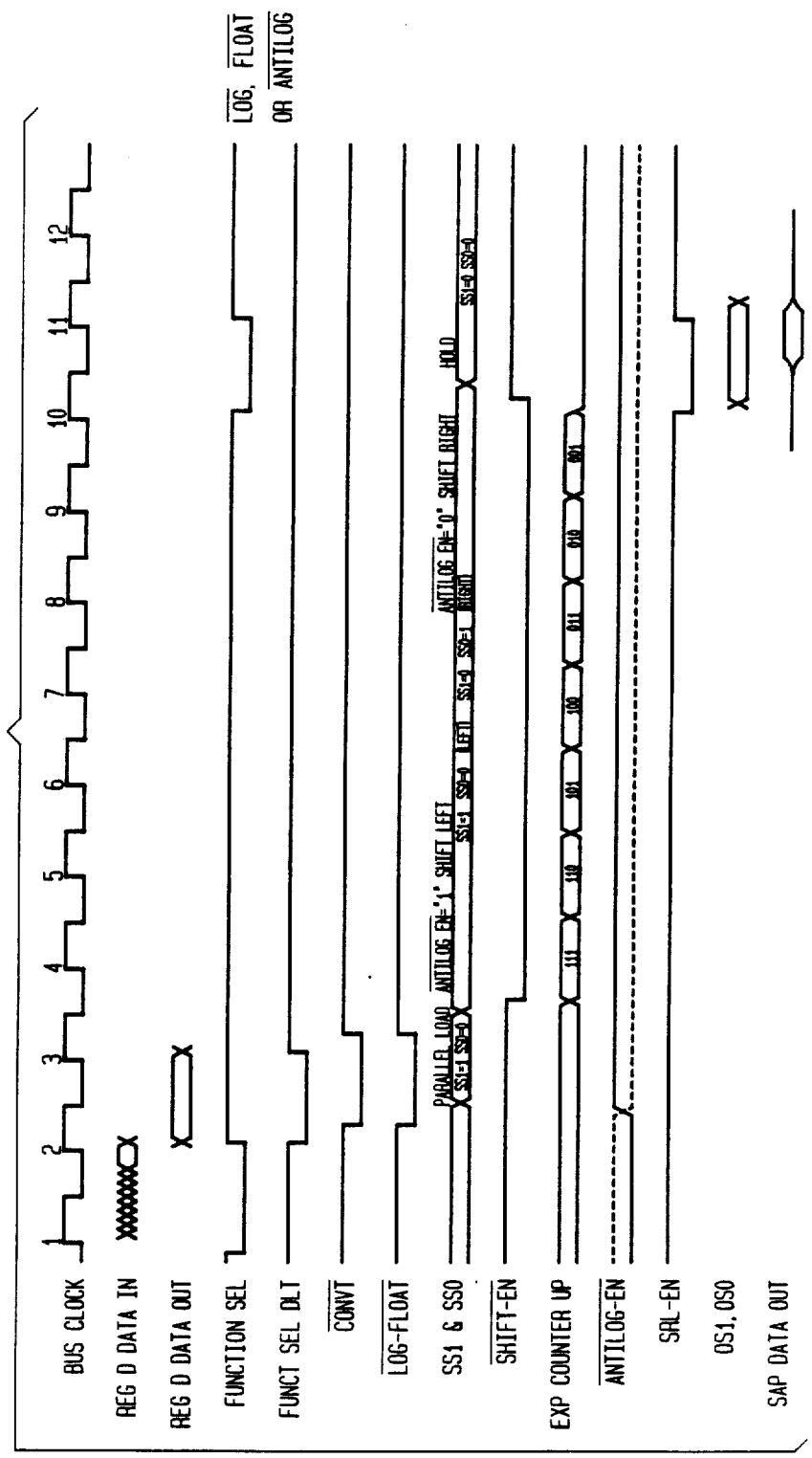
FIG. 7 is a timing diagram of the first common means of FIG. 6.

Turning to FIGS. 6 and 7, a block and timing diagram of the first common means which contains circuitry for performing the LOG, FLOATING POINT, and ANTILOG functions is seen. The common means generally comprises a controller 470, and a bidirectional shift register 472. In the implementation of FIG. 6, a counter 474, an incrementer 476, and a zero detector 478 are all included for expeditiously determining exponent values for the LOG and FLOAT functions and for helping control the shift register in the ANTILOG function. In addition, a pre-shift multiplexer 420 is used to pre-shift the incoming data bits so as to expedite the execution of the functions.

The controller 470 of the common means 430 controls the pre-shift multiplexer 420 and other elements of the first common means 430, and is controlled itself by software for providing the processing of data according to the ADPCM algorithm. In particular, the controller 470 outputs two controlling select bits (IS1 and IS0) to the pre-shift multiplexer as a function of the particular function (LOG, FLOAT or ANTILOG) to be performed as well as a function of the zero detector 478 hereinafter described (and the msb of the log exponent E3 during the ANTILOG conversion). The control bits IS1 and IS0 direct data in register 72 though the proper sections of the pre-shift multiplexer 420 so that the data may be properly preprocessed (pre-shifted) to permit the functions to be expeditiously performed. Thus, as will be described in more detail hereinafter, if a LOG or FLOAT function is to be performed, the sixteen bits are preprocessed in sections A or B of the pre-shift multiplexer. If, on the other hand, an ANTILOG function is to be performed, the bits are preprocessed in sections C or D of the data pre-shift multiplexer 420. As will be appreciated from FIG. 6, the data being loaded in register D 72 is preferably in coordination with the control selects of the LOG, FLOAT, or ANTILOG functions of the controller 470. In this manner, by the time of the next clock cycle, the pre-shift multiplexer 420 will have received control information (IS1 and IS0) from the controller so that it will know how to preprocess the data. The control selects, however, may be applied at some time later after register D 72 has been loaded. In this case, the LOG, FLOAT, or ANTILOG functions will not begin until the application of the appropriate control select.

Two additional control bits (SS1 and SS0) from the controller 470 are used to direct the bidirectional shift register 472 to shift left or right, to hold or to load. Thus, in performing a FLOAT function, it is imperative to determine the location of the left-most bit with a value of "1". One manner of making the determination is by presetting a counter such as counter 474 to the value fifteen, and decrementing the counter each time the sixteen bit number (the msb being the sign bit and not being used for this determination) is shifted one place to the left. The shift decrement operation is then repeated until a logic 1 appears in bit position fifteen of the shift register. The value of the counter 474 is then taken to correspond to the exponent value.

The preferred manner of determining the location of the left-most bit with the value of "1" is to logically OR the seven most significant bits (excluding the sign bit) of the sixteen bit word, as at 478 of FIG. 6. If the result of the logical OR provides a "1", it is known that the left-most logic 1 appears in bits eight through fourteen. If the result of the logical OR 478 is a "0", it is known that the left-most logic "1" appears in bits zero through seven. In this manner, the number of shift cycles is reduced as the sixteen bit word may be preshifted (using the data pre-shift multiplexer 420) by eight bit positions to the left when the OR gate value is "1". Regardless, the output of zero detector 478 is sent to controller 470 (as MSB7) so that the proper pre-shifting and shifting decisions may be undertaken at the data format multiplexer 420 and shift register 472.

Finally, with regard to the controller 470 control signals, the controller outputs output select signals OS1 and OS0 to control the output multiplexer 440 in conjunction with the serial processor output enable signal SRL-EN generated externally of the serial processor. As will be discussed hereinafter, the output select signals permit the processed data to be properly formatted (i.e. post-processed) for output to a desired location.

In accord with FIGS. 6 and 7, the timing and flow of data for performing the LOG, FLOAT, and ANTILOG functions is as follows. During the first cycle, the selection of the LOG, FLOAT or ANTILOG function is accomplished by using external means (e.g. a microinstruction sequencer) to signal the controller 470. At the end of a first cycle, data is loaded in register 72 (Register D) which is selected by the external means. When the external means determines that a function is to be performed, the contents of Register D are sent to the bidirectional shift register 472 via the pre-shift multiplexer 420 by the end of the second cycle. Also, during cycle two, the counter 474 is loaded with an appropriate value (seven [15 bits—preshift of 8 bits] for the LOG or FLOAT operations, or the inverse value of the three least significant bits of the ANTILOG exponent). Cycles three through nine are used to shift data in the shift register and to decrement the counter 474 until the shift enable input into the controller 470 is disabled. From cycle ten onwards, data may be removed from the output data multiplexer 440.

Returning particularly to FIG. 6, if a LOG function is to be accomplished, the bits in register 72 are to be preprocessed in section A or B of the data pre-shift mux 420 depending on whether the a logic "1" is found in bits eight through fourteen of the data. This information is always available to the controller 470, as while the bits are in register 72, bits eight though fourteen are logically ORed at OR gate 478. The output of gate 478 is sent as a control input MSB7 into controller 470. If a "1" is found in bits seven trough fourteen, the fifteen bits occupying positions 0–14 pass through section A of pre-shift multiplexer 420, where bits fifteen and zero are set to zero, and bits 1–14 are kept intact. Also, the output of the zero detector 478 is used as the most significant exponent bit of the LOG function and is set to "1" as bit A10 of the output multiplexer 440 section A. This is in accord with the LOG algorithm where the value of the four bit exponent must be eight (binary 1000) or greater if a "1" is locate in bits 8–14. With bits 1–14 intact in the shift register, the register may be shifted left each clock cycle as long as the shift enable control signal to the controller 470 permits. Before the first shift left occurs, the bit occupying the msb position in the shift register 472 is read, and since bit fifteen was preset to zero, the shift enable input into controller 470 remains active. At the end of the cycle, the down counter 474 is decremented from its initial value of seven to six. As the first shift left occurs, the bit originally in the fourteen bit position moves into the fifteenth bit position (msb) of the shift register 472. If that bit is a "1", AND gate 482 goes high because during a LOG function, the antilog enable control is high. With AND gate 482 high, OR gate 484 goes high, thereby informing the controller 470 via a high shift enable feedback that shifting should not continue. At the same time, the decrementing of the down counter 474 is disabled such that the value of six is maintained. With down counter 474 having a value of six, three bits corresponding to a value "110" would be at the output of the counter 474. These three bits would join the "1" bit which was output at zero detector 478 to form a digital exponent of "1110"; or "14" in decimal notation. It is clear that the maximum LOG exponent would be "14", as the left-most logic "1" which was used for computing the LOG value was in the $2^{14}$ bit position. Hence, the fifteenth bit was preprocessed in the data pre-shift multiplexer 420 to be a zero so that down counter 474 would be counted down by one so that the maximum exponent value of fourteen would be obtained.

If the fourteenth bit was not a "1", it would be appreciated that the procedure of shifting and down counting would continue until a "1" occupied the msb of the shift register 472. At that point, the down counter value expressed digitally would be combined with the zero detector 478 output to provide the four bits representing the LOG exponent. Also, the bits then occupying the fourteenth through eighth bit positions of the shift register output would comprise the mantissa of the LOG value, as the mantissa as previously defined is taken as the seven bits following the left-most "1" value. Thus, as seen in section A of output multiplexer 440, the fourteenth through eighth bits of the shift register 472 are inserted into bit positions A6 through A0, and the complete LOG value is provided. By convention, the LOG value is expressed with sixteen bits: bits fifteen through eleven being set to zero; bits ten through seven being the exponent and bits six through zero being the mantissa.

If the original sixteen bit word which is to be expressed as a LOG does not have a "1" value in bit positions fourteen through eight, the zero detector 478 would register a "0". That result would cause a zero to be located at bit A10 (the msb of the exponent) of the output multiplexer 440, and would also be sent to the controller 470 via the MSB7 control signal. The controller in turn would cause selects IS1 and IS0 to select the B section of the pre-shift multiplexer 420 to preprocess the word in register 72. Thus, the bits occupying bit locations seven through zero would be input into positions fifteen through eight of the shift register 472, and bit positions seven through zero would be set to values of zero. When the msb of the shift register 472 was read, if it was a "1", the active low shift enable signal would be set high via AND gate 482 and OR gate 484 and the down counter 474 would be disabled. Thus, the down counter would read "111" (seven in decimal) as the original word had a "1" value in its seventh bit position. Because the msb of the exponent was already set to zero, the proper value would be obtained. The three bits from the counter 474 would then be entered as exponent bits A9 through A7 in the output multiplexer 440 as previously described, and the seven bit mantissa would also be obtained as previously described. It should be noted however, that when a preshifting of eight bits was provided by the pre-shift mux 420, the seven bit mantissa necessarily includes at least one zero which was not part of the original sixteen bit word but which was supplied by the pre-shift mux itself.

If the msb in the shift register 472 was a "0", rather than a "1", the down counter would be decremented at the end of the clock cycle, and the shift register would shift left. The sixth bit which was originally inserted into the fourteenth bit slot of the shift register 472 would then occupy the msb location and would be read as previously described. If it was also a "0", the process would continue with the fifth bit, the fourth bit . . . until the down counter reached a value of zero. At that point, zero detector 486 would go high, forcing OR gate 484 to go high and causing the shift enable signal to signal the controller 470 to go high and disable further shifting. An exponent value of 0000 and a mantissa value of 0000000 would properly result, as the original word had a zero value.

It will be appreciated that much of the circuitry provided for accomplishing the LOG function is used in carrying out the FLOAT function as afore-defined. Thus, with the FLOAT function, the seven bits occupying bit locations fourteen through eight are logically ORed at 478 so that a control signal MSB7 can be sent to the controller 470 to help the controller determine whether the sixteen bit word held in register 72 should be preprocessed by section A or section B of the pre-shift multiplexer 420. It will be appreciated that the preprocessing of LOG and FLOAT functions is identical, as is the manner of shifting the shift register 472 and decrementing the down counter 474. The primary difference between the LOG and FLOAT functions is that as afore-stated, the exponent for the FLOAT function must be one greater than that of the LOG function. Thus, the msb of the exponent coming from zero detector 478, as well as the remaining three bits coming from down counter 474 are sent to an incrementer 476, where the command to increment is the msb from shift register 472. When the value of the msb of shift register 472 is a "1", a value one is added to the four exponent bits. However, in keeping with the definition for the FLOAT function, the exponent is not incremented if the msb of the shift register 472 is a "0". The FLOAT exponent is then sent to section B of the output multiplexer as bits nine through six. The six bit mantissa which is defined as the left-most "1" value bit in the sixteen bit word and the five bits following that bit is derived either by reading bits fifteen through eleven in the shift register 472 or equivalently by reading bits fourteen through eleven of the shift register 472 and setting the msb of the mantissa to a value of "1". Regardless, the six bit mantissa is placed as bits five through zero in the B section of the output multiplexer 440. It should be noted, that if the value of the original sixteen bit word is zero, the four bit FLOAT exponent will always properly be zero (0000) in accord with the previously described algorithm, as a "1" is not seen at the msb of the shift register 472.

Where an ANTILOG function is to be performed, the word in register 72 is a LOG value with a four bit exponent and a seven bit mantissa. In accord with the provided circuitry, the msb of the four bit exponent (in position ten of register 72) is read by controller 470 at control input E3 to determine whether the word should be preprocessed through Section C or Section D of pre-shift multiplexer 420; the former being used where the exponent msb is a "1", and the latter where it is a "0". Thus, if the exponent msb is a "1", the mantissa occupying bits positions six through zero of Register D 72 are preprocessed by the pre-shift multiplexer 420 to be located in bit positions fourteen through eight of the shift register 472, with bits seven through zero being set to "0" as the value of the exponent dictates that the mantissa is higher than or equal to $2^8$). If the exponent msb is a "0", the mantissa is preprocessed to be located in bit positions six through zero of shift register 472 because the value of the exponent dictates that the mantissa is less than $2^8$. Regardless, in both situations, in accord with the ANTILOG algorithm a bit of the value "1", is inserted in the bit position one higher than the msb of the mantissa. Thus, the pre-shift multiplexer 420 causes bit location fifteen or seven is set to a value of "1" depending on whether preprocessing was through section C or D of the pre-shift mux 420.

While the msb of the exponent determines the manner in which the mantissa is preprocessed, the remaining three bits help determine the number of shifts needed. Clearly, if the exponent was "1110", which would have been the highest number allowable as bit position fifteen is reserved for the sign bit, the mantissa which has had a "1" placed in front of it in bit position fifteen of the shift register 472 requires one shift ("001" binary) to be located properly as the first "1" should be located in bit position fourteen. On the other hand, if the exponent was "1000", the first "1" should occur in bit position eight. Thus, the register 472 should be shifted right seven times ("111" binary). In other words, the register 472 should be shifted right by the value of the inverted remaining three bits of the exponent. Thus, an inverter 492 is provided for inverting the three remaining bits of the exponent. Provided the ANTILOG function is being carried out and not the LOG or FLOAT function, these three inverted bits are used to set down counter 474. The shift register 472 is then shifted right until the down counter reaches a value of zero thereby disabling the shifter. As the shift register shifts right, zeroes are inserted into the msb's of the word located in the shift register. The ANTILOG value is then drawn entirely from the bits fourteen through zero located in the (bidirectional) shift register 472.

Figures 8, 8A:
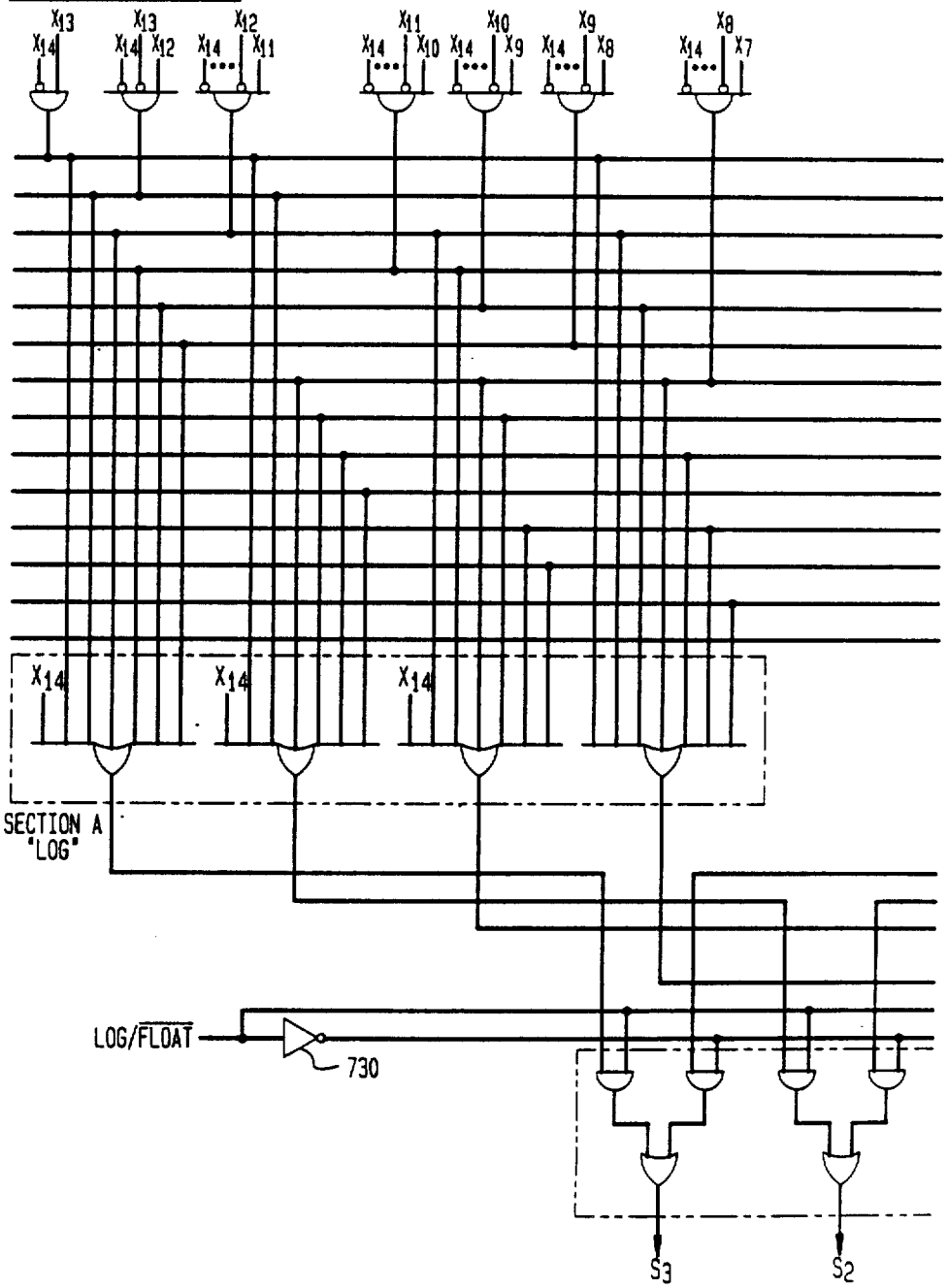
FIG. 8 shows the placement of FIGS. 8A, 8B and 8C which are logic diagrams of an alternative embodiment shifter for the first common means of FIG. 6.
Figure 8B:
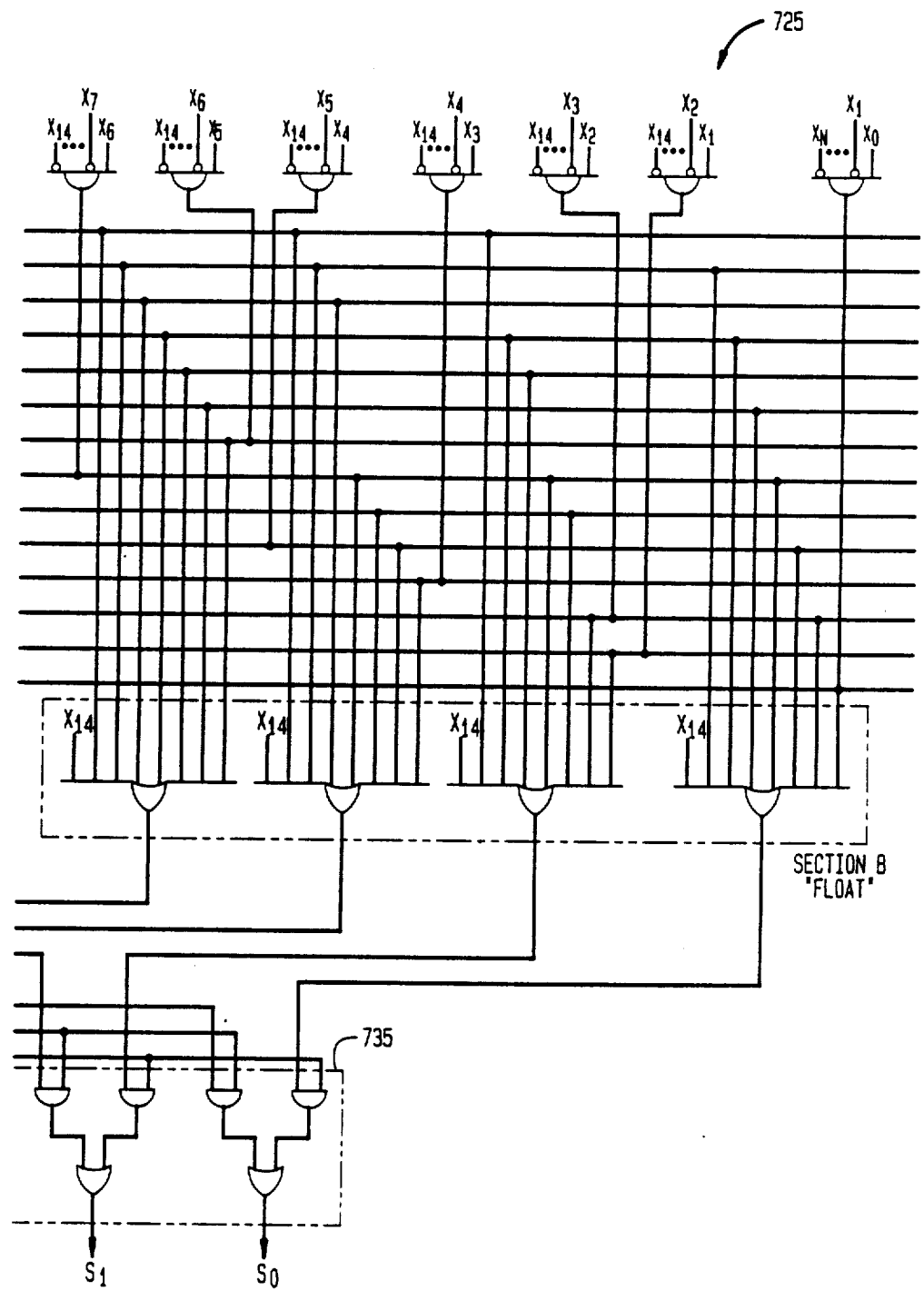
Figure 8C:
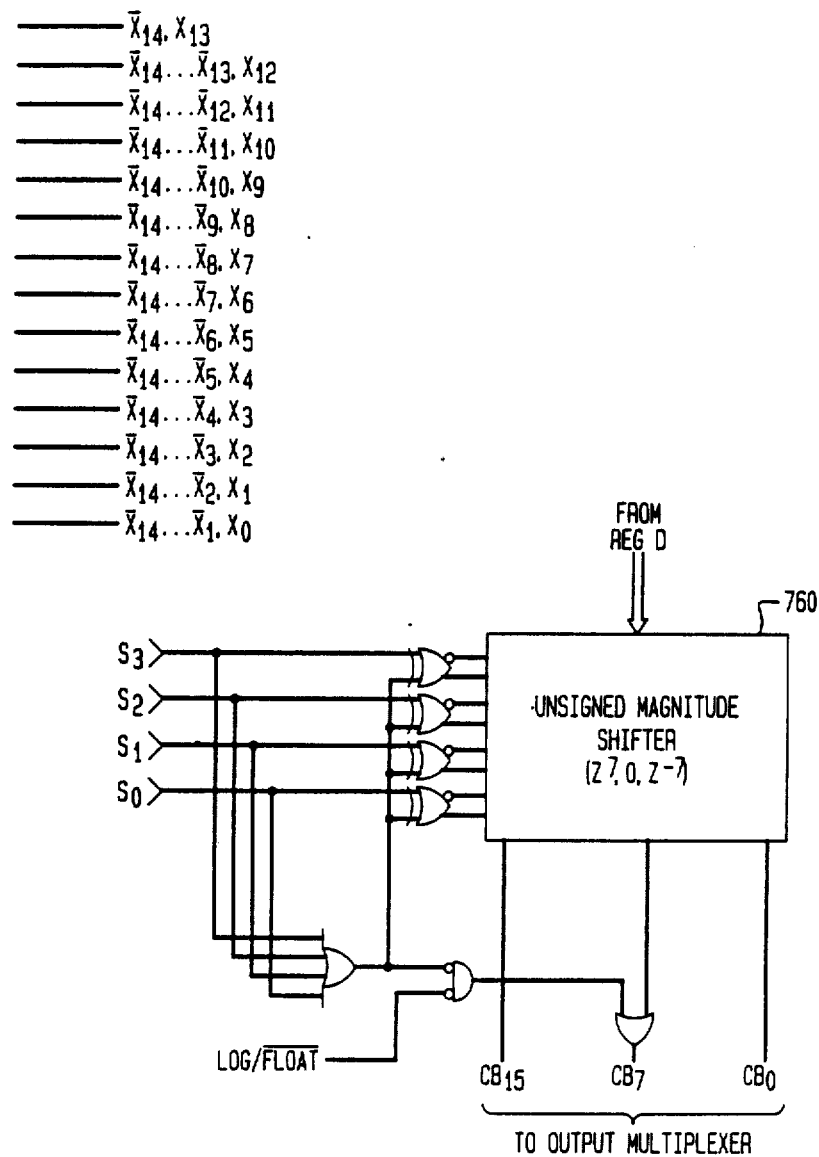

While the circuitry of FIG. 6 is one manner of shifting bits to find the exponent for the LOG and FLOAT operations, it will be appreciated that other means may also be provided. Thus, as seen in FIG. 8, a flash converter 720 utilizes a majority logic encoder 725 to search for the position of the most significant logic bit having a value of one. While the encoder 725 contains numerous AND and OR gates, it is capable of performing its function in a time of on the order of one clock cycle (100 ns). The encoder shown in FIG. 8 contains separate logic sections for the LOG and FLOAT functions as the required exponent of the FLOAT operation is one greater than that of the LOG operation, unless the exponent is zero. Thus, inputs to section A are required to provide the LOG output, while the FLOAT is accomplished by section B of FIG. 8. A logic controller 730 is provided to permit the outputs of section A or B to be processed through AND gate array 735, and the proper exponent is received as bits S3-S0.

In order to obtain the mantissa for the LOG or FLOAT operations for the flesh converter 720, the sixteen bit word N is received by a shifter 760 which shifts the word according to the value of the exponent S3-S0. Thus, for a LOG operation, the mantissa is obtained by shifting the word N by the difference of sixteen and the value of the exponent S3-S0. For the FLOAT operation, on the other hand, the word N is shifted by the difference of fifteen and the value of exponent S3-S0.

Those skilled in the art will appreciate that a flash technique could also be used to implement the ANTILOG function. The magnitude shifter 760 would be used to properly locate the bits in the resulting sixteen bit word.

It will be appreciated that however the LOG, FLOAT and ANTILOG functions are carried out, according to the invention common means are provided so that the similarities of the functions may be exploited. Typically, the common means for performing the LOG, FLOAT and ANTILOG functions will include a shifter of some type, logic circuitry in conjunction with the shifter to accomplish the different functions before and/or after shifting, and a control means for directing the logic means and/or shifter.

Figure 9B:
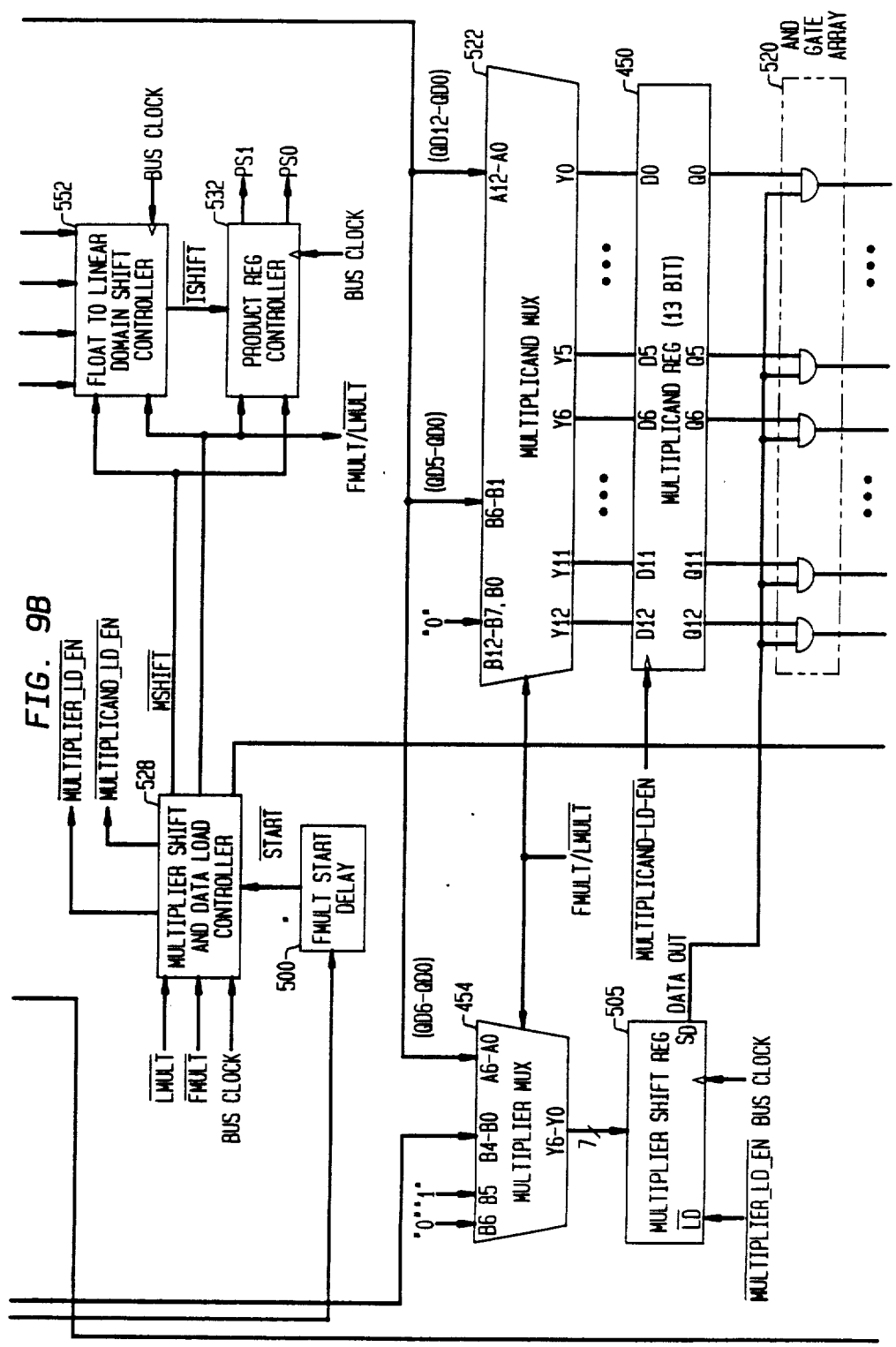
FIG. 9 shows the placement of FIGS. 9A, 9B and 9C which are block diagrams of the second common means of the serial arithmetic processor of FIG. 5.
Figure 9C:
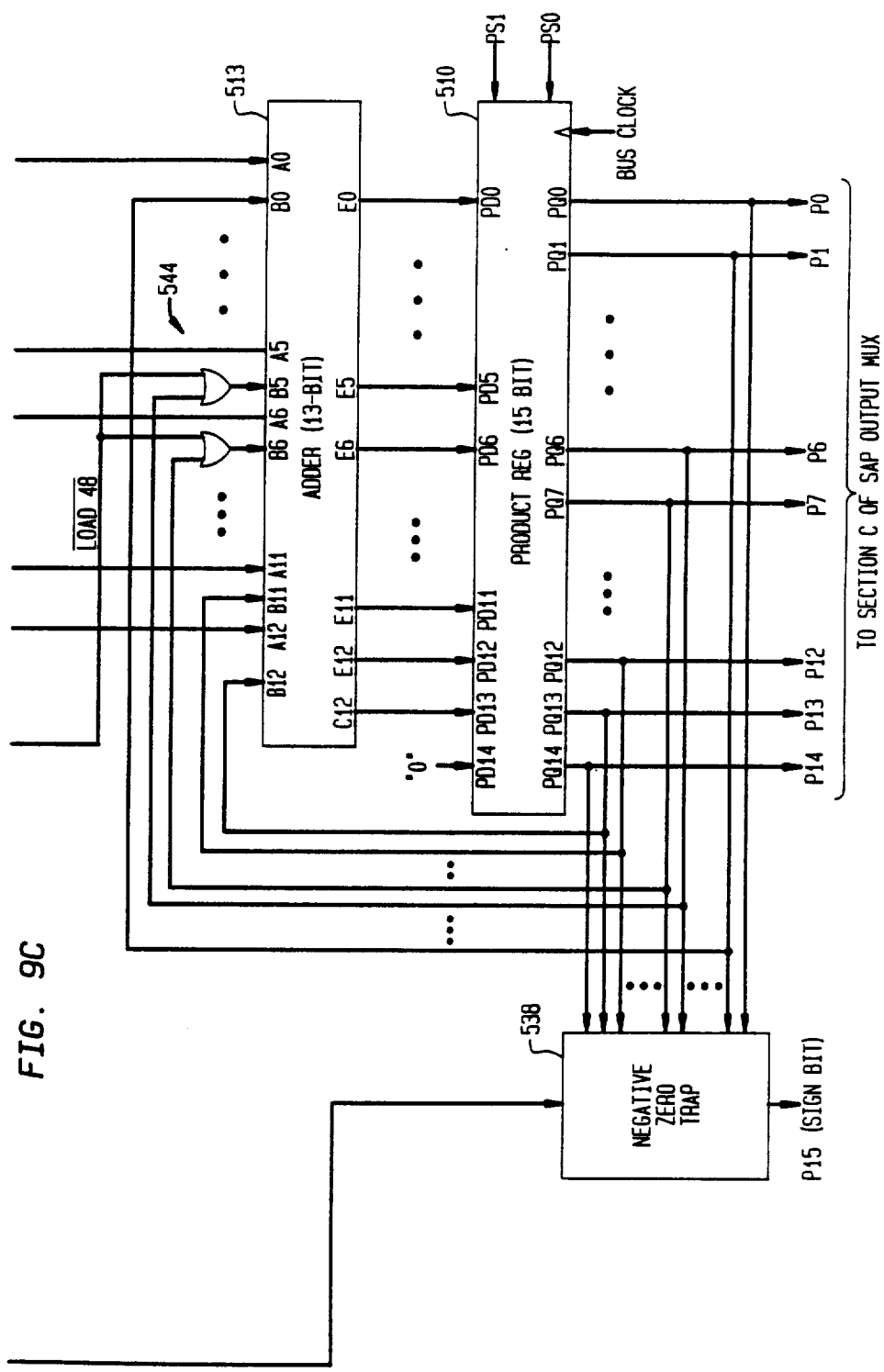

Before turning to FIG. 9, a review of the MULTIPLICATION and FLOATING POINT MULTIPLICATION algorithms which are implemented by the secoond common means is in order. In the MULTIPLICATION algorithm of ADPCM, an eight bit signed magnitude multiplier and a fourteen bit signed magnitude multiplicand are preferably multiplied according to a well known add and right shift technique (although parallel multiplication could be used), where a decision is made either to add the multiplicand to a partial product or to add zero depending upon whether the multiplier digit under consderation is a "1" or a "0". (See, e.g. Hayes, J. P. "Computer Architecture and Organization", *Computer Science Series*, McGraw Hill (1978, pp. 88-90). In multiplying two digital numbers, the number of resulting bits equals the sum of the length of each number. Thus, because in effect the MULTIPLICATION algorithm multiplies a seven bit magnitude word by a thirteen bit magnitude word, a twenty bit product results. According to the algorithm, the six least significant bits are truncated from the twenty bit word to provide a fourteen bit product, and the sign bit is attached thereto.

While the signed magnitude MULTIPLICATION algorithm is very straight-forward, the FLOATING POINT MULTIPLICATION algorithm is more intricate. Thus, a four bit exponent by six bit mantissa multiplicand is multiplied by an identically arranged multiplier, and the floating point product is then converted into a signed magnitude format. The algorithm for accomplishing the same is as follows:

partial product and for providing a shifted final product, an adder 515 for adding the multiplicand to the partial product, and a gating means 520 for controlling the addition of either the multiplicand or zero with the partial product depending on the multiplier digit under consideration.

Figure 10A:
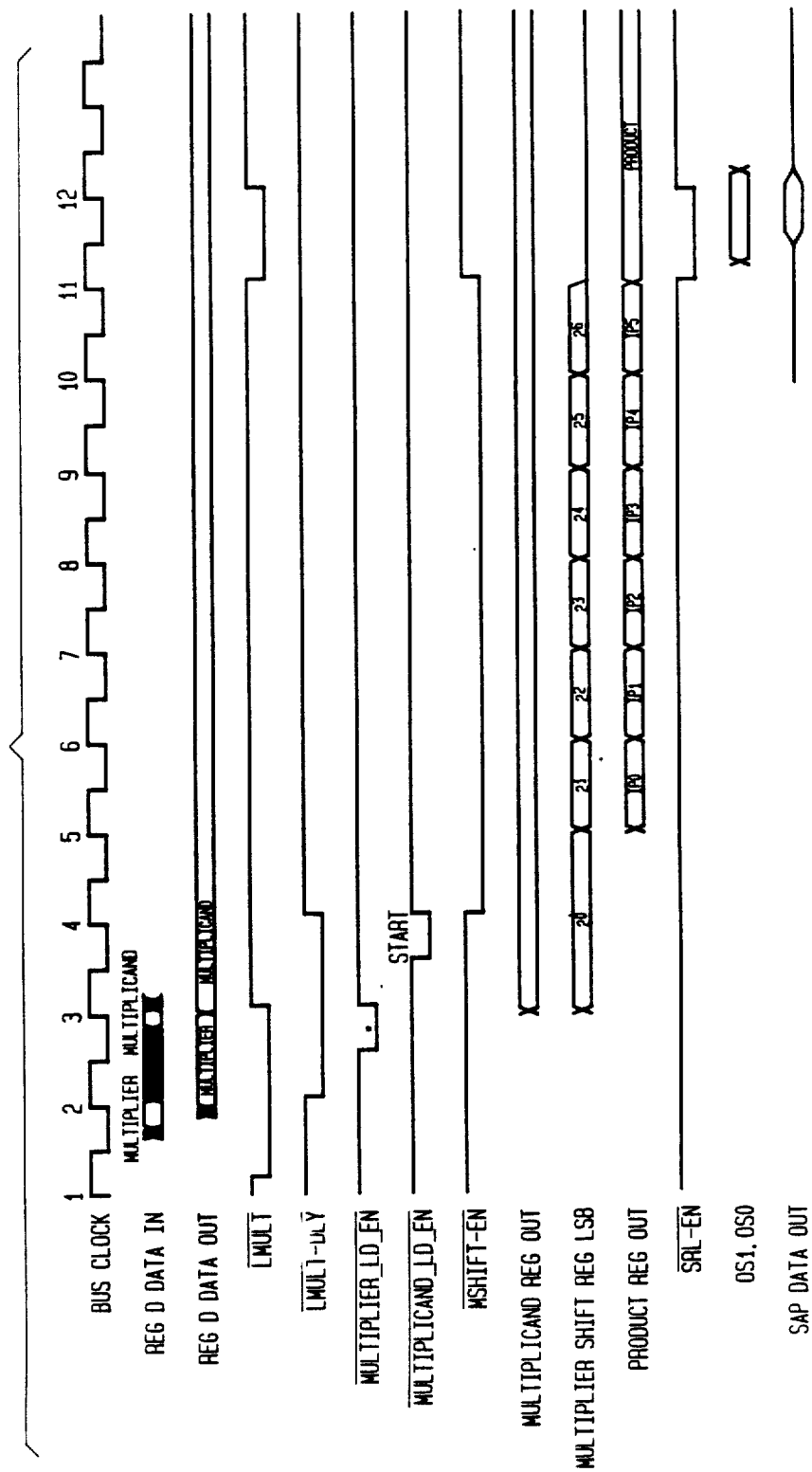
FIG. 10a is a timing diagram for carrying out an eight by fourteen bit signed mangitude multiplication in the second common means of FIG. 9.

In accord with the detailed circuitry of FIG. 9, the timing diagram of FIG. 10a, and the ADPCM algorithm, in performing a MULTIPLICATION a seven bit magnitude taken as the multiplier is read from Register D 72 and loaded via section A of the multiplier select multiplexer 454 into the multiplier register 505 under the control of the active low mulitplier load enable signal (MULTIPLIER-LD-EN). At another point in time, a thirteen bit magnitude taken as the multiplicand is read from register 72 and loaded via section A of the multiplicand select multiplexer 522 into the multiplicand register 500 under the control of the active low multiplicand load enable signal (MULTIPLICAND-LD-EN). The multiplier and multiplicand are processed separately. The control signals MULTIPLIER-LD-EN and MULTIPLICAND-LD-EN are derived as a result of the external active low LMULT signal applied while register 72 was being loaded or at some other time. The first presentation of the LMULT signal causes MULTIPLIER-LD-EN to be generated while the second presentation causes MULTIPLICAND-LD-EN to be generated. The act of reading the partial product register 510 ensures that the presentation of LMULT will generate the proper signal and eliminates the possibility of the control signals being out of sequence.

The control signals MULTIPLIER-LD-EN and MULTIPLICAND-LD-EN are both generated from a delayed version of the LMULT signal which is called LMULT-DLY and which occurs one clock cycle after LMULT to ensure that data read from register 72 has settled. The multiplication process is initiated by the rising edge of the MULTIPLICAND-LD-EN signal which in turn generates an active low shift enable signal called MSHIFT-EN which controls the updating of the partial product register 510 via the product register controller 532.

Initially, the partial product register 510 is set to zero. At a clock cycle, the least significant bit of the multiplier in multiplier register 505 is read along with the bits in the multiplicand register 450 by AND gates 520. If the least significant bit of the multiplier is a "0", clearly, all the bits entering adder 515 will be "0" because regardless of the value of the bits in the multiplicand register 450, the AND gates 520 will only go high if

```
SIGN =   SIGN (MULTIPLIER) XOR SIGN (MULTIPLICAND)
EXP  =   EXP (MULTIPLIER) + EXP (MULTIPLICAND)
MANT =   [(MANT (MULTIPLIER) × MANT (MULTIPLICAND) + 48) > >4]
         where the value in [ ] is > >(19 - EXP) if EXP < =26
         or the value in [ ] is < <(EXP - 19) & 32767 if EXP > 26
```

A second common means 460 for carrying out the signed magnitude MULTIPLICATION and the FLOATING POINT MULTIPLICATION is seen in FIG. 9, and basically comprises a multiplicand register 450, a multiplier register 505 capable of being shifted, a shiftable partial product register 510 for holding the both inputs are high. On the other hand, if the lsb of the multiplier is a "1", it will be appreciated that the the AND gates 520 will provide the identical value stored in the multiplicand register 450. Regardless, the value exiting the AND gates 520 is added in adder 515 to the value of bits located in the partial product register 510. A "shift right" is accomplished by requiring that the bit added to the n'th bit exiting the n'th AND gate 520 is added to the n+1'th bit of the partial product register.

On the next clock cycle, the bits in the multiplier register 505 are shifted such that the second lsb now occupies the lsb bit position. As before, the value of the now lsb is ANDed at 520 with the multiplicand, and the resulting values are sent to adder 515. At adder 515, the new set of bit values are added to the partial product contained in the partial product shift register 510. Of course, again the n'th bit from AND gates 520 is added to the n+1'th bit from the register 510, with the fourteenth bit (PD13) of the product register being determined according to any "carry" necessary by the bits in the thirteenth bit positions. This course is repeated six times until the seventh bit is read from the multiplier register 505 and processed. The procedure is then stopped by the control signal MSHIFT going high which results in new signals from the product register controller 532. The control signals PS1 and PS0 from the controller 532 tell the product register 510 to hold the partial product as a final product.

It will be appreciated, as stated above, that causing the n+1'th bit of partial product register 510 to be added to the n'th bit of the multiplicand register automatically causes a right shift to occur. It will also be appreciated that the least significant six partial product bits shifted to the right are not retained in the partial product register, and that only a truncated product of fourteen bits will occupy bit positions thirteen through zero of the partial product register. This is in accord with the ADPCM algorithm which requires such a truncated fourteen bit product. In addition, a fifteenth bit of the partial product register will be of a value zero since the input to the register is set to the zero value. Further, a sixteenth bit, the sign bit, is determined by taking the sign bits of the multiplicand and the multiplier, and performing an exclusive OR (XOR) logic operation on them as seen at 536. The result is then sent through a negative zero trap 538 where a check is made to guarantee that a sign bit indicative of the negative and a word of all zeroes is not output because such an output would be indicative of a maximum negative value in two's complement when a conversion from signed magnitude to the two's complement is undertaken using the CVT microinstruction of the MIS and PALU. Thus, the negative zero trap 538 switches the sign bit to a positive value for zero in such a case. The sign bit output of the negative zero trap 538 and the fifteen bit output of the bidirectional partial product shift register 510 are then sent as a sixteen bit word to the output multiplexer 440 of FIGS. 5 and 6 such that the result may be directed to a desired location.

In performing a FLOATING POINT MULTIPLICATION, the multiplier and multilicand must be in floating point format prior to the multiplication. In the ADPCM algorithm, the floating point multiplicand is used a number of times, and therefore the floating point value for the multiplicand is stored in RAM for use when needed. Because the multiplier value is typically changing (as opposed to the multiplicand), the multiplier is not stored as a floating point value. Thus, prior to a FLOATING POINT MULTIPLICATION, the signed magnitude format multiplier must be converted into a floating point representation. Thus, in accord with the afore-described FLOAT operation, the value is so converted. While the multiplier is being converted into floating point representation, the floating point multiplicand may be loaded into Register D and then loaded into multiplicand register 450 via section B of the multiplicand select multiplexer 522. Section B receives the six bit mantissa of the floating point multiplicand (located in bit positions five through zero of the sixteen bit word) and locates them in bit positions six through one. The four bit exponent of the multiplicand (in bit positions nine through six) are sent to adder 542, and the sign bit (bit position fifteen) is sent to sign calculator 536.

Because the floating point multiplier might not be available when the multiplicand is loaded into the second common means, it is necessary to provide a delay before starting the multiplication process. The delay is provided by a FMULT delay controller 500, which generates a START signal when it detects that the SHIFT-EN signal controlling shift register 472 of FIG. 6 has gone high (i.e. the FLOAT operation of the first common means has been completed). The START signal in turn enables the MSHIFT-EN signal which starts the multiplication process. The multiplication process is permitted, because when the FLOAT operation is terminated, the floating point multiplier value is transferred from the shift register 472 of the first common means to the multiplier register 505 of the second common means via section B of the multiplier select multiplexer 454. Thus, the bits in bit positions fourteen through ten of the shift register 472 are placed in bit positions four through zero of the multiplier register 505 where bit position five is set to a logic "1" as the msb of the mantissa of a floating point representation is always a one as previously described. Bit position six in the multiplier register 505 is set to zero. In a similar manner, the four bit floating point multiplier exponent and the sign bit are received from the first common means of FIG. 6 and are respectively sent to the adder 542 and the sign calculation means 536, where a determination of the product and sign is had.

In the multiplication process, the mantissas as loaded in the multiplier register 505 and multiplicand register 450 may be multiplied by using AND gates 520, adder 515 and the bidirectional partial product shift register 510 as afore-described with reference to the signed magnitude MULTIPLICATION function. It will be noted that in accord with the ADPCM algorithm, the value of forty-eight (110000 in binary) is added to the partial product by initially presetting bit locations five and six of the adder 515 equal to one and adding them to the value proceeding through AND gates 520. In this regard, OR gates 544 are used to load the forty-eight value into the adder 515 under the control of a Load-48 control signal.

Figure 10B:
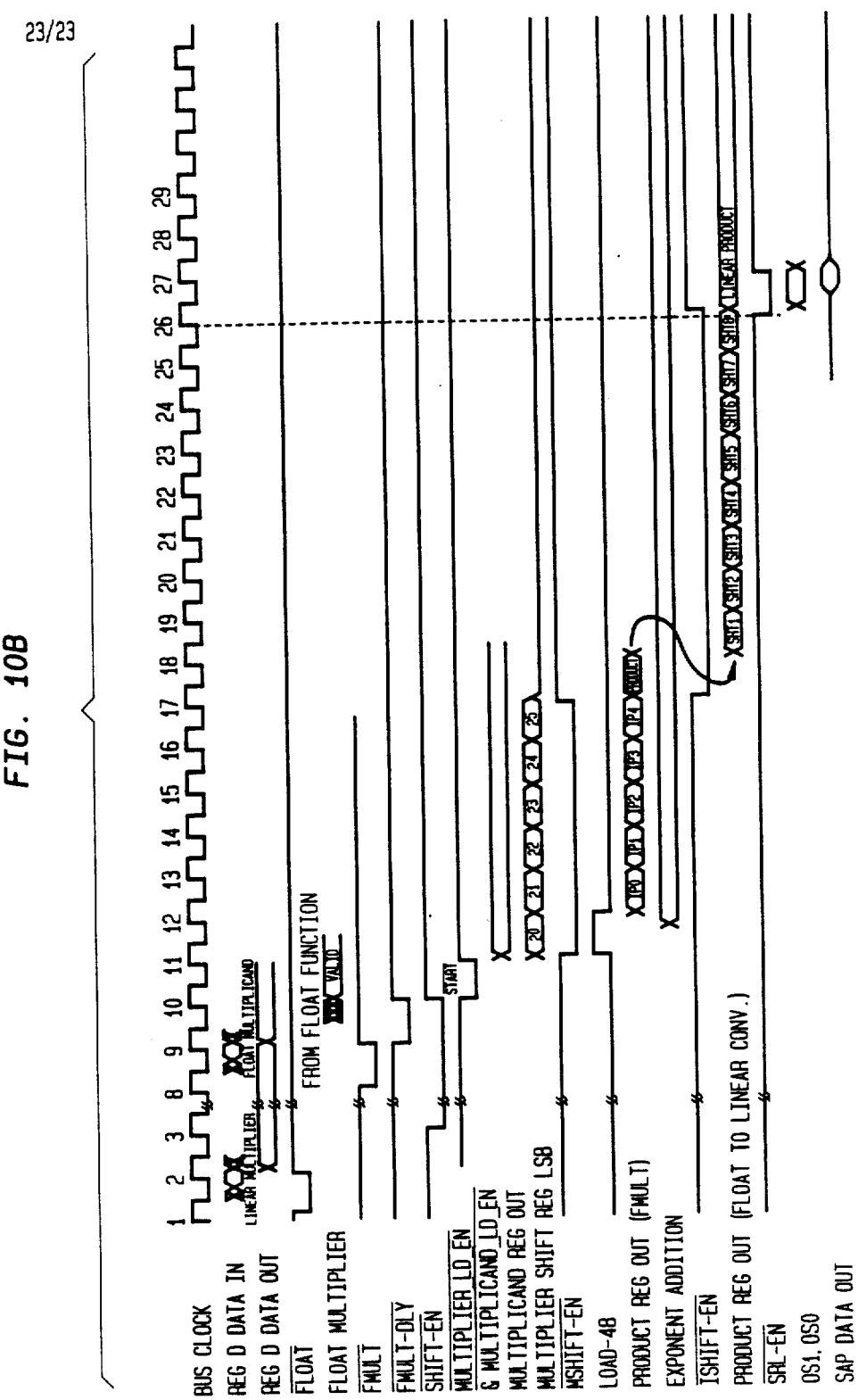
FIG. 10b is a timing diagram for carrying out a floating point multiplication in the second common means of FIG. 9.

Once the multiplication of the mantissas and the addition of the value forty-eight have taken place, a twelve bit product is situated in bit locations PQ1 through PQ12 of the partial product register 510. Then, accordinng to the ADPCM algorithm, the product must be converted to a linear domain representation by shifting the mantissa product as afore-described. Thus, the exponents of the floating point represented words are added at adder 542. The value nineteen is then subtracted from the value of the exponent sum at 546. The resulting value is then limited at limiter 548 to at most a value of nine and at least a value of minus eight. The value in register 548 is then used to control via controller 532 the direction of shifting of the partial product register 510, and via shift duration controller 552 the number of shifts of the bidirectional partial product shift register 510. As is indicated in FIG. 9 at duration controller 552 and in FIG. 10, the duration controller 552 outputs a control ISHIFT which uses the value of limiter 548 to shift the partial product register 510 (i.e. the duration of ISHIFT=EXP(MULTIPLICAND)+EXP(MULTIPLIER)+19, such that $-9 < \text{ISHIFT} < 10$, with the sign of the added exponents determining the direction of shift; a positive value indicating a left shift and a negative vaue indicating a right shift). The thus-shifted linear product value is then subjected to a logical AND operation with the decimal value 32767 (0111111111111111 in binary) as required by the ADPCM algorithm by limiting the length of the partial product register 510 to fifteen bits. Thus, the values that could occupy bit positions fifteen and sixteen given a maximum right shift are negated (by being lost, i.e. shifted out of the register) and the values located in bit positions fourteen through zero are retained. The sign bit is meanwhile determined via circuitry 536 in the same manner as the signed magnitude MULTIPLICATION sign bit, and is processed through negative zero trap 538 to provide the sign bit. As was the case with the MULTIPLICATION function, the sign bit output of the negative zero trap 538 and the fourteen bit output of the bidirectional partial product shift register 210 are sent as a sixteen bit word to the output multiplexer 440 of FIGS. 5 and 6 such that the result may be directed to a desired location.

Those skilled in the art will recognize that the second common means which performs the MULTIPLICATION and FLOATING POINT MULTIPLICATION functions is able, if desired, to operate concurrently with the first common means which performs the LOG, FLOAT and ANTILOG function. In particular, in conducting the FLOATING POINT MULTIPLICATION, a multiplier value may be converted to a floating point format by the FLOAT function while the multiplicand is being loaded into the multiplicand register. In this manner, an efficient implementation of the PREDICTOR of the ADPCM algorithm may be had as the FLOAT and FLOATING POINT MULTIPLICATION operations are interleaved. It will also be appreciated that the second common means is efficient in that the FLOATING POINT MULTIPLICATION and signed magnitude MULTIPLICATION functions use much common circuitry in their execution.

There has been described and illustrated herein a serial processor capable of conducting various ADPCM functions, including LOG, ANTILOG, FLOAT, MULTIPLICATION, and FLOATING POINT MULTIPLICATION. While particularly circuitry has been set forth and described, it will be appreciated that various other means for accomplishing the same will be within the grasp of those skilled in the art. For example, while the second common means of the invention was described in terms of a signed magnitude multiplication, the multiplier and multiplicand could be in two's complement form, and the appropriate circuitry could be provided to carry out the multiplications. Thus, it should be appreciated that the thrust of the invention is the understanding that at least large portions of the LOG, ANTILOG, and FLOAT functions can all be performed using common circuitry (first common means), and that large portions of the MULTIPLICATION and FLOATING POINT MULTIPLICATION functions can also be performed using common circuitry (second common means). While another aspect of the invention is that the first common means and the second common means may be processing information in parallel, particularly where a FLOATING POINT MULTIPLICATION is to be accomplished, it will be appreciated that other arrangements might negate the benefits of such an arrangement. For example, if a flash converter were used to perform the LOG and FLOAT functions such that the function could be accomplished in just a few clock cycles rather than the ten required by the arrangement provided, it will be appreciated that a flash converter could be located at the output of register 15. Thus, the first common means could be located in a sequential manner rather than in a parallel manner with the second common means, such that the first common means would be accessible as required, and bypassed when desired. Controls would be used to send the output of the first common means to a desired location such that for the FLOAT, LOG, and ANTILOG functions, the output would be sent to output multiplexer 120, except where the FLOAT function was being utilized as part of a FLOATING POINT MULTIPLICATION. In that situation, the output of the first common means would be sent to the multiplier register 205 as well as the adder 242. Likewise, if a LINEAR MULTIPLICATION function was to be accomplished, or if a floating point value of the multiplicand was to be loaded, the first common means would be bypassed and the information from register 15 would be directed to the second common means. Therefore, it will be apparent to those skilled in the art that other changes and modifications may be made to the invention as described in the specification without departing from the spirit and scope of the invention as so claimed.

THE MICROINSTRUCTION SEQUENCER

In accord with the preferred embodiment of the invention, a microinstruction sequencer 20 for a digital signal processor capable of performing the ADPCM algorithm is seen in FIG. 1. At the heart of the MIS 20 is a one thousand twenty-four by twenty-nine bit (i.e. one thousand twenty-four words of twenty-nine bits in length, where bit position twenty-eight is the location of the msb and bit position zero is the location of the lsb) microinstruction ROM 25 which controls the performance of the ADPCM algorithm, and a microinstruction decoder 30 which receives the twenty-nine bits of each ROM word into its various registers and forwards the information as control information or data to various destinations. As will be described in detail hereinafter, the microinstruction decoder 30 preferably includes a multiplexer which is used in one of the MIS sequencer 20 fields for selecting one set of bits from a plurality of sets of bits in the ROM word which are used to instruct an arithmetic-logic unit 40. The multiplexer is preferably controlled by the microsequencer controller 32 which also controls other circuitry of the MIS 20.

Before reviewing the microinstruction fields (such as the conditional field) and the capabilities of the MIS of the invention, a review of the other circuitry of the MIS is useful. Thus, the microinstruction sequencer 20 of the invention preferably includes a microinstruction address register 33 for locating the ROM pointer and an incrementer 34 for incrementing the value of the microinstruction address register 33 and ROM pointer with each clock cycle. Further, to help permit subroutines to be able to be carried out, a four level last-in-first-out stack 36 is provided for storing "next" addresses. In this manner, when the ROM program calls a subroutine at another location, the next address which is produced by the incrementer 34 is stored in the stack 36. When the microinstructions (29 bit words) of the subroutine are completed and a "return" command is issued, the microinstruction address register 33 is loaded with the address from the top of stack 36. Finally, a microinstruction next address multiplexer 38 is provided to permit only one of the four-level stack 36, the incrementer 34, the ROM 25 (in the form of a direct address) and a data bus 39 to provide the information for updating the microinstruction address register 33. It will be appreciated that the four-level stack 36 and the microinstruction next address multiplexer 38 are both under the control of the microsequencer controller 32 which as aforestated also acts to control a multiplexer in the microinstruction decoder 30. The microsequencer controller 32 is in turn controlled by flags which are set by circuitry external to the MIS 20.

Of the twenty-nine bits exiting ROM 25 with each clock cycle, the two most significant bits are preferably reserved for defining the field of the microinstruction. Thus, field zero ("00") has been set as the arithmetic, logical and data move field; field one ("01") as the branch field; field two ("10") as the immediate data field; and field three ("11") as the conditional arithmetic field. The mnemonic and corresponding function of the arithmetic, logic, and data move capabilities (field "00") of the MIS of the invention are set forth below in Table 1a, and the bit assignments for the same are seen in Table 1b. Likewise, the mnemonics and corresponding functions and bit assignments of the branch, immediate data, and conditional arithmetic fields are seen respectively in Tables 2a and 2b, 3a and 3b, and 4a and 4b below, while secondary field microinstructions which may be embedded in (i.e. occur in parallel with) the microinstructions of fields zero and two, and the bit assignments therefor are set forth in Tables 5a and 5b. In all fields, the following symbols and abbreviations are used:

| symbol | meaning |
| --- | --- |
| sh | magnitude shift value in the range of $+4$ to $-8$ |
| dd | destination registers (A, B, C, D) or combination |
| mm | direct data memory address |
| n | direct branch address |
| * | bus data |
| i | set $i=J$ for Jump, $i=C$ for Call, or $i=R$ for Return |
| N | if N is not present then condition is true; if N is present then condition is false |
| b | sixteen bit immediate data value |
| < > | items within brackets are user defined |
| [ ] | items within brackets are optional |

Particularly, with regard to the shift "sh" function, a shift left (positive shift) is denoted by the letter L, while a shift right (negative shift) is denoted by the letter R. Also, one to four register destinations may be specified when the register destination "dd" is set forth. Further, with regard to the letter N, if a mnemonic includes the letter "N" at the end thereof, the logical NOT of the mnemonic is carried out. If the letter "N" is not in the mnemonic, the mnemonic stays intact, i.e. the mnemonic condition is true.

As will be appreciated with reference to Tables 1a and 1b, standard arithmetic and logic commands associated with many DSPs are found in the microinstruction set of the MIS 10 of the invention. For example, addition, subtraction, absolute value, negation, incrementation, no operation, etc. are all specified as microinstruction, as are the logical microinstruction OR, AND, and XOR. In addition, a non-standard operation CVT is specified as performing a two's compliment to signed magnitude conversion or vice versa.

As an example of the arithmetic functions available and the manner in which the ROM has been coded to instruct the same, the twenty-nine bit code for the arithmetic ADD function seen in Table 1a as ADD <sh,dd> is found in Table 1b as:

$$00\ 0010-SH---DD-00$$

As previously mentioned, the first two ("00") bits define the field to be the arithmetic, logical and data move field. The next four bits "0010" in the I26-I23 bit positions uniquely define the arithmetic function to be the addition function (although as will be seen hereinafter, those four bits alone do not uniquely define all operations in field "00" as the "no operation" and some of the "data move" functions all share the same I26-I23 code). The bits in bit positions I22-I19 are then used to define the shift SH by which the contents of Register A of the PALU 40 will be shifted. As will be appreciated, since shifts of $+4$ to $-8$ are allowed, the thirteen possible values may be easily represented uniquely by the provided four bits. While the addition function supports a desired shift, those skilled in the art will recognize that various of the arithmetic operations (e.g. negation, absolute value, incrementation, etc) do not permit a shifting because the functions operate on a value located in other than Register A. Thus, for those operations, the value "0100" which corresponds to a shift of zero is specified and is located in bit positions I22-I19.

Bits I18-I15 of the twenty-nine bits operational code word for the addition function are used to signify the destination of the sum, and for the provided embodiment can comprise registers A, B, C and D. As seen by Table 1b, if the register is to receive information, the bit value for its corresponding bit location is set to zero. Of course, with the no operation function, the destination bits I18-I15 are all set to a value of one as no information is being sent to the registers because no operation is being performed. In this manner, the no operation function may be distinguished from the other data move functions, as all four bits of I18-I15 are set to a value of one for the no operation function, while for the other data move functions such a result will never arise.

Bits I10-I6, and I5-I0 of the addition function are left for secondary microinstructions which will be discussed in more detail hereinafter. Bits I14 and I13, which are left undefined in the addition function, are sometimes used with reference to secondary microinstructions, and sometimes to distinguish data move commands as will be discussed in more detail hereinafter. Finally, bits I12 and I11 contain a two bit select code which enable the output bus drivers of various blocks of the DSP including: the PALU; the serial processor; the immediate ROM data port; or the RAM, I/O ports and register C (all seen with reference to the FIG. 1). Thus, where an addition function is being carried out, the arithmetic-logic unit output bus driver will be enabled as it is the PALU which will conduct the addition of the values in the two registers associated therewith. Likewise, the sum of the values will be sent from the PALU to the specified registers.

As seen in Table 1a, not only are arithmetic and logic functions included in field "00", but data move commands are likewise included. The data in any of four registers, two data ports, or in a location of the data RAM, may be sent to any of registers A, B, C, and D. In addition, the data in a RAM location which may be specified by an address value from the ROM (LDM command) or specified by the value on a bus (LDMB command) may be sent to any of the four registers A, B, C, and D. Also supported is the data move of the compliment of the data and data moves with shifting of the data in register A.

The data move commands as outlined in Table 1b primarily rely on bits I26-I23 and I14-I11 to distinguish among them. Thus, because only a few subcombinations for bits I26-I23 uniquely remain in field "00" after the arithmetic and logical functions are defined, only three data move functions are uniquely identified by those bits. However, the remaining data move functions (except for LDM and LDMB) are identified uniquely by defining bits I14-I11 or a subcombination of those bits. The LDM and LDMB functions are defined uniquely, as seen in Table 1b, by requiring that the bits I10-I16 and I5-I0 differ in the two functions. In the LDM microinstruction, the data stored in the RAM memory location defined by bits I5-I0 is loaded into the registers set forth in bits I18-I15 (bits I10-I6 being reserved for secondary microinstructions), while in the LDMB microinstruction bits I10-I6 are specified uniquely to indicate that the RAM memory location must be defined by the value on the bus at the end of the cycle. It will be appreciated, therefore, that the LDMB microinstruction is in effect a primary microinstruction having a secondary microinstruction component.

Because all of the field "00" microinstructions with the exception of the LDMB command can be used in conjunction with a secondary microinstruction, a review of the secondary microinstruction set seen in Tables 5a and 5b is in order. In all cases, identification of the secondary microinstruction is gained by decoding bits I10-I6 as thirty-two such secondary microinstructions could be uniquely identified by the five bits. Among the secondary microinstructions are control instructions to control hardware, and in particular the serial processor of the DSP. The control instructions control an initiation of a LOG function, ANTILOG function, FLOATING POINT CONVERSION function, SIGNED MAGNITUDE MULTIPLICATION function, and FLOATING POINT MULTIPLICATION function, as well as selecting the appropriate output from the serial arithmetic processor. These particular functions are described in great detail with regard to the serial processor of the DSP. The control field in the secondary microinstruction set further permits the setting of various flags as desired, as well as the selection of pages zero and one (for ADPCM encoding and decoding) of RAM 60 of the DSP.

A second field of the secondary microinstruction set includes data output instructions which control the selection of data output ports three and four (90 and 92) of the ADPCM VLSI device. Finally, the secondary microinstruction set includes a third field which allows the RAM of the DSP to be updated. As seen in Tables 5a and 5b, the RAM address identified is updated either directly or through a bus directed technique with the bits located in locations I5-I0 defining the RAM location (i.e. data memory address) to receive the information stored in an associated register (register C) or found on the data bus. In particular, the STC microinstruction causes the RAM address specified in the operand to be updated with the value stored in register C. The STCB microinstruction causes the RAM address specified by the value on the data bus from the previous cycle (i.e. the current cycle is being executed) to be updated with the value stored in register C. In the ST microinstruction, the value on the bus is stored in the RAM address specified by the operand, while in the STB microinstruction, the value on the bus is stored in the RAM address specified by the value on the data bus from the previous cycle. It will be appreciated that where the RAM is being updated, values of zero are placed in bit positions I14 and I13 in the primary microinstruction which is in parallel with the secondary microinstruction. The reason for defining bit positions I14 and I13 in this manner is that those two bits are used within the RAM section 60 to decode which of the RAM 62, Register C 64, and Ports 1 and 2 (84 and 82) are to drive the RAM bus.

Returning to the primary microinstruction fields, the branch field, with its operations and bit assignments being defined in Tables 2a and 2b respectively, is identified by bits "01" in the two msb's of the twenty-nine bit words issuing from the ROM. The branch field supports both unconditional and conditional branching including both conditional and unconditional jumps, calls, and returns. All branching (except for the RTEI and RTDI commands which also set flags and represent the end of the encoding and decoding algorithm sections of the code) is identified in field "01" by setting both bits I26 and I25 to values of one. In addition, the branch field supports commands which clear the encoder and decoder interrupt flags of the ADPCM DSP, as well as a command which resets the microinstruction address register. These operations, and the RTEI an RTDI comands are identified by bits I26, I25, I10, and I9 as seen in Table 2b. The branch field, however, does not support secondary microinstructions.

Unconditional branching is identified by setting bits I8-I4 to the value "01111", while conditional branching will have many different values in those bit positions but never that particular value. The particular unconditional branch operation (i.e. any of two "jump", two "call", or three "return" operations) is defined by bits I3-I0, with all three return operations sharing the same I3-I0 code but with different I26 and I25 values as previously stated. Thus, a "jump" operation dictated by the operational code leaving the ROM is given a code 1001 in bits I3-I0. The address in the ROM to which the program is to jump is dictated by ten bits (I24-I15) which can generate any of the 1024 twenty-nine bit word direct address locations. If the jump operation is dictated by the value on the bus (JUMP * operation having a code 0001 in bits I3-I0), the value on the bus is taken to be the location in the ROM to which the ROM pointer must be set. In addition, where values are to be obtained from a bus, (for both conditional and unconditional branch operations) bits I14-I11 are set to "0010".

Turning to the conditional branch operations set forth in Tables 2a and 2b, it is seen that the conditional branch microinstructions include "IF-THEN-JUMP", "IF-THEN-CALL", and "IF-THEN-RETURN", with the conditionals (i.e. IF) being flag inputs derived from the PALU 40 and the I/O circuits 80. Bits I28 and I27 set forth the branch field, with bits I26 and I25 set to values of one to indicate a branch operation. Bits I24 through I15 set forth the location in ROM to which the ROM pointer is to be set if the condition set forth in bits I8 through I4 is met. Bit I8 in the conditional branch operations is reserved for permitting the opposite of the function (i.e. NOT) to be performed rather than the specified function itself. Thus, if the mnemonic set forth in Table 2a includes an N, bit I8 (N) is set to a value of "1" to indicate that the NOT of the mnemonic is to be accomplished. Otherwise, bit I8 is set to a value of "0". Also, it should be noted that in six circumstances, bit I8 is determined by the XOR of a preassigned value and the value of N which is set to "1" if the NOT is to be accomplished and to "0" otherwise.

In the conditional branch operation, bits I7 through I4 are used to uniquely define most of the operations. However, because eighteen different conditional branch operations are specified, and only fifteen different combinations of bits I7 through I4 are available (0111 having been used to specify an unconditional branch), three conditional branch operations must share the same I7 through I4 code with three other operations. Thus, bit I8 which as aforedescribed is used for negation is used to distinguish among the operations in each of the three pairs. Since mnemonic pairs iPSA (if register A is positive) and iNGA (if register A is negative), and iPSB (if register B is positive) and iNGB (if register B is negative) are already the negatives of each other, the sharing of bit I8 has no effect at all, as the XOR of bit I8 with the value "1" where the NOT is desired simply gives the code of the other function of the pair. Likewise, with regard to iMLW and iALW which share code "1000" in bits I7 through I4, it will be understood that if A-Law is not be utilized in the ADPCM algorithm, then mu-Law is being utilized, and vice versa.

Further defining the conditional branch operations, it will be seen that bits I10, I9 an I2 are used to set the branch function which is to be implemented. Bits I10 and I9 are particularly used to control the microinstruction next address multiplexer 38. Thus, if bits I10 and I9 are both zero, the next address multiplexer 38 clears or resets the address register 33. If the bit values are "01", such as in the normal sequence of microinstructions and where the encode or decode flags are reset, the next address is taken from the incrementer 34. If the bit values are "10", a program "return" is accomplished by taking the next address from the top of stack 36. Finally, if bits I10 and I9 have the value "11", a "jump" or "call" is accomplished, with the next address being supplied by the ROM 25 or the bus 39. Bit I3 is used to distinguish between those situations, as bit I3 is set to a value of zero where a bus directed branch is to be accomplished and to a value of one where a direct branch operation is to be accomplished.

Bits I10 and I9 are also used to control the stack 36 along with bit I2. The stack has four control states: HOLD, PUSH, POP, and RESET. The HOLD state is used both where the the next address multiplexer 38 obtains its next address from the incrementer 34 (bits I10 and I9 set to "01"), and where a "jump" is executed (bits I10 and I9 set to "11"). The POP state is used when a "return" is executed (bits I10 and I9 set to "10"). The PUSH state is used when a "call" is executed (bits I10 and I9 set to "11"), and the RESET state is used when the address circuitry is to be reset (bits 10 and I9 set to "00"). Since bit values "11" in bit positions I10 and I9 could indicate either a HOLD state for a "jump" or a PUSH state for a "call", bit I2 is used to distinguish between them. Thus, where bits I10, I9, and I2 are all set to one, a "call" is indicated. If bits I10 an I9 are set to one while bit I2 is set to zero, a "jump" is indicated.

Bit I3 of the branch field is used to indicate whether the address in bits I24 through I15 is coming from the ROM operand or whether it is being taken from the least significant ten bits on the bus. If bit I3 has a zero value, the branch address is bus directed, while if bit I3 has a value of one, the branch address is dictated by the operand and is called an "direct address". Where a direct address is specified, bits I14 through I11 are left undefined. However, where the branch address is bus directed, bits I14 through I11 are set to the values "0010" which is indicative of bus direct addressing in the unconditional branch operations.

Figure 4:
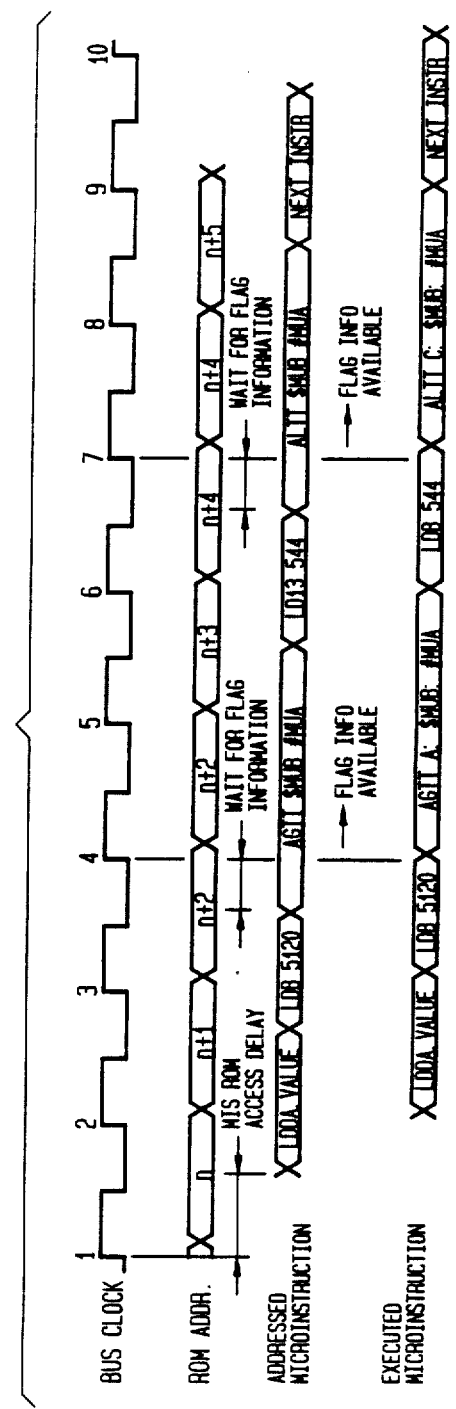
FIG. 4 is a timing diagram for the MIS of the DSP of FIG. 1.

Finally, with regard to the twenty-nine bit words of the branch field, bit I0 is used to define the reset condition, and bit I1 is used to indicate whether the operation is to be a one clock cycle or two clock cycle operation. Where bit I1 has a value of "1", a two clock cycle operation is indicated, and where bit I1 has a value of "0", a one clock cycle operation is indicated. This feature will be more completely discussed hereinafter with reference to the conditional arithmetic field and FIG. 4.

The above discussion of bit locations may be seen with reference to any of the branch microinstructions. For example, the operation code for the instruction if register A is greater than register B call ROM location 0011001111 would be CGTT 0011001111, and the bit assignment would be 01110011001111xxxx11001111111. The two msb's would set forth the branch field, with the next two bits indicating a branch operation. The next ten bits would define the ROM location which is being called, with the bits in the fourteen through eleven slot being undefined. Bits I10 and I9 are then set to a value of "11" to indicate a call operation, while bit I8 is set to zero to indicate the true case. Bits I7 through I4 would then set forth the select of the AGTTB flag input (i.e. "if register A is greater than register B"), while the four remaining bits would be set to a value of one to indicate that the branch operation is a direct call operation.

A third field in the microinstruction set is the immediate data field which is identified by the bits "10" in the msb bit positions. As seen in Tables 3a and 3b, the immediate data field supports only a single microinstruction, although the secondary microinstructions previously set forth with respect to Tables 5a and 5b are also supported. The single instruction supported by field "10" is to load a coefficient stored in ROM into desired registers. The single coefficient is a sixteen bit word which is listed in bit locations I26-I19, I14, I13, and I5-I0. Bit locations I18 through I15 are used to set the registers into which the sixteen bit word is to be loaded. Bits I12 and I11 are set to "01" to specify that the ROM will drive the bus 39. Finally, bits I10 through I6 are used for the secondary microinstructions as set forth in Tables 5a and 5b.

The final field supported in the MIS is the conditional arithmetic field designated with bit values of "11" in the two msbs. The conditional arithmetic field allows one of two arithmetic or data move commands to be implemented depending upon the state of the conditional and is therefore capable of performing the IF-THEN-ELSE function aforedescribed.

As seen in Table 4a, the conditional arithmetic field supports all of the conditionals of the branch field ("01"); i.e. iPSA, iNGA, iPSB, iNGB, etc. The arithmetic functions supported, which are chosen as a result of the determination of the conditionals, include all the arithmetic functions in the arithmetic and data move field ("00"), and also four data move functions: move register A with shift; move complement of register A with shift; move register B; and move complement of register B. Field "11" also supports a two cycle no operation function, but does not support secondary microinstructions.

The coding of the supported conditional arithmetic field functions is seen in Table 4b. As aforestated, the two msb's are set to values of one. The bit code for a first arithmetic function which can be performed is set in bit locations I26 through I23. With those four bits, sixteen unique arithmetic or data move functions may be defined. Likewise, the bit code for a second arithmetic function which can be performed is set in bits I3 through I0, allowing a different one of the sixteen unique arithmetic or data move functions to be chosen. The control bits for choosing which arithmetic function is to be performed are located in bits I8 through I4 and comply with the code set forth with regard to the identical bits in Table 3b. Thus, IF the conditional set forth in bits I8 through I4 is satisfied, THEN the arithmetic or data move function set forth in bits I26 through I23 are accomplished in the ALU; ELSE (i.e. if the conditional is not satisfied) the arithmetic or data move function set forth in bits I3 through I0 is accomplished in the ALU.

It will be seen in Table 4b that the arithmetic and data move functions set forth in bit locations I26 through I23 and I3 through I0 each include a shift capability. Thus, the shift bits for the first arithmetic or data move function are placed in bit locations I22 through I19 while the second set of shift bits are located in bit locations I14, I13, I10 and I9. The results of the arithmetic or data move functions are loadable into any or all of the four registers indicated by bits I18 through I15 (a no operation being carried out by setting all of those bits to a value of one such that no register accepts the bits). Finally, bits I12 and I11 contain a two bit select code "00" which specifies that the bus 39 is to be driven by the PALU 40.

The conditional arithmetic field operations as provided preferably take two clock cycles to be implemented due to the fact that it is desirable to wait for the flag inputs selected by bits I8 through I4 to settle prior to using them to control the selection of the arithmetic function to be performed. Indeed, it is desirable to wait until the end of a cycle before determining whether the conditional is true or not. Thus, as seen in the timing diagram of FIG. 4 which is a timing diagram for the IF-THEN-ELSE instructions IF value > 5120 THEN value = 5120 ELSE
value = value IF value<544 THEN value=544 ELSE value=value, Register A is loaded with a value during clock cycle two and Register B is loaded with the value 5120 during clock cycle three. The comparison of Registers A and B to provide a flag is possibly not available until the end of clock cycle three. Thus, the AGTT $MVB #MVA microinstruction cannot be addressed until clock cycle four. In other words, because the AGTT (Register A greater than Register B) flag might not be available until the end of clock cycle three, the microinstruction to be decoded may have to be decoded during clock cycle 4 and can therefore only be executed during clock cycle 5.

An examination of the conditional branch microinstructions shows that those conditional branch microinstructions requiring flag information from the PALU are designated as two clock cycle instructions by the location of a logic "1" in bit position I1. It will be appreciated, however, that if the previous microinstruction does not cause a change in the flag state of the PLU, there is no reason to provide two clock cycles for the execution of branch microinstructions using flags from the PALU. Indeed, the branch instruction can be executed in one cycle. Those skilled in the art will recognize that this option (a one clock cycle branch) could be made available through a modification to the microcode assembler, either through the use of a different mnemonic or by appending an option character to the present mnemonic. It will also be appreciated that the bus directed conditional branch microinstructions are designated as one cycle operations. The reason for such a designation is that it is preferable to prevent the bus from floating for an entire cycle prior to being read. Thus, the microcode should be arranged such that the microinstruction immediately prior the bus directed branch does not change the flag state of the PALU. If, however, the branch address is coming from the PALU (which is not the case in the ADPCM microinstruction code) and the carry flag, for example, must be tested, then the branch must wait one cycle before executing, and the bus must be allowed to float. Again, the provision of a one or two cycle bus directed branch could be arranged through previously described modifications to the system. It is also noted that all the conditional arithmetic microinstructions (field three) are designated as two clock cycle operations. While again it might be possible to perform the conditional arithmetic microinstruction in one cycle if no flags were changing, such a situation is not supported as there are not sufficient bits in the twenty-nine bit words to allow such an arrangement given the options supported by field three. It will be appreciated however, that by changing the other options, or by adding a bit to the word length, a one or two clock cycle opion could be implemented.

Figure 3B:
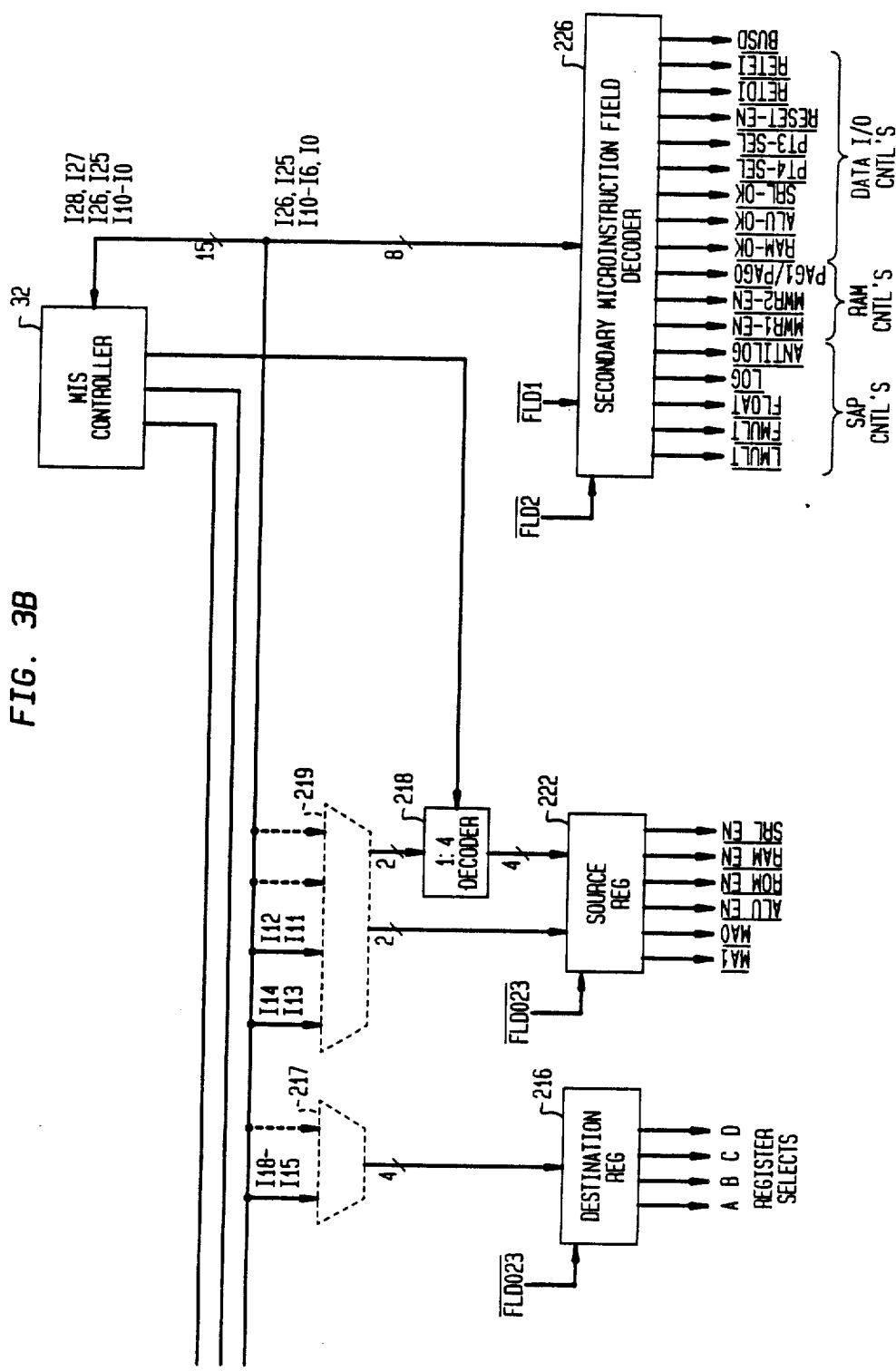
FIG. 3 shows the placement of FIGS. 3A and 3B which are block diagrams of the microinstruction decoder of the microinstruction sequencer of the digital signal processor of FIG. 1.

Turning to FIG. 3, it is seen that the microinstruction decoder 30 of the MIS 20 includes several registers as well as several multiplexers. The twenty-nine bit words exiting ROM 25 are read by several of the registers depending upon the field to which the word belongs. Thus, a microinstruction field decoder 202 receives the most significant bits I28 and I27 of the ROM word and provides signals to enable the other registers as desired. The enabling of the registers for a particular field is indicated by the letters "FLD", the number of the field enabled, and an arrow into the register.

Where an arithmetic, logical, or data move operation is to be conducted (field "00"), bits I26 through I23 are sent through multiplexer 204 to the enabled PALU register 206 which sends the bits as function control bits to the PALU. In a similar manner, bits I22-I19 are sent through multiplexer 208 to the enabled shift control register 212 which sends the bits as shift control bits to the shifter of the PALU. Both multiplexers 204 and 208, as will be described in greater detail hereinafter, are under the control of the microinstruction sequencer controller 32. Bits I18 through I15 are sent to the destination register 216 which selects the registers in the DSP to receive the results of the operation, while bits I12 and I11 are sent to one of four decoder 218 and then to source register 222 (which also receives bits I14 and I13 which decodes the elements of the RAM section) where they are used to decode which section of the DSP (in this case the PALU) is to drive the bus 39.

In the field "00" arrangement, bits I10-I6 are sent to the secondary microinstruction field decoder register 226 which decodes the secondary microinstructions and provides corresponding control signals as indicated to the I/O section of the ADPCM VLSI device as well as to the various sections of the DSP. Finally, bits I5-I0 are sent via multiplexer 228 to the RAM address register 232 to specify the RAM read or write address. As indicated, the MIS controller 32, can also control multiplexer 228 and can specify that the RAM address to be specified is the address indicated by the six lsb's on the bus 39. In this manner the LDMB instruction is implemented.

Turning to field "01", it will be appreciated that the only circuitry which decodes field "01" is the field decoder 202 which receives the two msb's, the secondary field decoder 226 which receives bits I26, I25 and I0 and generates the RTEI, RTDI, and RESET ENABLE control signals, and the MIS controller 32 which in field "01" receives the remaining bits except for bits I24 through I15. As aforestated with regard to Tables 2a and 2b, bits I8-I4 are used to determine which flag input into the MIS controller 32 is to be read, while bits I10, I9, and I3 and I2 are used to permit the microsequencer controller 32 to control the stack 36, and the next address multiplexer 38. Bits I1 and I0 which are also sent to the MIS controller 32 permit the controller 32 to specify a one or two clock cycle operation (by causing the microinstruction register 33 and pointer to the ROM to not provide an additional microinstruction to decode and execute in the case of a two clock cycle operation). Bits I26, I25 and I0 are sent to the secondary field decoder 226, where I26 and I25 are decoded and generate the RTEI and RTDI signals, while I0 is used to reset all the MIS circuitry for the RESET operation. Bits I24 through I15 which set forth a direct branch address (or indicate a bus directed address) are sent to the microinstruction register 33 via the next address register 38 via an internal bus 37 (seen in FIG. 1).

In field "2" ("10"), the microinstruction field decoder 202 receives bits I28 and I27, the destination register 216 receives bits I18-I15, the source register 222 and one of four decoder 218 receives bits I14-I11, and the secondary microinstruction field decoder 226 receives bits I10-I6 just as in field "0" ("00"). However, bits I26-I19, I14, I13 and I5-I0 are sent to the ROM data coefficient register 236 from whence they are sent out on the bus 39 to the registers defined by destination register 216.

For the conditional ALU operations of field "3" ("11"), the microinstruction field decoder 202, the destination register 216, and the source register 222 and one of four decoder 218 receive bits I28-27, I18-15 and I12-I11 respectively (bits I14 and I13 which specify the circuitry driving the internal RAM bus being irrelevant in field "3"). The remainder of the bits are divided among two sets of bits (I23-I20, and I3-I0) for instructing the PALU as to the function it is to perform, two sets of shift bits (I22-I19, and I14-I13 and I10-I9) for instructing the shifter of the PALU as to the shifting it is to perform, a set of control bits (I8-I4) for instructing the MIS controller 32 as to which set of PALU and shift bits are to be passed through multiplexers 204 and 208 to the ALU and shift registers 206 and 212. Thus, the MIS controller 32, based on flag inputs which are specified by bits I8 through I4, controls multiplexers 204 and 208 to allow only one set of PALU function control bits to the PALU register 206 and the corresponding set of PALU shift control bits to the shift register 212.

The operation of various elements of the MIS 20 seen in FIGS. 1 and 3 may be better understood from the following sequence of microinstructions:

operation, etc. If the A SIGN BIT FLAG has a logic "1" (i.e. true), the CALL proceeds with the microsequencer controller 32 instructing the next address multiplexer 38 to send the microinstruction register 33 the value 1022 ("1111111110"), and instructing the stack 36 to place the address 801 stored in the incrementer 34 on the top of the stack.

Microinstruction 1022 is a field three microinstruction which would be coded: 1100100011101100000100111100. Bits I28 and I27 would be decoded by the field decoder 202 to control the registers to receive the remaining bits. Bits I26-I23 would provide the code for the PALU function "ADD" the values in Registers A and B, while bits I3-I0 would provide the code for the data move command "MOVA A". Likewise, bits I22 through I19 would indicate a right shift of Register A by four places (a division by sixteen) while bits I14-I13 and I10-I9 would indicate a shift right of Register A by two places (division by four), with the output of the PALU going to Register C as dictated by bits I18-I15 received by destination register 216. MIS controller 32 is told by bits I8-I4 that it should check a flag output by the comparator 46 of the PALU 40 which indicates whether the value in Register A 42 is greater than the value in Register B 44. If the flag indicates true, the MIS controller 32 causes multiplexers 204 and 208 to accept bits I26-I23 and bits I22-I19 respectively. If the flag indicates false, bits I3-I0 and I14-I13 and I10-I9 are passed to the PALU function control register 206 and PALU shift control register 212 respectively through multiplexers 204 and 208 under the control of MIS controller 32. The

| 800 | | CPSA: | LABEL; | Call "Label" if Reg. A > =0 |
|---|---|---|---|---|
| 801 | | MVC: | *; | Move contents of Reg. C to bus |
| | | SSTC: | MEM.LOC 7; | Store contents of Reg. C in RAM memory location 7 (secondary microinstruction) |
| 802 | | LDMB: | A; | Load Reg. A with value in memory loc. specified by value on bus |
| 803 | | . . . | | |
| 1022 | LABEL | AGT: | C; | IF value in Reg. A > value in Reg. B, THEN C = (1/16)A + B; |
| | | SADD: | R4; | |
| | | #MYA: | R2; | ELSE C = (1/4)A |
| 1023 | | RETN: | | Return to main program (801) |

Step 800 of the microinstruction sequence is seen to be a field one conditional branch operation which would be coded:

01111111111110xxxx1110101111 with bits I28 and I27 being decoded by field decoder 202 to indicate field one; bits I26 and I25 going to MIS controller 32 to indicate a conditional branch; bits I24 through I15 specifying the location 1022 of the subroutine Label; bits I14 through I11 being left undefined; bits I10, I9 and I2 going to MIS controller 32 to indicate a CALL operation; bits I8 through I4 going to MIS controller 32 to indicate that the A SIGN BIT FLAG obtained from the PALU 40 is to be inspected; and bits I3, I1 and I0 going to the MIS controller 32 to MIS housekeeping functions such as the cycle length of the bus driver of the PALU is enabled to output the results of the PALU operation to Register C of the RAM section 60 by bits I12 and I11 which are read by one of four decoder 218 and source register 222 and which specify the bus driver of the PALU 40.

After a field three operation, the MIS controller 32 instructs the next address multiplexer 34 to pass the address located in the incrementer 34 to the microinstruction register 33. Thus, the next addressed location in ROM is location 1023 which sets forth a field one "RETURN" operation coded 0111xxxxxxxxxxxxx10011111101. Without going through all the details, it will be appreciated that bits I10 and I9 which are decoded at the MIS controller 32 indicate that the "RETURN" is to be executed. In response, the MIS controller 32 causes the stack 36 to pop the address 801 from the stack and to load that via next address multiplexer 38 into the microinstruction register 33. Also, the pointer in the stack is decremented.

Turning to microinstruction 801, a field zero and secondary microinstruction are set forth in the code: 0011110100111100101001000111. For field zero, bits I26-I23 instructing the PALU are set to a default value "1111", while bits I22-I19 are set to the default value "0010", since the PALU is not actively involved in the move Register C operation. Bits I18 through I15 which are read by the destination register 216 indicate that none of the registers are to receive the moved bits (although the data bus will). Bits I14 through I11 are used by the source register 222 to enable the bus drivers of the RAM section 60, and in particular Register C of the RAM section. Finally, bits I10-I0 are sent to the secondary microinstruction field register and decoder 226 where bits I10-I6 indicate that the contents of Register C are to be stored in the RAM memory, and bits I5-I0 are given to indicate that the memory loction is location "7" (i.e. "000111"). Again, since the MIS controller is aware of the field of the previous instruction, it causes the microinstruction register 33 to receive its next address from the incrementer 34 via the next address multiplexer 38.

The last microinstruction of the given sequence is also a field zero microinstruction and is coded 001111010011101110011110xxxxxx. Here bit I15 is a value "0" to indicate to the destination register 216 that Register A is to be loaded. The value to be loaded into Register A is the data from the RAM address location specified by the least significant six bits of the data bus set in the previous cycle 801 when the contents of Register C were loaded onto the bus.

There has been described and illustrated herein a microinstruction sequencer capable of instructing arithmetic, logical and data move operations in a conditional manner. While the invention has been described in detail with regard to the microcode and the manner in which the microcode is decoded and acted upon, those skilled in the art will appreciate that different bit assignments and different functions could be provided while still carrying out the invention. For example, the microinstruction fields could be assigned different numbers. Or, if the PALU had been provided with a shifter for register B, a different set of functions could be provided, such as add the value of register A shifted left two places to the value of register B shifted right three placed. Further, if desired, microinstructions and circuitry could be provided to permit conditional data move operations where the source of data is a RAM location, or a register other than the registers of the PALU. Likewise, the destination of conditional arithmetic, logical, and data move operations could be made contingent on the conditional (e.g. IF condition TRUE, C=B; ELSE D=A; IF condition FALSE, C=PORT 1; ELSE B=PORT 2; IF condition TRUE, A=RAM LOC m; ELSE A=RAM LOC n). Additional functions of this genre might be achieved by lengthening the bit length of the microinstructions or by defining additioal microinstruction fields. Of course, appropriate multiplexer logic circuitry (as shown in phantom as multiplexers 217, 219, and 229) would have to be added in conjunction with the source decode register 222, the RAM address register 232 and the destination register 216. Therefore, it will be apparent to those skilled in the art that other changes and modifications may be made to the invention as described in the specification without departing from the spirit and scope of the invention as so claimed.

THE PARALLEL ARITHMETIC-LOGIC UNIT

The preferred PALU 40 of the invention is seen in FIG. 1, and preferably comprises: a first register 42 (register A) for storing data; a second register 44 (register B) for storing data; an unsigned magnitude comparator means 46; a shifter 48 for shifting the bits in register 20; and an arithmetic-logic core means 50 for performing arithmetic, logic, and data move functions. As is suggested by FIG. 1, registers 42 and 44, shifter 48, and the arithmetic-logic core 50 are all controlled by a microinstruction sequencer which can select registers 42 and 44, provide shift control bits to shifter 48, and provide function control bits to arithmetic-logic core 50.

Registers 42 and 44 are preferably sixteen bits in length. Both registers are loaded on the positive edge of the clock by the application of an active low select derived from decoded microinstruction sequencer instructions called REG A SEL and REG B SEL respectively. The most significant bit of both registers 42 and 44 are output to the microinstruction sequencer as register 42 and register 44 sign bit flags, named ASIGN and BSIGN respectively.

The shifter 48 is located between register 42 and the "A" input into the arithmetic-logic unit core 50. The shifter thereby enables a shift operation to be performed on the data held in register 42. While a large range of shift values could be supported by the shifter, for purposes of implementing the ADPCM algorithm, the shifter 48 supports as many as eight shifts to the right (with extension of the sign bit), and as many as four shifts to the left (with zero filling of the bits to the right of the lsb). In this manner, the value in register 42 may be divided by two for a single shift right, by four for two shifts right . . . and by two hundred and fifty-six if eight right shifts are carried out. Likewise, the value in register 20 may be multiplied by two for a single shift left . . . and by sixteen for four shifts left. The number and direction of shifting is supplied by control bits decoded in the ALU decode register of the microinstruction sequencer. To permit the thirteen shift states (-8 to 0 to 4), four bits (which could support sixteen states) are required.

The unsigned magnitude comparator 46 continually performs an unsigned comparison on the values stored in registers 42 and 44. Logic means (not shown) are preferably used to make the comparison. As a result of the comparison, the comparator 46 preferably outputs five flag combinations (3 flag bits) representative of the following conditions: Register 42>Register 44; Register 42=Register 44; Register 42<Register 44; Register 42>=Register 44; and Register 42<=Register 44;

with the latter two conditions being derived from the former three conditions. The three output flags are sent to the microinstruction sequencer, for among other reasons, to help it determine the truth of a conditional such that it will be able to properly instruct the arithmetic-logic unit core 50 as to the function it is to execute.

The provision of the comparator (which may be an unsigned magnitude, signed magnitude, or two's compliment comparator as desired) for continually comparing the outputs of registers 42 and 44 is a significant feature of the digital signal processor which is provided to implement the ADPCM algorithm. Without the comparator, compare operations would have to be conducted by the arithmetic-logic unit core 50 via subtraction techniques. As a result, two passes through the PALU 40 would be required to conduct a conditional arithmetic, conditional data move, or conditional logical instruction, thereby slowing down the process. Moreover, ROM space in the microinstruction sequencer would have to be expanded as additional instructions would be required to conduct a conditional instruction.

The preferred arithmetic-logic core 50 of the invention is provided with the capability of performing the following arithmetic, logical and data move operations:

| | |
|---|---|
| A SUB B | register 42 as shifted minus register 44 |
| A SBB B | register 44 minus register 42 as shifted |
| A ADD B | register 42 as shifted plus register 44 |
| CVT B | convert register 44 from two's complement to sign magnitude or visa versa |
| ABS B | absolute value of register 44 |
| NEG B | negate value of register 44 |
| INC B | increment value of register 44 |
| DEC B | decrement value of register 44 |
| A XOR B | XOR function register 42 as shifted with register 44 |
| A ORR B | OR function register 42 as shifted with register 44 |
| A AND B | AND function register 42 as shifted with register 44 |
| MVA | place contents of register 42 as shifted onto bus |
| MVNA | place complement of shifted register 42 onto bus |
| MVB | place contents of register 44 onto bus |
| MVNB | place complement of register 44 onto bus |

The means for accomplishing most of the above-listed functions in the arithmetic-logic core means are well known to those skilled in the art. In fact, even the ABS B and CVT B functions which are not standard in PALU's, could be easily implemented in a PALU by one skilled in the art.

As with the control bits for the shifter 48, the four control bits for determining which function the arithmetic-logic core means will execute is supplied by control bits decoded in the ALU decode register of the microinstruction sequencer. In turn, the arithmetic-logic core 50 supplied the microinstruction sequencer with two flags which indicate arithmetic overflow and carry conditions in the arithmetic-logic core 50.

With the provided registers 42 and 44, comparator 46, and arithmetic-logic core 50, it will be appreciated that a conditional operation such as an upper bound may be executed in a single pass through the PALU. Thus, after loading Register A 42 with first value, and Register B 44 with a second value, the comparative status of the registers (i.e. is $A > B$; is $A = B$; is $A < B$; is $A > = B$; is $A < = B$) will be automatically available to the microinstruction sequencer via the flags of the comparator 46. Without having to have first instructed the arithmetic-logic core 50 of the PALU 40 to subtract the value in Register B from the value in Register A to obtain a determination of the relative values, the microinstruction sequencer can then make a decision as to the what value to set the value in Register A and can issue its first instruction to the arithmetic-logic core of the PALU. Microinstruction sequencer means for accomplishing this decision and function in a single microinstruction will be seen with reference to the patent application entitled "Microinstruction Sequencer Capable of Instructing Arithmetic Logical and Data Move Operations in a Conditional Manner" (Pat. #4,891,754), which has already been incorporated herein by reference.

There has been described and illustrated herein a parallel arithmetic-logic unit capable of executing conditional arithmetic, logical and data move operations in a single pass. While each element of the PALU has been described in detail, it will be appreciated that it is within the scope of the invention to change such detail. Thus, while the arithmetic-logic core of the PALU has been particularly described with regard to the functions it can execute, those skilled in the art will appreciate that the core could be arranged to execute a different set of functions. Likewise, while an unsigned magnitude comparator is the comparator of choice, other types of comparators may be utilized. Further, while the comparator is described as continually comparing the values in the registers, it will be appreciated that the term "continually" is intended to mean that the comparison is conducted so very often that up-to-date results will be available without waiting for the comparison. Further yet, while particular elements of the PALU have been disclosed, additional elements can be provided such as additional input registers, an accumulator at the output of the PALU, and additional comparators for comparing the additional input registers. In addition, the elements can be connected differently such as a comparator which compares an input register with a shifted value, or a direct connection of the arithmetic-logic core to the data bus. With such a data bus connection, immediate data PALU instructions or RAM data for a specific PALU operation can be supported. Therefore, it will be apparent to those skilled in the art that other changes and modifications may be made to the invention as described in the specification without departing from the spirit and scope of the invention as so claimed.

CONCLUSION

It will be appreciated that the RAM section 60, the MIS 20, the PALU 40 and the Serial Arithmetic Processor 70 together provide a powerful and flexible tool for implementing complex algorithms in a single DSP device. For example, the ADPCM algorithm may be implemented in the single DSP device 10. Indeed, (copyrighted) microcode for implementing the 32 Kbit CCITT ADPCM recommendations as well as other ADPCM rates and algorithms is seen appended hereto as APPENDIX A. While the microcode of Appendix A provides a working code for accomplishing the ADPCM algorithm with the provided DSP, it will be appreciated by those skilled in the art, that a different programmer would provide different code which likewise could be used with the DSP of the invention. It will also be recognized that the DSP invention is flexible in that changes to the ADPCM algorithm would not severly hamper the functioning of the DSP device as changes to the relatively short MIS microcode could be made to handle the same. Further, it will be recognized that the DSP device as provided could also be used for the fast implementation of other algorithms.

There has been described and illustrated herein a digital signal processor capable of implementing mathematically complex algorithms, and in particular capable of implementing a series of ADPCM algorithms. While the particular elements of the digital signal processor invention have been set forth in great detail, those skilled in the art will appreciate that particular details of, for example, the serial arithmetic processor section or the PALU may be changed without affecting the overall functioning of the DSP. For example, the PALU might contain no comparator if appropriate commands could be executed by the MIS to accomplish the function of the comparator in another manner. Indeed, the particular aspects of the PALU, the MIS, and the serial arithmetic processor which are themselves subjects of the patent applications previously incorporated by reference herein, permit the DSP to be extremely effective in executing numerous algorithms with a VLSI of limited size. However, if some of those aspects were not included, the DSP could still effectively function due to its powerful and flexible architecture. Therefore, it will be apparent to those skilled in the art that other changes and modifications may be made to the invention as described in the specification without departing from the spirit and scope of the invention as so claimed.

TABLE 1a

| FIELD 0 | | | |
|---|---|---|---|
| Arithmetic and Logical Commands | | | |
| ADD | <sh,dd> | Add reg A with shift to reg B | |
| SUB | <sh,dd> | Subtract reg B from reg A with shift | |
| SBB | <sh,dd> | Subtract reg A with shift from reg B | |
| CVT | <dd> | perform on reg B a Two's Compliment to Signed Magnitude conversion, or Signed Magnitude to Two's Compliment conversion. | |
| ABS | <dd> | Find the absolute value of reg B | |
| NEG | <dd> | Negate reg B | |
| INC | <dd> | Increment reg B | |
| DEC | <dd> | Decrement reg B | |
| AND | <sh,dd> | AND reg A with shift with reg B | |
| ORR | <sh,dd> | OR reg A with shift with reg B | |
| XOR | <sh,dd> | Exclusive-OR reg A with shift with reg B | |
| NOP1 | | One cyle No-operation | |
| 189 Data Move commands: | | | |
| MVA | <sh,dd> | Move reg A with shift | |
| MVNA | <sh,dd> | Move compliment of reg A with shift | |
| MVB | <dd> | Move reg B | |
| MVNB | <dd> | Move compliment of reg B | |
| MVC | <dd> | Move reg C | |
| MVE | <dd> | Move reg E | |
| MVP1 | <dd> | Move data port 1 | |
| MVP2 | <dd> | Move data port 2 | |
| LDM | <dd,mm> | Move data memory location direct | |
| LDMB | <dd> | Move data memory location bus direct | |

TABLE 1b

| | | | | FIELD 0 | | | | | | | | | | | | | | | | | | | |
|---|---|---|---|---|---|---|---|---|---|---|---|---|---|---|---|---|---|---|---|---|---|---|---|
| Mnemonic | Cycles | 28 27 26 25 24 23 | 22 21 20 19 | 18 17 16 15 | 14 | 13 | 12 | 11 | 10 | 9 | 8 | 7 | 6 | 5 | 4 | 3 | 2 | 1 | 0 | | | | |
| Arithmetic and Logical Commands | | | | | | | | | | | | | | | | | | | | | | | |
| SUB sh,dd | 1 | 0 0 0 0 0 0 | sh | dd | . | . | 0 | 0 | . | . | . | . | . | . | . | . | . | . | . | | | | |
| SBB sh,dd | 1 | 0 0 0 0 0 1 | sh | dd | . | . | 0 | 0 | . | . | . | . | . | . | . | . | . | . | . | | | | |
| ADD sh,dd | 1 | 0 0 0 0 1 0 | sh | dd | . | . | 0 | 0 | . | . | . | . | . | . | . | . | . | . | . | | | | |
| CVT dd | 1 | 0 0 0 1 0 0 | sh | dd | . | . | 0 | 0 | . | . | . | . | . | . | . | . | . | . | . | | | | |
| ABS dd | 1 | 0 0 0 1 0 1 | sh | dd | . | . | 0 | 0 | . | . | . | . | . | . | . | . | . | . | . | | | | |
| NEG dd | 1 | 0 0 0 1 1 0 | sh | dd | . | . | 0 | 0 | . | . | . | . | . | . | . | . | . | . | . | | | | |
| INC dd | 1 | 0 0 0 1 1 1 | sh | dd | . | . | 0 | 0 | . | . | . | . | . | . | . | . | . | . | . | | | | |
| DEC | 1 | 0 0 1 0 0 0 | sh | dd | . | . | 0 | 0 | . | . | . | . | . | . | . | . | . | . | . | | | | |
| XOR sh,dd | 1 | 0 0 1 0 0 1 | sh | dd | . | . | 0 | 0 | . | . | . | . | . | . | . | . | . | . | . | | | | |
| ORR sh,dd | 1 | 0 0 1 0 1 0 | sh | dd | . | . | 0 | 0 | . | . | . | . | . | . | . | . | . | . | . | | | | |
| AND sh,dd | 1 | 0 0 1 0 1 1 | sh | dd | . | . | 0 | 0 | . | . | . | . | . | . | . | . | . | . | . | | | | |
| NOP1 | 1 | 0 0 1 1 1 1 | sh | dd | . | . | 0 | 0 | . | . | . | . | . | . | . | . | . | . | . | | | | |
| Data Move Commands | | | | | | | | | | | | | | | | | | | | | | | |
| MVA sh,dd | 1 | 0 0 1 1 0 0 | sh | dd | . | . | 0 | 0 | . | . | . | . | . | . | . | . | . | . | . | | | | |
| MVNA sh,dd | 1 | 0 0 1 1 1 0 | sh | dd | . | . | 0 | 0 | . | . | . | . | . | . | . | . | . | . | . | | | | |
| MVB dd | 1 | 0 0 1 1 0 1 | 0 1 0 0 | dd | . | . | 0 | 0 | . | . | . | . | . | . | . | . | . | . | . | | | | |
| MVNB dd | 1 | 0 0 1 1 1 1 | 0 1 0 0 | dd | . | . | 0 | 0 | . | . | . | . | . | . | . | . | . | . | . | | | | |
| MVC dd | 1 | 0 0 1 1 1 1 | 0 1 0 0 | dd | 0 | 0 | 1 | 0 | . | . | . | . | . | . | . | . | . | . | . | | | | |

TABLE 1b-continued

| | | FIELD 0 | | | | | | | | | | | | | | | | | | | | | |
|---|---|---|---|---|---|---|---|---|---|---|---|---|---|---|---|---|---|---|---|---|---|---|---|
| Mnemonic | Cycles | 28 27 26 25 24 23 | 22 21 20 19 | 18 17 16 15 | 14 | 13 | 12 | 11 | 10 | 9 | 8 | 7 | 6 | 5 | 4 | 3 | 2 | 1 | 0 |
| MVE dd | 1 | 0 0 1 1 1 1 | 0 1 0 0 | dd | . | . | 1 | 1 | . | . | . | . | . | . | . | . | . | . | . |
| MVP1 dd | 1 | 0 0 1 1 1 1 | 0 1 0 0 | dd | 1 | 0 | 1 | 0 | | | | | see table 5a, 5b | | | | | | |
| MVP2 dd | 1 | 0 0 1 1 1 1 | 0 1 0 0 | dd | 0 | 1 | 1 | 0 | | | | | see table 5a, 5b | | | | | | |
| LDM dd,mm | 1 | 0 0 1 1 1 1 | 0 1 0 0 | dd | 1 | 1 | 1 | 0 | table 5a, 5b | | | | | M5 | M4 | M3 | M2 | M1 | M0 |
| LDMB dd | 1 | 0 0 1 1 1 1 | 0 1 0 0 | dd | 1 | 1 | 1 | 0 | 0 | 1 | 1 | 0 | X | X | X | X | X | X |

|  |  |  |  |  |  |  |  |  |  |  |
|---|---|---|---|---|---|---|---|---|---|---|
| R4 | 0 0 1 1 | 0 | 0 1 0 0 | L4 | 1 0 0 0 | L8 | 1 1 0 0 | REG A | X X X 0 |
| R3 | 0 0 1 0 | L1 | 0 1 0 1 | L5 | 1 0 0 1 | | | REG B | X X 0 X |
| R2 | 0 0 0 1 | L2 | 0 1 1 0 | L6 | 1 0 1 0 | | | REG C | X 0 X X |
| R0 | 0 0 0 0 | L3 | 0 1 1 1 | L7 | 1 0 1 1 | | | REG D | 0 X X X |

"." see table 5a, 5b, and 5c
"X" denotes don't care
"sh" Shift Values (R = right shift, L = left shift)
"dd" Destination Code

TABLE 2a

FIELD 1

Unconditional branch Commands:

| | | |
|---|---|---|
| JUMP | <n> | Jump direct |
| JUMP | <*> | Jump bus direct |
| CALL | <n> | Call direct |
| CALL | <*> | Call bus direct |
| RETN | | Return from call |
| RTEI | | Return from encode interrupt |
| RTDI | | Return from decode interrupt |
| CLRE | | Clear encode flag |
| CLRD | | Clear decode flag |
| REST | | Reset program counter |

Conditional branch Commands:

| | | |
|---|---|---|
| iPSA[N] | <n> or <*> | If reg A is positive |
| iNGA[N] | <n> or <*> | If reg A is negative |
| iPSB[N] | <n> or <*> | If reg B is positive |
| iNGB[N] | <n> or <*> | If reg B is negative |
| iGTT[N] | <n> or <*> | If reg A is greater than reg B |
| iLST[N] | <n> or <*> | If reg A is less than reg B |
| iGTE[N> | <n> or <*> | If reg A is greater than or equal to reg B |
| iLTE[N] | <n> or <*> | If reg A is less than or equal to reg B |
| iEQU[N] | <n> or <*> | If reg A is equal to reg B |
| iMLW[N] | <n> or <*> | If Mu-law flag is set |
| iALW[N] | <n> or <*> | If A-law flag is set |
| iCYF[N] | <n> or <*> | If PALU Carry flag is set |
| iOVF[N] | <n> or <*> | If PALU Overflow flag is set |
| iECF[N] | <n> or <*> | If Encode flag is set |
| iDCF[N] | <n> or <*> | If Decode flag is set |
| iPTH[N] | <n> or <*> | If PCM pass-through flag is set |
| iNAMC[N] | <n> or <*> | If North American flag is set |
| iEXT[N] | <n> or <*> | If External flag is set |

TABLE 2b

FIELD 1

Unconditional Branch Commands

| Mnemonic | Cycles | 28 27 26 25 | 24 23 22 21 20 19 18 17 16 15 | 14 13 12 11 | 10 | 9 | 8 | 7 6 5 4 3 2 1 0 |
|---|---|---|---|---|---|---|---|---|
| REST | 1 | 0 1 1 1 | X X X X X X X X X X | X X X X | 0 | 0 | 0 | 1 1 1 1 1 1 0 0 |
| JUMP n | 1 | 0 1 1 1 | n9 n8 n7 n6 n5 n4 n3 n2 n1 n0 | X X X X | 1 | 1 | 0 | 1 1 1 1 1 0 0 1 |
| JUMP * | 1 | 0 1 1 1 | X X X X X X X X X X | 0 0 1 0 | 1 | 1 | 0 | 1 1 1 1 0 0 0 1 |
| CALL n | 1 | 0 1 1 1 | n9 n8 n7 n6 n5 n4 n3 n2 n1 n0 | X X X X | 1 | 1 | 0 | 1 1 1 1 1 1 0 1 |
| CALL * | 1 | 0 1 1 1 | X X X X X X X X X X | 0 0 1 0 | 1 | 1 | 0 | 1 1 1 1 0 1 0 1 |
| RETN | 1 | 0 1 1 1 | X X X X X X X X X X | X X X X | 1 | 0 | 0 | 1 1 1 1 1 1 0 1 |
| RTEI | 1 | 0 1 0 1 | X X X X X X X X X X | X X X X | 1 | 0 | 0 | 1 1 1 1 1 1 0 1 |
| RTDI | 1 | 0 1 0 0 | X X X X X X X X X X | X X X X | 1 | 0 | 0 | 1 1 1 1 1 1 0 1 |

Encode and Decode Flag Clear Commands

| Mnemonic | Cycles | 28 27 26 25 | 24 23 22 21 20 19 18 17 16 15 | 14 13 12 11 | 10 | 9 | 8 | 7 6 5 4 3 2 1 0 |
|---|---|---|---|---|---|---|---|---|
| CLRE | 1 | 0 1 0 1 | X X X X X X X X X X | X X X X | 0 | 1 | 0 | 1 1 1 1 1 1 0 1 |
| CLRD | 1 | 0 1 0 0 | X X X X X X X X X X | X X X X | 0 | 1 | 0 | 1 1 1 1 1 1 0 1 |

Conditional Direct Branch Commands

| Mnemonic | Cycles | 28 27 26 25 | 24 23 22 21 20 19 18 17 16 15 | 14 13 12 11 | 10 | 9 | 8 | 7 6 5 4 3 2 1 0 |
|---|---|---|---|---|---|---|---|---|
| iPSA[N]n | 2 | 0 1 1 1 | n9 n8 n7 n6 n5 n4 n3 n2 n1 n0 | X X X X | i | | N#1 | 1 0 1 0 1 p 1 1 |
| iNGA[N]n | 2 | 0 1 1 1 | n9 n8 n7 n6 n5 n4 n3 n2 n1 n0 | X X X X | i | | N#0 | 1 0 1 0 1 p 1 1 |
| iPSB[N]n | 2 | 0 1 1 1 | n9 n8 n7 n6 n5 n4 n3 n2 n1 n0 | X X X X | i | | N#1 | 1 0 0 1 1 p 1 1 |
| iNGB[N]n | 2 | 0 1 1 1 | n9 n8 n7 n6 n5 n4 n3 n2 n1 n0 | X X X X | i | | N#0 | 1 0 0 1 1 p 1 1 |
| iGTT[N]n | 2 | 0 1 1 1 | n9 n8 n7 n6 n5 n4 n3 n2 n1 n0 | X X X X | i | | N | 0 1 1 1 1 p 1 1 |
| iLST[N]n | 2 | 0 1 1 1 | n9 n8 n7 n6 n5 n4 n3 n2 n1 n0 | X X X X | i | | N | 0 0 1 1 1 p 1 1 |
| iGTE[N]n | 2 | 0 1 1 1 | n9 n8 n7 n6 n5 n4 n3 n2 n1 n0 | X X X X | i | | N | 0 1 1 0 1 p 1 1 |
| iLTE[N]n | 2 | 0 1 1 1 | n9 n8 n7 n6 n5 n4 n3 n2 n1 n0 | X X X X | i | | N | 0 1 0 0 1 p 1 1 |
| iEQU[N]n | 2 | 0 1 1 1 | n9 n8 n7 n6 n5 n4 n3 n2 n1 n0 | X X X X | i | | N | 0 1 0 1 1 p 1 1 |
| iMLW[N]n | 1 | 0 1 1 1 | n9 n8 n7 n6 n5 n4 n3 n2 n1 n0 | X X X X | i | | N#0 | 1 0 0 0 1 p 0 1 |
| iALW[N]n | 1 | 0 1 1 1 | n9 n8 n7 n6 n5 n4 n3 n2 n1 n0 | X X X X | i | | N#1 | 1 0 0 0 1 p 0 1 |
| iCYF[N]n | 2 | 0 1 1 1 | n9 n8 n7 n6 n5 n4 n3 n2 n1 n0 | X X X X | i | | N | 0 0 0 0 1 p 1 1 |
| iDCF[N]n | 1 | 0 1 1 1 | n9 n8 n7 n6 n5 n4 n3 n2 n1 n0 | X X X X | i | | N | 0 0 0 1 1 p 0 1 |
| iPTH[N]n | 1 | 0 1 1 1 | n9 n8 n7 n6 n5 n4 n3 n2 n1 n0 | X X X X | i | | N | 1 0 1 1 1 p 0 1 |
| iNAM[N]n | 1 | 0 1 1 1 | n9 n8 n7 n6 n5 n4 n3 n2 n1 n0 | X X X X | i | | N | 1 1 0 0 1 p 0 1 |
| iEXT[N]n | 1 | 0 1 1 1 | n9 n8 n7 n6 n5 n4 n3 n2 n1 n0 | X X X X | i | | N | 1 1 0 1 1 p 0 1 |
| iOVF[N]n | 2 | 0 1 1 1 | n9 n8 n7 n6 n5 n4 n3 n2 n1 n0 | X X X X | i | | N | 1 1 1 0 1 p 1 1 |

Conditional Bus Direct Branch Commands

| Mnemonic | Cycles | 28 27 26 25 | 24 23 22 21 20 19 18 17 16 15 | 14 13 12 11 | 10 | 9 | 8 | 7 6 5 4 3 2 1 0 |
|---|---|---|---|---|---|---|---|---|
| iPSA[N]* | 1 | 0 1 1 1 | X X X X X X X X X X | 0 0 1 0 | i | | N#1 | 1 0 1 0 0 p 0 1 |
| iNGA[N]* | 1 | 0 1 1 1 | X X X X X X X X X X | 0 0 1 0 | i | | N#0 | 1 0 1 0 0 p 0 1 |

TABLE 2b-continued

| | | | FIELD 1 | | | | |
|---|---|---|---|---|---|---|---|
| iPSB[N]* | 1 | 0 1 1 1 | X X X X X X X X X X | 0 0 1 0 | i | N#1 | 1 0 0 1 0 p 0 1 |
| iNGB[N]* | 1 | 0 1 1 1 | X X X X X X X X X X | 0 0 1 0 | i | N#0 | 1 0 0 1 0 p 0 1 |
| iGTT[N]* | 1 | 0 1 1 1 | X X X X X X X X X X | 0 0 1 0 | i | N | 0 1 1 1 0 p 0 1 |
| iLST[N]* | 1 | 0 1 1 1 | X X X X X X X X X X | 0 0 1 0 | i | N | 0 0 1 1 0 p 0 1 |
| iGTE[N]* | 1 | 0 1 1 1 | X X X X X X X X X X | 0 0 1 0 | i | N | 0 1 1 0 0 p 0 1 |
| iLTE[N]* | 1 | 0 1 1 1 | X X X X X X X X X X | 0 0 1 0 | i | N | 0 1 0 0 0 p 0 1 |
| iEQU[N]* | 1 | 0 1 1 1 | X X X X X X X X X X | 0 0 1 0 | i | N | 0 1 0 1 0 p 0 1 |
| iMLW[N]* | 1 | 0 1 1 1 | X X X X X X X X X X | 0 0 1 0 | i | N#0 | 1 0 0 0 0 p 0 1 |
| iALW[N]* | 1 | 0 1 1 1 | X X X X X X X X X X | 0 0 1 0 | i | N#1 | 1 0 0 0 0 p 0 1 |
| iCYF[N]* | 1 | 0 1 1 1 | X X X X X X X X X X | 0 0 1 0 | i | N | 0 0 0 0 0 p 0 1 |
| iECF[N]* | 1 | 0 1 1 1 | X X X X X X X X X X | 0 0 1 0 | i | N | 0 0 1 0 0 p 0 1 |
| iDCF[N]* | 1 | 0 1 1 1 | X X X X X X X X X X | 0 0 1 0 | i | N | 0 0 0 1 0 p 0 1 |
| iPTH[N]* | 1 | 0 1 1 1 | X X X X X X X X X X | 0 0 1 0 | i | N | 1 0 1 1 0 p 0 1 |
| iNAM[N]* | 1 | 0 1 1 1 | X X X X X X X X X X | 0 0 1 0 | i | N | 1 1 0 0 0 p 0 1 |
| iEXT[N]* | 1 | 0 1 1 1 | X X X X X X X X X X | 0 0 1 0 | i | N | 1 1 0 1 0 p 0 1 |
| iOVF[N]* | 1 | 0 1 1 1 | X X X X X X X X X X | 0 0 1 0 | i | N | 1 1 1 0 0 p 0 1 |

"i" = 1 1 (Jump or a Call, 1 0 (Return)
"p" = 0 (Jump), 1 (call or Return)
"#" = Exclusive OR
"X" denotes don't care TABLE 3a

| FIELD 2 |
|---|
| Immediate Data Command: |

TABLE 3a-continued

| FIELD 2 | |
|---|---|
| LDD | <dd,b> |

TABLE 3b

FIELD 2

Immediate Data Command

| Mnemonic | Cycles | 28 | 27 | 26 | 25 | 24 | 23 | 22 | 21 | 20 | 19 | 18 | 17 | 16 | 15 |
|---|---|---|---|---|---|---|---|---|---|---|---|---|---|---|---|
| LDD dd,b | 1 | 1 | 0 | b15 | b14 | b13 | b12 | b11 | b10 | b9 | b8 | — | — | dd | — |

| Mnemonic | Cycles | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| LDD dd,b | b7 | b6 | 0 | 1 | — | — | — | — | — | b5 | b4 | b3 | b2 | b1 | b0 | |

TABLE 4a

FIELD 3
Conditional Arithmetic Logical, and Data Move Commands:

| | | |
|---|---|---|
| APSA[N] | <dd><a1,a2> | If reg A is positive execute <a1> else execute <a2> |
| ANGA[N] | <dd><a1,a2> | If reg A is negative execute <a1> else execute <a2> |
| APSB[N] | <dd><(a1,a2> | If reg B is positive execute <a1> else execute <a2> |
| ANGB[N] | <dd><a1,a2> | If reg B is negative execute <a1> else execute <a2> |
| AGTT[N] | <dd><a1,a2> | If reg A is greater than reg B execute <a1> else execute <a2> |
| ALST[N] | <dd><a1,a2> | If reg A is less than reg B execute <a1> else execute <a2> |
| AGTE[N] | <dd><a1,a2> | If reg A is greater than or equal to reg B execute <a1> else execute <a2> |
| ALTE[N] | <dd><a1,a2> | If reg A is less than or equal to reg B execute <a1> else execute <a2> |
| AEQU[N] | <dd><a1,a2> | If reg A is equal to reg B execute <a1> else execute <a2> |
| AMLW[N ] | <dd><a1,a2> | If Mu-law flag is set execute <a1> else execute <a2> |
| AALW[N] | <dd><(a1,a2> | If A-law flag is set execute <a1> else execute <a2> |
| ACYF[N] | <dd><a1,a2> | If PALU Carry flag is set execute <a1> else execute <a2> |
| AOVF[N] | <dd><a1,a2> | If PLU Overflow flag is set execute <a1> else execute <a2> |
| AECF[N] | <dd><a1,a2> | If Encode flag is set execute <a1> else execute <a2> |
| ADCF[N] | <dd><a1,a2> | If Decode flag is set execute <a1> else execute <a2> |
| APTH[N] | <dd><a1,a2> | If PCM pass-through flag is set execute <a1> else execute <a2> |
| ANAM[N] | <dd><a1,a2> | If North American flag is set execute <a1> else execute <a2> |
| AEXT[N] | <dd><a1,a2> | If External flag is set execute <a1> else execute <a2> |

TABLE 4b

FIELD 3
Conditional Arithmetic, Logical, and Data Move Commands

| Mnemonic | | Cycles | 28 27 | 26 25 24 23 | 22 21 20 19 | 18 17 16 15 | 14 13 | 12 11 | 10 9 | 8 | 7 6 5 4 | 3 2 1 0 |
|---|---|---|---|---|---|---|---|---|---|---|---|---|
| APSA[N]  | dd | 2 | 1 1 | alu 1 | sh1 | dd | sh2msb | 0 0 | sh2lsb | N#1 | 1 0 1 0 | alu 2 |
| ANGA[N]  | dd | 2 | 1 1 | alu 1 | sh1 | dd | sh2msb | 0 0 | sh2lsb | N#0 | 1 0 1 0 | alu 2 |
| APSB[N]  | dd | 2 | 1 1 | alu 1 | sh1 | dd | sh2msb | 0 0 | sh2lsb | N#1 | 1 0 0 1 | alu 2 |
| ANGB[N]  | dd | 2 | 1 1 | alu 1 | sh1 | dd | sh2msb | 0 0 | sh2lsb | N#0 | 1 0 0 1 | alu 2 |
| AGT[N]   | dd | 2 | 1 1 | alu 1 | sh1 | dd | sh2msb | 0 0 | sh2lsb | N   | 0 1 1 1 | alu 2 |
| ALT[9]   | dd | 2 | 1 1 | alu 1 | sh1 | dd | sh2msb | 0 0 | sh2lsb | N   | 0 0 1 1 | alu 2 |
| AGTE[N]  | dd | 2 | 1 1 | alu 1 | sh1 | dd | sh2msb | 0 0 | sh2lsb | N   | 0 1 1 0 | alu 2 |
| ALTE[N]  | dd | 2 | 1 1 | alu 1 | sh1 | dd | sh2msb | 0 0 | sh2lsb | N   | 0 1 0 0 | alu 2 |
| AEQU[N]  | dd | 2 | 1 1 | alu 1 | sh1 | dd | sh2msb | 0 0 | sh2lsb | N   | 0 1 0 1 | alu 2 |
| AMLW[N]  | dd | 2 | 1 1 | alu 1 | sh1 | dd | sh2msb | 0 0 | sh2lsb | N#0 | 1 0 0 0 | alu 2 |
| AALW[9]  | dd | 2 | 1 1 | alu 1 | sh1 | dd | sh2msb | 0 0 | sh2lsb | N#1 | 1 0 0 0 | alu 2 |
| ACYF[9]  | dd | 2 | 1 1 | alu 1 | sh1 | dd | sh2msb | 0 0 | sh2lsb | N   | 0 0 0 0 | alu 2 |
| AECF[N]  | dd | 2 | 1 1 | alu 1 | sh1 | dd | sh2msb | 0 0 | sh2lsb | N   | 0 0 1 0 | alu 2 |
| ADCF[N]  | dd | 2 | 1 1 | alu 1 | sh1 | dd | sh2msb | 0 0 | sh2lsb | N   | 0 0 0 1 | alu 2 |
| APTH[N]  | dd | 2 | 1 1 | alu 1 | sh1 | dd | sh2msb | 0 0 | sh2lsb | N   | 1 0 1 1 | alu 2 |
| ANAM[N]  | dd | 2 | 1 1 | alu 1 | sh1 | dd | sh2msb | 0 0 | sh2lsb | N   | 1 1 0 0 | alu 2 |
| AEXT[N]  | dd | 2 | 1 1 | alu 1 | sh1 | dd | sh2msb | 0 0 | sh2lsb | N   | 1 1 0 1 | alu 2 |
| AOVF[N]  | dd | 2 | 1 1 | alu 1 | sh1 | dd | sh2msb | 0 0 | sh2lsb | N   | 1 1 1 0 | alu 2 |

Possible codes values for "alu1" and "alu2" are defined in bit positions 26 through 23 of table 2, and for "sh1" "sh2" in bit positions 22 through 19 of table 2. "sh2msb" represents the most significant two bits of the shift code while "sh2lsb" represents the least significant two bits of the shift code.

TABLE 5a

Secondary Field

Control Commands:

| | |
|---|---|
| LOG | Initiate signed magnitude to logarithm conversion |
| ALOG | Initiate logarithm to signed magnitude conversion |
| FLP | Initiate signed magnitude to floating point conversion |
| LML | Initiate an 8 by 16 bit linear signed magnitude multiplication |
| FML | Initiate a 4e, 6m by 4e, 6m floating point multiplication with conversion from floating point to signed magnitude conversion. |
| PAG0 | Select data memory page 0 |
| PAG1 | Select data memory page 1 |
| AOK | Set AOK flag high |
| ROK | Set ROK flag high |
| SOK | Set SOK flag high |

Data I/O Commands:

| | |
|---|---|
| PT3 | Load data output port 3 |
| PT4 | Load data output port 4 |

Data Memory Store Commands:

| | | |
|---|---|---|
| STC | <mm> | Direct memory store of reg C |
| STCB | | Bus direct memory store of reg C |

TABLE 5b

| | Secondary Field | | | | | | | | | | | | | |
|---|---|---|---|---|---|---|---|---|---|---|---|---|---|---|
| Mnemonic | 14 | 13 | 12 | 11 | 10 | 9 | 8 | 7 | 6 | 5 | 4 | 3 | 2 | 1 | 0 |
| Control Commands | | | | | | | | | | | | | | | |
| LOG   | X | X | . | . | 1 | 0 | 1 | 0 | 1 | X | X | X | X | X | X |
| ALOG  | X | X | . | . | 1 | 0 | 1 | 0 | 0 | X | X | X | X | X | X |
| FLP   | X | X | . | . | 1 | 0 | 0 | 1 | 1 | X | X | X | X | X | X |
| FML   | X | X | . | . | 1 | 0 | 0 | 0 | 1 | X | X | X | X | X | X |
| LML   | X | X | . | . | 1 | 0 | 0 | 0 | 0 | X | X | X | X | X | X |
| LML16 | X | X | . | . | 1 | 1 | 1 | 0 | 1 | X | X | X | X | X | X |
| PAG0  | X | X | . | . | 0 | 1 | 0 | 1 | 1 | X | X | X | X | X | X |
| PAG1  | X | X | . | . | 1 | 1 | 0 | 1 | 1 | X | X | X | X | X | X |
| AOK   | X | X | . | . | 1 | 1 | 0 | 0 | 1 | X | X | X | X | X | X |
| SOK   | X | X | . | . | 1 | 1 | 0 | 1 | 0 | X | X | X | X | X | X |
| ROK   | X | X | . | . | 1 | 1 | 0 | 0 | 0 | X | X | X | X | X | X |
| Data Port Output Commands | | | | | | | | | | | | | | | |
| PT3 | X | X | . | . | 1 | 0 | 1 | 1 | 1 | X | X | X | X | X | X |
| PT4 | X | X | . | . | 1 | 0 | 1 | 1 | 0 | X | X | X | X | X | X |
| Memory Store Commands | | | | | | | | | | | | | | | |
| STC m | 0 | 0 | . | . | 1 | 0 | 0 | 1 | 0 | m5 | m4 | m3 | m2 | m1 | m0 |
| ST m  | 0 | 0 | . | . | 1 | 1 | 1 | 0 | 0 | m5 | m4 | m3 | m2 | m1 | m0 |
| STCB  | 0 | 0 | . | . | 0 | 0 | 0 | 1 | 0 | X | X | X | X | X | X |
| STBD  | 0 | 0 | . | . | 0 | 1 | 1 | 0 | 0 | X | X | X | X | X | X |

"." denotes bits defined in the referencing table
"X" denotes don't care

APPENDIX A

```
!*****************************************************************
!*
!*      *******************************************************
!*      *              Copyright (C) 1987 By                  *
!*      *              General DataComm Inc.                  *
!*      *******************************************************
!*      *Information contained Herein is Proprietary to General*
!*      *DataComm Inc. & any use without the Prior written con-*
!*      *sent of General DataComm Inc. is expressly Prohibited.*
!*      *******************************************************
!*
!*
!*      MODULE NAME : ADPCM Transcoder LSI Microcode
!*
!*      VERSION :     1.0
!*
!*      FUNCTION    : This is the source program for the ADPCM Transcoder LSI.
!*
!*                    This version 1.0 supports the following full-duplex ADPCM
!*                    algorithms:
!*
!*                    1. 32 kbps CCITT Rec. G.721. October 1984
!*                    2. 32 kbps ANSI Comm. T1, March 28, 1985
!*                    3. 32 kbps CCITT/ANSI, July 23, 1985
!*                    4. 32 kbps GDC (Improved VBD performance), March 1, 1987
!*                    5. 24 kbps GDC, March 1, 1987
!*
!*                    An encode operation is triggered on receipt of the encode
!*                    flag, set in response to a positive transition of the
!*                    external Encode Sync signal ESYNC. The return statement
!*                    at the end of the encode routine automatically clears the
!*                    encode flag.
!*
!*                    Similarly, a decoder operation is triggered on receipt
!*                    of the decode flag, set is response to a positive
!*                    transition of the external Decode Sync signal DSYNC.
!*                    The return statement at the end of the decode routine
!*                    automatically clears the decode flag.
!*
!*                    The responsibility for calling the encode or decode
!*                    routines lies with the encode/decode arbiter. This
!*                    routine allows the encoder and decoder to operate in an
!*                    asynchronous manor.
!*
!*                    The encoder inputs from the encode PCM data port 8 bit
!*                    Mu-law or A-Law PCM data and outputs to the encode DPCM
!*                    data port 4 bit, 3 bit, or 2 bit ADPCM data. The decoder
!*                    inputs from the decode DPCM data port 4 bit, 3 bit, or
!*                    2 bit ADPCM data and outputs to the decode PCM data port
!*                    8 bit Mu-law or A-law PCM data. Additionally, a PCM
!*                    pass-through mode may be selected where the ADPCM data
!*                    ports will handle 8 bit PCM data.
!*
!*
```

```
!*      Three External flag inputs PTH, EXT, NAM representing
!*      the algorithm selects ALG SEL2, ALG SEL1 and ALG SEL 0
!*      respectively define the selected ADPCM bit-rate, while a
!*      fourth flag input MLAW selects Mu-law or A-law PCM.
!*      A fith flag input OVEG indicates a robbed-bit signalling
!*      frame condition. This flag occurs one frame in advance of
!*      of the signal frame to compensate for the instrinsic one
!*      frame processing delay of the encoder. The decoder uses
!*      the OVEG to set a counter to determine the frame following
!*      the signalling frame to compensate for the one frame delay
!*      associated with inputing an ADPCM data value.
!*
!*      The reset function associated with the old CCITT and ANSI
!*      versions of the algorithm are implemented with an
!*      initialisation of RAM variables following a hardware
!*      reset.
!*
!*
!*      PROGRAMMER  :   Peter Boreland          5th March 1987
!*
!*      REVIEWER    :   n.a.
!*
!*      REV. HISTORY:
!*
!*
!*****************************************************************

!*****************************************************************
!*
!*
!*      PROGRAM STATISTICS
!*      ------------------
!*
!*      ENCODER                         INST        MAX TIME
!*      -------                         ----        --------
!*      MAIN PROGRAM                      16          1900
!*      ALGIDNT                           34          1800
!*      PCM EXPAND AND QUANTIZER         173          5600
!*      RWIFI                            101          1800
!*      INVERSE QUANTIZER                 16          1600
!*      SIGNAL RECONSTRUCT                58          6400
!*      PREDICTOR                        165         26900
!*         SPCNTL                         30          4200
!*      YSCALE                            50          5900
!*
!*                     SUB TOTAL         651        56300ns
!*      DECODER
!*      -------
!*      MAIN PROGRAM                      25          2900
!*      ALGIDNT                                       1800
!*      RFIWI                                         1800
!*      INVERSE QUANTIZER                             1600
!*      SIGNAL RECONSTRUCT                            6400
!*      PCM COMPRESS                     113          4000
!*      SYNC                              28          8400
!*      PREDICTOR                                    26900
!*         SPCNTL                                     4200
!*      YSCALE                                        5900
!*
!*                     SUB TOTAL         166        63900ns
```

```
!*     INITIALIZATION
!*     --------------
!*     MAIN                            2
!*     RAM TEST                       44
!*     RAM INITIALIZATION             36
!*
!*                     SUB TOTAL      82
!*     MISCELLANEOUS
!*     -------------
!*     ENCODE/DECODE ARBITER          17              500
!*     PASS THROUGH                   18
!*
!*                     SUB TOTAL      35              500ns
!*                                   ---              --------
!*                        TOTAL      934              120700ns
!*                                   ---              --------
!*
!*
!***************************************************************

!***************************************************************
!*
!*     NAME      :  INITIALISATION
!*
!*     FUNCTION  :  On receipt of a hardware reset a diagnostic check on the
!*                  RAM is performed followed by an initailisation of variables.
!*                  Successful completion of the RAM check is indicated by
!*                  setting the external device fail signal high, by invoking
!*                  the ROK, SOK, and AOK secondary commands. Should the test
!*                  fail the device fail signal remaining in the low state
!*                  resulting from the hardware reset.
!*
!*
!*     NUMBER OF INSTRUCTIONS : 2
!*
!*     MAX EXECUTION TIME : not applicable
!*
!*
!***************************************************************
!
MAIN   CALL:  RAMTST:       PERFORM RAM DIAGNOSTIC
!
RFAIL  CALL:  INIT:         SET PROGRAM VARIABLES TO G.721/ANSI SPECIFIED
!                           RESET VALUES.
!
!

!***************************************************************
!*
!*     NAME      :  ENCODE/DECODE ARBITER
!*
!*     FUNCTION  :  Main control loop.
!*
!*                  The encode/decode arbiter calls the encoder or decoder
!*                  depending on the state of the encode and decode flags.
!*                  The first time the encoder or decoder is called following
!*                  a device reset, the pcm and dpcm receive registers will
```

```
!*                      contain invalid data. The encode/decode arbiter detects
!*                      the first time either the encoder or decoder is called,
!*                      and ignores the occurence.
!*
!*      INPUTS    :     ECF flag, DCF flag
!*
!*      OUTPUTS   :     Clear ECF flag, clear DCF flag
!*
!*      NUMBER OF INSTRUCTIONS : 17
!*
!*      MAX EXECUTION TIME : 500ns
!*
!*
!*********************************************************************
!
SCAN1ST JECF:   1STENC;
        JDCF:   1STDEC;
        JUMP:   SCAN1ST;
!
1STENC  CLRE:
DLOOP   JDCF:   1STDCEC;
        CECF:   ENCODE;
        JUMP:   DLOOP;
!
1STDEC  CLRD:
ELOOP   JECF:   1STECDC;
        CDCF:   DECODE;
        JUMP:   ELOOP;
!
1STDCEC CLRD:
        JUMP:   SCAN;
1STECDC CLRE:
SCAN    CECF:   ENCODE;         MAIN PROGRAM LOOP WHICH LOOKS FOR ENCODE
        CDCF:   DECODE;         AND DECODE FLAGS.
        JUMP:   SCAN;
!

!*********************************************************************
!*
!*      NAME      :     ENCODE ROUTINE
!*
!*      FUNCTION  :     Main program for the encoder
!*
!*      INPUTS    :     PCM (SL) value form data port 2
!*
!*      OUTPUTS   :     ADPCM (I) value to data port 4
!*
!*      NUMBER OF INSTRUCTIONS : 16
!*
!*      MAX EXECUTION TIME : 1900ns
!*
!*
!*********************************************************************
!
ENCODE  LDD:    2,00000;
        $PAG0:
!
        JOVFN:  ECONT;          IF ROBBED BIT SIGNALLING FLAG IS SET
        LDD:    B,65535;        SET ACC B = -1
!
```

```
ECONT   CALL:   ALGIDNT;
!
        MVP2:   B;                  GET PCM WORD FROM PORT 2 AND SET RAM PAGE 0
!
        JPTH:   EPSSTH;
!
ECONT2  CALL:   EXPQRN;
!
        CALL:   RWIEI;
!
        CALL:   IAQUAN;
!
        CALL:   RECNST;
!
        CALL:   APRDCT;
!
        LDM:    A,I;
        AOVF:   A;
        $MVA:   L1;
        #MVA:   NS;
        MVA:    NS,*;               OUTPUT ADPCM VALUE TOWARDS AGGREGATE
        $PT4:
!
        CALL:   YSCALE;
!
        RTEI:
!
```

```
!*******************************************************************
!*
!*      NAME     : ENCODE PCM PASS-THROUGH
!*
!*      FUNCTION : Output received PCM value to ADPCM data port 4 and return
!*                 from encode interrupt.
!*
!*      INPUTS   : Reg B - received PCM value
!*
!*      OUTPUTS  : Port 4 - PCM value if pass-through condition true
!*                 Reg B - ADPCM value if condition is false
!*
!*      REGISTERS MODIFIED : Reg A and Reg C
!*
!*      CAVEATS  : This subroutine adds 200ns to the main encode routine
!*
!*      NUMBER OF INSTRUCTIONS : 9
!*
!*      MAX EXECUTION TIME : 900ns
!*
!*
!*******************************************************************
!
EPSSTH  JEXTN:  ECONT2;             DECODE PASS THROUGH FLAG CONDITION
        JNAMN:  ECONT2;             PT=1, EXT=1, AND NAM=1
        LDD:    A,00127;
        AND:    NS,C;
        LDD:    A,32768;
        AND:    NS,A;
        MVC:    B;
        ORR:    R8,*;
        $PT4:
        RTEI:
!
```

```
!*****************************************************************
!*
!*      NAME     : DECODE ROUTINE
!*
!*      FUNCTION : Main program for the decoder
!*
!*      INPUTS   : ADPCM (I) value form data port 1
!*
!*      OUTPUTS  : PCM (SD) value to data port 3
!*
!*
!*      NUMBER OF INSTRUCTIONS : 25
!*
!*      MAX EXECUTION TIME : 2900ns
!*
!*
!*****************************************************************
!
DECODE  NOP1:
        $PAG1:
!
        LDM:    A,SIGFRM;
        JOVEN:  DCONT;              IF ROBBED BIT SIGNALLING FLAG IS SET
        LDD:    A,04096;            LOAD SIGNALLING FRAME COUNTER (0x1000)
DCONT   MVA:    L1,BC;
        NOP1:
        $STC:   SIGFRM;
!
        CALL:   ALGIDNT;
!
        MVP1:   -A;                 GET ADPCM VALUE FROM PORT 1 AND SET RAM PAGE 1
!
        JPTH:   DPSSTH;
!
DCONT2  LDM:    B,SIGFRM;           IF THE SIGNALLING FLAG IS SET SHIFT RECEIVED
        ANGB:   A;                  ADPCM VALUE RIGHT ONE PLACE
        $MVA:   R1;
        $MVA:   NS;
!
        MVC:    B;                  ACC B HOLDS THE MASK VALUE WHICH DIFFERS FOR
                                    EACH BIT RATE
!
        AND:    NS,AC;              IF ADPCM VALUE IS NEGATIVE, STRIP THE SIGN
        $STC:   IMASK;
        ANGA:   A;                  AND COMPLIMENT, ELSE LEAVE IT ALONE.
        $XOR:   NS;
        $MVA:   NS;                 UNPERTURBED ADPCM VALUE MUST BE LEFT IN C.
!
        NOP1:                       UPDATE I WITH ADPCM VALUE
        $STC:   I;
        NOP1:
        $STC:   IRX;                UPDATE IRX (USED BY SYNC MODULE)
!
        CALL:   RWIFI;
!
        CALL:   IAQUAN;
!
        CALL:   RECNST;
!
```

```
         CALL:   COMPRS;
!
         CALL:   SYNC;
!
         LDM:    *,SD;             OUTPUT PCM VALUE TOWARDS THE CODEC
         $PT3:
!
         CALL:   APRDCT;
!
         CALL:   YSCALE;
!
         RTDI:
!
```

```
!****************************************************************************
!*
!*       NAME      : DECODE PCM PASS-THROUGH
!*
!*       FUNCTION  : Output received PCM value from ADPCM data port 1
!*                   to PCM data port 3, and return from encode interrupt.
!*
!*       INPUTS    : Reg A - received PCM value
!*
!*       OUTPUTS   : Port 1 - PCM value if pass-through condition is true
!*                   Reg A - received ADPCM value if condition is false
!*
!*       REGISTERS MODIFIED : Reg B and Reg C
!*
!*       CAVEATS   : This subroutine adds 200ns to the main encode routine
!*
!*       NUMBER OF INSTRUCTIONS : 9
!*
!*       MAX EXECUTION TIME : 900ns
!*
!*
!****************************************************************************
!
DPSSTH   JEXTN:  DCONT2;           DECODE PASS THROUGH FLAG CONDITION
         JNAMN:  DCONT2;           PT=1, EXT=1, AND NAM=1
         LDD:    B,00127;
         AND:    NS,C;
         LDD:    B,32768;
         AND:    NS,A;
         MVC:    B;
         ORR:    R8,*;
         $PT3:
         RTDI:
!
```

```
!****************************************************************************
!*
!*       NAME      : ALGORITHM IDENTIFICATION
!*
!*       FUNCTION  : Determine which of six ADPCM algorithms to execute according
!*                   to the following table:
!*
```

```
!*   REGB PTH EXT NAM  ANSI GDC I-MASK AIDNT
!*
!*    +   0   0   0    0    0   8007   0     32 kbps CCITT G.721 old version
!*    +   0   0   1   -1    0   8007   1     32 kbps ANSI old version
!*    +   0   1   0   -1   -1   800F   2     40 kbps GDC (reserved)
!*    +   0   1   1   -1   -1   8003   3     24 kbps GDC
!*    +   1   0   0   -1   -1   8007   0     32 kbps CCITT/ANSI new version
!*    +   1   0   1   -1   -1   8007   1     32 kbps GDC
!*    +   1   1   0    0    0   8001   4     16 kbps GDC (reserved)
!*
!*    -   0   0   0   -1    0   8003   3     24 kbps GDC
!*    -   0   0   1   -1    0   8003   3     24 kbps GDC
!*    -   0   1   0   -1   -1   8007   1     32 kbps GDC
!*    -   0   1   1    0   -1   8001   4     16 kbps GDC
!*    -   1   0   0   -1   -1   8003   3     24 kbps GDC
!*    -   1   0   1   -1   -1   8003   3     24 kbps GDC
!*    -   1   1   1    0    0   8001   4     16 kbps GDC (reserved)
!*
!*   INPUTS   :  Reg B - if positive no signalling frame condition exists.
!*                       if negative then select appropriate bit-rate for
!*                       signalling frame.
!*
!*               NAM flag, PTH flag, EXT flag
!*
!*   OUTPUTS  :  Reg C - ADPCM data MASK value for the selected bit-rate.
!*
!*               RAM Loc 43 - ANSI soft flag indicating CCITT G.721 (low)
!*                            or ANSI (high) versions of the algorithm.
!*               RAM Loc 45 - GDC soft active high flag indicating GDC
!*                            modifications and or 202 modem fix.
!*               RAM Loc 46 - AIDNT selected algorithm offset address.
!*
!*   CAVEATS  :  The value IMASK passed via reg C is stored in RAM Loc 50
!*               by the decode routine.
!*
!*   NUMBER OF INSTRUCTIONS : 34
!*
!*   MAX EXECUTION TIME : 1800ns
!*
!***********************************************************************
!
ALGIDNT  LDD:   A,65535;             ANSI ALG_SEL = -1
         JEXT:  EXTSET;
         JNGB:  SIGSET;
!
ACONT1   LDD:   C,00001;             32KBIT/S ANSI
         JNAM:  ACONT3;
         JPTH:  ACONT3;
!
ACONT2   LDD:   C,00000;             32KBIT/S CCITT
         MVNA:  NS,A;                ANSI ALG_SEL = 0 (CCITT)
!
ACONT3   LDD:   B,32775;             32 KBIT/S MASK VALUE 0x8007
!
ACONT4   MVA:   NS,C;
         SSTC:  AIDNT;
```

```
          NOP1:                              ANSI=0  CCITT PREDICTOR
          $STC:    ANSI:                     ANSI=1  ANSI  PREDICTOR
          LDD:     AC,00000:
          JPTH:    ACONT5:                   IF PTH=0 AND EXT=0 THEN GDC=0
          JEXT:    ACONT6:                   TO SELECT THE 32KBPS ANSI AND CCITT
          JUMP:    AOUT;                     ALG'S WITH THE 202 MODEM MODIFICATION
!
ACONT5    JEXT:    AOUT:                     IF PTH=1 AND EXT=1 THEN GDC=0
ACONT6    MVNA:    NS,C;
!
AOUT      MVB:     C;                        MOVE MASK VALUE INTO REG C
          $STC:    GDC;
          RETN:
!
EXTSET    JPTH:    EPTHSET;
          JNAM:    ENAMSET;
          JNGB:    ESIGSET;
          LDD:     C,00002:                  40 KBIT/S ANSI
          LDD:     B,32783:                  40 KBIT/S MASK VALUE 0x800F
          JUMP:    ACONT4;
!
EPTHSET   LDD:     C,00004;                  16 KBIT/S CCITT
          LDD:     B,32769;                  16 KBIT/S MASK VALUE 0x8001
          JUMP:    ACONT4;
!
ENAMSET   JNGB:    EPTHSET:
!
SIGSET    LDD:     C,00003;                  24 KBIT/S ANSI
          LDD:     B,32771;                  24 KBIT/S MASK VALUE 0x8003
          JUMP:    ACONT4;
!
ESIGSET   LDD:     C,00001;                  32 KBIT/S ANSI
          JUMP:    ACONT3:
!

!*********************************************************************
!*
!*    NAME     : EXPAND AND QUANTIZE SUBROUTINE
!*
!*    FUNCTION : Input PCM Format Conversion, Difference Signal Computation,
!*               and Adaptive Quantizer
!*
!*    INPUTS   : Reg B - SL received PCM value
!*               RAM Loc 13 - SE signal estimate
!*               RAM Loc 41 - Y quantizer scale factor
!*               RAM Loc 46 - AIDNT selected algorithm offset address
!*               LAW flag
!*
!*    OUTPUTS  : Reg A - IM magnitude of I
!*               Reg B - I ADPCM value
!*               RAM Loc 4 - I ADPCM value
!*
!*    CAVEATS  : RAM Loc 0 - TEMP0 temporary register 0
!*               RAM Loc 1 - TEMP1 temporary register 1
!*
!*               The value IM in reg A is an input to the ANTSI subroutine.
!*               The value I in reg B is an input to the SYNC subroutine.
!*
```

```
!*    NUMBER OF INSTRUCTIONS : 181
!*
!*    MAX EXECUTION TIME : 6100ns
!*
!*                          INSTR    TIME    TOTAL
!*           EXPQRN          20      1800    1800
!*           QUAN            21      2000    2000
!*           Q TABLES
!*           16 LEVEL        20
!*           15 LEVEL        20      1300    1300
!*           31 LEVEL       (40)    (1600)
!*            9 LEVEL         9      1300
!*            4 LEVEL        (5)      700
!*           I VALUE TABLE   19       300     300
!*              (31 LEVEL)  (16)
!*           A LAW TABLE     32       400     400
!*           Mu LAW TABLE    32       400
!*                          ---              ----
!*                          173              5800
!*
!***********************************************************************
!
EXPQRN  JALW:   ALAW;           SELECT A OR MU LAW EXPANSION TABLE ADDRESS
!
        LDD:    C,%MBASE;
        MVNB:   BC;
        $STC:   TEMP0;
        JUMP:   MLWENT;
!
ALAW    LDD:    C,%ABASE;
        LDD:    A,32853;        FOR A-LAW PERFORM EVEN BIT INVERSION AND
        XOR:    NS,BC;          TOGGLE THE SIGN BIT.
        $STC:   TEMP0;
!
MLWENT  LDD:    A,00112;        SEGMENT NUMBER OF INPUT PCM WORD IS USED
        AND:    NS,A;           AS OFFSET TO A OR MU LAW TABLE BASE ADDRESS.
        $STC:   TEMP1;
        LDM:    B,TEMP0;
        ADD:    R2,C;
        LDM:    A,TEMP1;
        LDD:    B,00240;
        AND:    L4,A;
        MVC:    C;
!
        CALL:   *;              VECTOR TO APPROPRIATE TABLE FOR EXPANSION
!
        LDM:    A,TEMP1;        RESTORE THE SIGN TO THE EXPANDED INPUT
        ANGA:   A;
        $NEG:   NS;
        $MVB:   NS;
!
SUBTA   LDM:    B,SE;           SUBTRACT PREDICTED SIGNAL FROM EXPANDED INPUT
        SUB:    NS,BC;
!
```

```
!****************************************************************
!
!              ADAPTIVE QUANTIZER              INSTRUCTIONS = 26
!                                                      TIME = 2200ns
!
!****************************************************************
!
QUAN    ABS:    D;              TAKE LOG(BASE 2) OF MAGNITUDE OF DIFFERENCE
        $LOG:                   SIGNAL
!
        NOP2:                   DELAY FOR LOG CONVERSION
        NOP2:
        NOP1:
        $STC:   TEMP1;          TEMPORARILY STORE DIFFERENCE SIGNAL D
!
CONT    LDD:    B,%JTBL;        ADD ALGORITHM IDENTIFICATION NUMBER TO TABLE
        LDM:    A,AIDNT;        JUMP TABLE BASE ADDRESS.
        ADD:    NS,C;
!
SUBT    MVE:    B;
        $LOG:
        LDM:    A,Y;            GET YSCALE VALUE Y
        SBB:    R2,A;           AND SUBTRACT FROM LOG OF DIFFERENCE
!
        MVC:    *;              LOOKUP QUANTIZER JUMP ADDRESS
        JUMP:   *;
!
JTBL    JUMP:   QURN16;         16-LEVEL
        JUMP:   QURN15;         15-LEVEL
        JUMP:   QURN15;         RESERVED FOR 31-LEVEL (defaulted to 15-level)
        JUMP:   QURN7;          7-LEVEL
        JUMP:   QURN15;         RESERVED FOR 4-LEVEL (defaulted to 15-level)
!
!                               ON RETURN FROM QURNn THE MAGNITUDE OF I
!                               RESIDES IN ACC A
!
CONT2   LDM:    B,TEMP1;        RELOAD THE ORIGINAL DIFFERENCE SIGNAL AND
        APSB:   C;              FORM I VALUE
        $MVA:   NS;
        $MVNA:  NS;
!
QRETN   MVC:    B;              I IS USED BY THE SYNC ROUTINE IN ACC B
        $STC:   I;
!
        RETN:
!

!****************************************************************
!
!         16 LEVEL QUANTIZER (CCITT G.721 OLD VERSION)
!
!                                              INSTRUCTIONS = 20
!                                                      TIME = 1300ns
!
!****************************************************************
!
QURN16  LDD:    B,00355;
        JLTE:   $Q161;
```

```
            LDD:    B,02047;
            JLTE:   $Q163;
!
            LDD:    B,65528;
            JLTE:   IM0C;
!
            JUMP:   IM01;
!
$Q161       LDD:    B,00260;
            JLTE:   $Q162;
!
            LDD:    B,00309;
            JLTE:   IM04;
!
            JUMP:   IM05;
!
$Q162       LDD:    B,00122;
            JLTE:   IM01;
!
            LDD:    B,00201;
            JLTE:   IM02;
!
            JUMP:   IM03;
!
$Q163       LDD:    B,00404;
            JLTE:   IM06;
!
            JUMP:   IM07;
!
```

```
!*********************************************************************
!
!                15 LEVEL QUANTIZER (ANSI)      INSTRUCTIONS = 00
!                                               TIME = 1500ns
!
!*********************************************************************
!
QURN15      LDD:    B,00348;
            JLTE:   $Q151;
!
            LDD:    B,02047;
            JLTE:   $Q153;
!
            LDD:    B,65411;
            JLTE:   IM0N;
!
            JUMP:   IM01;
!
$Q151       LDD:    B,00245;
            JLTE:   $Q152;
!
            LDD:    B,00299;
            JLTE:   IM04;
!
            JUMP:   IM05;
!
```

```
$Q152   LDD:    B,00079;
        JLTE:   IM01;
!
        LDD:    B,00177;
        JLTE:   IM02;
!
        JUMP:   IM03;
!
$Q153   LDD:    B,00399;
        JLTE:   IM06;
!
        JUMP:   IM07;
!
```

```
!*********************************************************************
!
!              7 LEVEL QUANTIZER (GDC)        INSTRUCTIONS = 9
!                                             TIME = 1300ns
!
!*********************************************************************
!
QURN7   LDD:    B,00191;
        JLTE:   IM01;
!
        LDD:    B,00297;
        JLTE:   IM02;
!
        LDD:    B,02047;
        JLTE:   IM03;
!
        LDD:    B,65519;
        JLTE:   IMON;
!
        JUMP:   IM01;
!
```

```
!*********************************************************************
!
!              I VALUE TABLE                  INSTRUCTIONS = 19(+16)
!                                             TIME = 300ns
!
!*********************************************************************
!
IM0C    LDD:    A,00000;
        JUMP:   CONT2;
!
IMON    LDD:    BC,65535;
        LDD:    A,00000;
        JUMP:   ORETN;
!
IM01    LDD:    A,00001;
        JUMP:   CONT2;
!
IM02    LDD:    A,00003;
        JUMP:   CONT2;
```

```
!
 IM03   LDD:    A,00003;
        JUMP:   CONT2;
!
 IM04   LDD:    A,00004;
        JUMP:   CONT2;
!
 IM05   LDD:    A,00005;
        JUMP:   CONT2;
!
 IM06   LDD:    A,00006;
        JUMP:   CONT2;
!
 IM07   LDD:    A,00007;
        JUMP:   CONT2;
!

!**********************************************************************
!
!                   A-LAW EXPANSION TABLE         INSTRUCTIONS = 32
!                                                 TIME = 400ns
!
!**********************************************************************
!
ABASE   LDD:    B,00001;
        ADD:    R3,A;
        MVA:    L1,B;
        RETN;
!
ABASE4  LDD:    B,00033;
        ADD:    R3,A;
        MVA:    L1,B;
        RETN;
!
ABASE8  LDD:    B,00066;
        ADD:    R2,A;
        MVA:    L1,B;
        RETN;
!
ABASE12 LDD:    B,00132;
        ADD:    R1,A;
        MVA:    L1,B;
        RETN;
!
ABASE16 LDD:    B,00264;
        ADD:    NS,A;
        MVA:    L1,B;
        RETN;
!
ABASE20 LDD:    B,00528;
        ADD:    L1,A;
        MVA:    L1,B;
        RETN;
!
ABASE24 LDD:    B,01056;
        ADD:    L2,A;
        MVA:    L1,B;
        RETN;
```

```
ABASE28 LDD:    B,02112;
        ADD:    L3,A;
        MVA:    L1,B;
        RETN:
!

!*********************************************************************
!
!               MU-LAW EXPANSION TABLE        INSTRUCTIONS = 32
!                                             TIME = 400ns
!
!*********************************************************************
!
MBASE   LDD:    B,00000;
        ADD:    R3,A;
        MVA:    NS,B;
        RETN:
!
MBASE4  LDD:    B,00033;
        ADD:    R2,A;
        MVA:    NS,B;
        RETN:
!
MBASE8  LDD:    B,00099;
        ADD:    R1,A;
        MVA:    NS,B;
        RETN:
!
MBASE12 LDD:    B,00231;
        ADD:    NS,A;
        MVA:    NS,B;
        RETN:
!
MBASE16 LDD:    B,00495;
        ADD:    L1,A;
        MVA:    NS,B;
        RETN:
!
MBASE20 LDD:    B,01023;
        ADD:    L2,A;
        MVA:    NS,B;
        RETN:
!
MBASE24 LDD:    B,02079;
        ADD:    L3,A;
        MVA:    NS,B;
        RETN:
!
MBASE28 LDD:    B,04191;
        ADD:    L4,A;
        MVA:    NS,B;
        RETN:
!
```

```
!*********************************************************************
!*
!*      NAME     : RWIFI SUBROUTINE
!*
!*      FUNCTION : This routine performs the functions called RECONST, FUNCTW,
!*                 and FUNCTF which are the first functional modules of the
!*                 inverse adaptive quantizer, the quantizer scale factor
!*                 adaptation, and the adaptation speed control sections,
!*                 respectively, of the ADPCM algorithm.
!*
!*      INPUTS   : Reg A - IM magnitude of I
!*
!*      OUTPUTS  : RAM Loc 5 - DQLN log2 (normalized quantizer difference)
!*                 RAM Loc 6 - WI quantizer multiplier
!*                 RAM Loc 7 - FI output of F(I)
!*
!*      CAVEATS  : Look up tables are used to determine DQLN, WI, and FI
!*                 where IM forms the offset of an indexed call. A return
!*                 commands is used to exit the called location in the table.
!*
!*      NUMBER OF INSTRUCTIONS : 109
!*
!*      MAX EXECUTION TIME : 1800ns
!*
!*
!*                              INSTR   TIME
!*
!*              MAIN             21     1400
!*              IQ16             32      400
!*              IQ15             32
!*              IQ31            (64)
!*              IQ07             16
!*              IQ04             (8)
!*                              ---    ----
!*                              101    1800
!*
!*********************************************************************
!
RWIFI   MVA:    NS,C;           MOVE MAGNITUDE OF I (IM) INTO ACC C
        LDD:    B,%JTBL2;       ADD ALGORITHM IDENTIFICATION NUMBER TO
        LDM:    A,AIDNT;        RWIFI TABLE BASE ADDRESS
        ADD:    L1,*;
        JUMP:   *;
!
JTBL2   LDD:    B,%IQ16;        OBTAIN RWIFI TABLE BASE ADDRESS ACCORDING
        JUMP:   CONT3;          TO SELECTED BIT RATE
        LDD:    B,%IQ15;
        JUMP:   CONT3;
        LDD:    B,%IQ15;
        JUMP:   CONT3;
        LDD:    B,%IQ07;
        JUMP:   CONT3;
        LDD:    B,%IQ04;
!
CONT3   MVC:    A;              RESTORE ACC A WITH IM
        ADD:    L2,*;           COMPUTE RWIFI TABLE ADDRESS BASED ON THE IM
!
        CALL:   *;              VECTOR TO TABLE
!
```

```
       MVA:    NS,C;            STORE RETURNED VARIABLES: WHERE ACC = DOLN
       $STC:   DOLN;            ACC A = WI AND ACC B = FI

MVB:    C;
       $STC:   WI;

NOP1;
       $STC:   FI;

RETN;
```

!*****************************************************************
!
!       RWIFI TABLE FOR THE FUNCTIONS RECONT.FUNCTW, AND FUNCTF
!
!
!
!
!*****************************************************************
!
!

```
I016    LDD:    C,65401;        DOLN
        LDD:    A,65524;        WI
        LDD:    B,00000;        FI
        RETN:
!
I16+4   LDD:    C,00068;
        LDD:    A,00004;
        LDD:    B,00000;
        RETN:
!
I16+8   LDD:    C,00165;
        LDD:    A,00027;
        LDD:    B,00000;
        RETN:
!
I16+12  LDD:    C,00232;
        LDD:    A,00050;
        LDD:    B,00512;
        RETN:
!
I16+16  LDD:    C,00285;
        LDD:    A,00098;
        LDD:    B,00512;
        RETN:
!
I16+20  LDD:    C,00332;
        LDD:    A,00184;
        LDD:    B,00512;
        RETN:
!
I16+24  LDD:    C,00377;
        LDD:    A,00340;
        LDD:    B,01536;
        RETN:
!
```

```
I16+28   LDD:   C,00428;
         LDD:   A,01108;
         LDD:   B,03584;
         RETN:
!
!
I015     LDD:   C,63488;
         LDD:   A,65524;
         LDD:   B,00000;
         RETN:
!
I15+4    LDD:   C,00004;
         LDD:   A,00018;
         LDD:   B,00000;
         RETN:
!
I15+8    LDD:   C,00135;
         LDD:   A,00041;
         LDD:   B,00000;
         RETN:
!
I15+12   LDD:   C,00213;
         LDD:   A,00064;
         LDD:   B,00512;
         RETN:
!
I15+16   LDD:   C,00273;
         LDD:   A,00112;
         LDD:   B,00512;
         RETN:
!
I15+20   LDD:   C,00323;
         LDD:   A,00198;
         LDD:   B,00512;
         RETN:
!
I15+24   LDD:   C,00373;
         LDD:   A,00355;
         LDD:   B,01536;
         RETN:
!
I15+28   LDD:   C,00425;
         LDD:   A,01122;
         LDD:   B,03584;
         RETN:
!
I007     LDD:   C,63488;
         LDD:   A,65524;
         LDD:   B,00512;
         RETN:
!
I07+4    LDD:   C,00115;
         LDD:   A,00018;
         LDD:   B,00512;
         RETN:
!
I07+8    LDD:   C,00252;
         LDD:   A,00102;
         LDD:   B,01536;
         RETN:
```

```
I07+12  LDD:    C,00346;
        LDD:    A,00561;
        LDD:    B,02584;
        RETN:
```

!************************************************************************
!*
!*      NAME      : YSCALE SUBROUTINE
!*
!*      FUNCTION  : Quantizer Scale Factor Adaption. This routine is used
!*                  to estimate the energy of the coded voice signal from
!*                  the I value.
!*
!*      INPUTS    : RAM Loc 6  - WI quantizer multiplier
!*                  RAM Loc 42 - YLL lower 16 bits of YL slow quantizer scale
!*                               factor
!*                  RAM Loc 12 - YLM upper 3 bits of YL
!*                  RAM Loc 41 - Y quantizer scale factor
!*
!*      OUTPUTS   : RAM Loc 42 - YLL updated value
!*                  RAM Loc 12 - YLM updated value
!*                  RAM Loc 41 - Y updated value
!*                  RAM Loc 52 - YL>>6 shifted updated value of YL used by the
!*                               TRANS module in the RECNST subroutine
!*
!*      CAVEATS   : RAM Loc 0 - temporary register 0
!*
!*      NUMBER OF INSTRUCTIONS : 50
!*
!*      MAX EXECUTION TIME : 5900ns
!*
!************************************************************************
```
YSCALE  LDM:    B,Y;            FILTD
        NEG:    A;
        LDM:    B,WI;
        ADD:    RS,B;
        LDM:    A,Y;
        ADD:    NS,A;           YUT
!
LIMB    LDD:    B,05120;
        AGTT:   A;
        $MVB:   NS;
        $MVA:   NS;
        LDD:    B,00544;
        AGTT:   C;
        $MVA:   NS;
        $MVB:   NS;
FITLE   LDM:    B,YLL;          YLL=YL(16:0)
        NEG:    A;
        $STC:   TEMPO;
        LDM:    B,YLM;          YLM=YL(19:17)
        ACYE:   C;
        $NEG:   NS;
        $MVNB:  NS;
!
!       double precision right shift six places
!       of -YL : the result resides in ACCB
!
```

```
        LDD:    B,01023;
        AND:    R6,B;
        MVC:    A;
        MVA:    L4,A;
        MVA:    L4,A;
        ORR:    L2,B;
!
!       ACCB now contains (-YL) >> 6
!
        LDM:    A,TEMPO;
        ADD:    NS,A;
        LDM:    B,YLL;
        ADD:    NS,C;            NEW YLL
        MVC:    A;               MVC IS USED IN PLACE OF A NOP TO
        $STC:   YLL;             PREVENT THE CORRUPTION OF THE CARRY FLAG
        LDM:    B,YLM;           OLD YLM
        JPSA:   POS11;
        ACYE:   C;
        $MVB:   NS;
        $DEC:   NS;
        JUMP:   MIXC;
POS11   ACYEN:  C;
        $MVB:   NS;
        $INC:   NS;
!
MIXC    LDM:    A,YLL;
        LDD:    B,01023;
        AND:    R6,B;
        $STC:   YLM;             NEW YLM
        MVC:    A;               MOVE YLM INTO ACCA
        MVA:    L4,A;
        MVA:    L4,A;
        ORR:    L2,BC;           YLP>>6
        LDM:    A,TEMPO;
        SUB:    NS,B;            ACCB=YU-(YL>>6)
        $STC:   YL>>6;
!
!
        LDM:    D,AL;            LOAD MULTIPLIER WITH AL
        $LML:
!
        CVT:    D;               LOAD MULTIPLIER WITH SIGN MAG(YU - YL>>6)
        $LML:
!
!
!       delay to compensate for LML
!
        LDD:    B,65533;
LOOP2   INC:    B;
        JNGB:   LOOP2;
!
!       read result of LML from REGE
!
        MVE:    B;
        $LML:
!
!       convert into T's Comp
!
        CVT:    A;
        MVC:    B;               YL>>6
```

```
        ADD:    NS,C;           YL>>6 + PROD
        NOP1:
        $STC:   Y:
        RETN:
```

```
!*******************************************************************
!*
!*      NAME     : SPCNTL SUBROUTINE
!*
!*      FUNCTION : Qantizer Scale Factor Adaption Speed Control
!*
!*      INPUTS   : RAM Loc 7  - FI output of F(I)
*                  RAM Loc 8  - DMS delayed Short term average of F(I) sequence
*                  RAM Loc 9  - DML delayed Long term average of F(I) sequence
*                  RAM Loc 10 - AP delayed unlimited speed control parameter
*                  RAM Loc 41 - Y quantizer scale factor
*                  RAM Loc 47 - TR transition detect
*                  RAM Loc 48 - TDP Tone detect
!*
*                  PTH flag, EXT flag, NAM flag
*
*      OUTPUTS  : RAM Loc 11 - AL limited speed control parameter
*                  RAM Loc 8  - DMS updated short term average of F(I) sequence
*                  RAM Loc 9  - DML updated Long term average of F(I) sequence
*                  RAM Loc 10 - AP updated unlimited speed control parameter
*
*      CAVEATS  : If PTH = 1 and EXT = 0 and NAM = 0 then AL is set to zero.
*                  This gives improved voice band data performance and is
*                  classified as a GDC version 32 kbps ADPCM.
*
*      NUMBER OF INSTRUCTIONS : 38
*
*      MAX EXECUTION TIME : 4200ns
*
!*******************************************************************
!
SPCNTL  LDM:    A,FI;
        LDM:    B,DMS;
        SUB:    NS,A;
        ADD:    R5,C;
!
FILTB   LDM:    A,FI;
        LDM:    B,DML;
        SUB:    L2,A;
        $STC:   DMS;
        ADD:    R7,BC;

SUBTC   LDM:    A,DMS;
        SUB:    L2,B;
        $STC:   DML;

ABS:    B;              DIFM
        MVC:    A;              DMLP
        MVA:    R3,A;           DTHR
        JLTE:   AX01;           DTHR<=DIFM THEN AX01
        LDM:    A,Y;
        LDD:    B,01536;
```

```
        JLST:   AX01;              Y=>1536 THEN AX00
!                                  IF GDC=0 THEN TDP=0
        LDM:    A,TDP;             IF TDP=0 THEN ACC A=0
        JNGA:   AX01;
!
AX00    JUMP:   FILTC;
!
AX01    LDD:    A,00512;           Y<1536 OR DTHR<=DIEH OR TDP=1
!
FILTC   LDM:    B,AP;
        SUB:    NS,A;
        ADD:    R4,A;
        LDD:    B,01023;
        AND:    NS,AC;
!
        LDM:    B,TR;              IF GDC FLAG = 0 THEN TR IS FORCED 0
        JPSB:   LIMA;
        LDD:    AC,00256;
!
LIMA    LDD:    B,00256;
        AGTE:   A;
        $MVB:   .NS;
        *MVA:   NS;
        MVA:    R2,C;
        $STC:   AP;
!
        JPTHN:  SPCONT;            IF PTH=1 AND EXT= 0 AND NAM=0 THEN AL=0
        JEXT:   SPCONT;
        JNAM:   SPCONT;
        LDD:    C,00000;
!
SPCONT  NOP1:
        $STC:   AL;
        RETN:
!
```

```
*****************************************************************
*
*       NAME      : RECNST SUBROUTINE
*
*       FUNCTION  : Reconstruct Signal Calculation and utility work for the
*                   IIR section of the predictor
*
*       INPUTS    : RAM Loc 2  - DQ quantizer difference signal
*                   RAM Loc 3  - SEZ sixth order predictor partial signal
*                                estimate
*                   RAM Loc 13 - SE signal estimate
*                   RAM Loc 15 - PK1 sign of DQ + SEZ with delay 1
*                   RAM Loc 16 - PK0 sign of DQ + SEZ with delay 0
*                   RAM Loc 40 - SR0 reconstructed signal with delay 0
*                   RAM Loc 42 - ANSI flag specifing ANSI version (high) or
*                                CCITT version (low) of the old ADPCM algorithm
*                   RAM Loc 45 - GDC flag specifying selection of 202 modem TD
*                   RAM Loc 51 - TD delayed tone detect flag
*
*       OUTPUTS   : RAM Loc 14 - PK2 updated sign of DQ + SEZ with delay 2
*                   RAM Loc 15 - PK1 updated sign of DQ + SEZ with delay 1
*                   RAM Loc 16 - PK0 sign of DQ + SEZ with delay 0
*                   RAM Loc 25 - SR reconstructed signal
*                   RAM Loc 29 - DQZFG DQ zero detect flag
*                   RAM Loc 39 - SR1 updated reconstructed signal with delay 1
*                   RAM Loc 40 - SR0 updated reconstructed signal with delay 0
*                   RAM Loc 47 - TR transition detect flag
*
*       CAVEATS   : The DQZFG is used by the predictor to speed up the BCOEF
*                   routine
*
*                   RAM Loc 1  - temporary register 1
*
*       NUMBER OF INSTRUCTIONS : 58
*
*       MAX EXECUTION TIME : 6400ns
*
*****************************************************************
!
RECNST  LDM:    A,ANSI;         TEST ANSI FLAG
        JPSA:   RCCITT;
        LDM:    A,DQ;
        MVA:    L1,A;           FORM DQMAG
        LDD:    BC,00000;       IF DQMAG IS = 0, SET DQZFLG=0, THIS SAVES
        JEQU:   CNTT1;          TIME IN THE PREDICTOR BCOEF SUBROUTINE
RCCITT  LDD:    C,65535;
!
        LDM:    B,DQ;           ADD THE OUTPUT OF THE INVERSE QUANTIZER
CNTT1   CVT:    BC;             TO THE SIGNAL ESTIMATE AND CONVERT THE
        $STC:   DQZFG;          OUTPUT TO FLOATING POINT FORMAT.
!
        LDM:    A,SE;
        ADD:    NS,BC;
        $STC:   TEMP1;
        CVT:    D;
        $FLP:
!
        NOP1;
        $STC:   SR;
```

```
          LDM:    C,PK1;          SHIFT PKn VALUES
          NOP1;
          $STC:   PK2;
          LDM:    C,PK0;

!
!                 ADDC
!
          LDM:    A,TEMP1;        DQ
          LDM:    B,SEZ;          SEZ
          ADD:    NS,AC;          DQSEZ=DQ+SEZ (PK0=SIGN OF DQSEZ)
          $STC:   PK1;
          LDM:    B,GDC;          IF GDC=0 THEN SIGPK=0
          JPSB:   RCONT;
          LDD:    B,00000;
          AEQU:   B;              IF DQSEZ=0 THEN SIGPK=-1 ELSE SIGPK=
          $MVNB:  NS;
          IMVB:   NS;
RCONT     MVB:    C;              UPDATE PK0
          $STC:   PK0;
          NOP1;                   UPDATE SIGPK
          $STC:   SIGPK;
!
          LDM:    C,SR0;          SHIFT SKn VALUES
          NOP1;
          $STC:   SR1;
          MVE:    C;
          $ELP;
          NOP1;
          $STC:   SR0;
!
!                 TRANS
!
          LDM:    AC,YL>>6;       YL>>6
          MVA:    R8,A;           YLINT<<1
          LDD:    B,00008;
          SBB:    R1,B;           8-YLINT
          JPSB:   TCONT0;
          LDD:    D,01784;        1101.1111000
          $ALOG;
          JUMP:   TCONT1;
!
TCONT0    MVC:    A;              YL>>6
          MVA:    R4,A;           XXXX.XXXXX00
          MVA:    L2,A;
          LDD:    B,00640;        SCALE EXPONENT
          ADD:    NS,D;
          $ALOG;
!
!     compensate for alog
!
TCONT1    NOP2;
          NOP2;
          NOP1;
!
!     IF TD=0 THEN TR=0 ELSE TR=PROC(TCONT2)
!
          LDM:    B,TD;
          JPSB:   YOUT1;
!
```

```
TCONT2  MVE:    AB;             THR2
        $ALOG:
        ADD:    R1,A;           THR2 + THR2>>1
        MVA:    R1,B;           DQTHR=(THR2 + THR2>>1)>>1
        LDM:    A,DQ;
        MVA:    L1,A;           FORM DQMAG BY REMOVING
        MVA:    R1,A;           THE SIGN BIT
        JLTE:   YOUT1;          DQMAG<=DQTHR
        LDD:    C.65535;        DQMAG>DQTHR
        JUMP:   YOUT2;
!
YOUT1   LDD:    C.00000;
YOUT2   NOP1:
        $STC:   TR;
        RETN:
!
!*************************************************************************
!*
!*      NAME    :  ADAPTIVE PREDICTOR SUBROUTINE
!*
!*      FUNCTION : 6-zero, 2-pole adaptive predictor
!*
!*      INPUTS  :  RAM Loc 13 - SE signal estimate
!*                 RAM Loc 14 - PK2 sign of DQ + SEZ with delay 2
!*                 RAM Loc 15 - PK1 sign of DQ + SEZ with delay 1
!*                 RAM Loc 16 - PK0 sign of DQ + SEZ with delay 0
!*                 RAM Loc 17 - B6 delayed sixth order predictor coefficient
!*                 RAM Loc 18 - B5 delayed sixth order predictor coefficient
!*                 RAM Loc 19 - B4 delayed sixth order predictor coefficient
!*                 RAM Loc 20 - B3 delayed sixth order predictor coefficient
!*                 RAM Loc 21 - B2 delayed sixth order predictor coefficient
!*                 RAM Loc 22 - B1 delayed sixth order predictor coefficient
!*                 RAM Loc 23 - A2 delayed second order coefficient
*                  RAM Loc 24 - A1 delayed second order coefficient
*                  RAM Loc 32 - DQ6 quantizer difference signal with delay 6
!*                 RAM Loc 33 - DQ5 quantizer difference signal with delay 5
*                  RAM Loc 34 - DQ4 quantizer difference signal with delay 4
*                  RAM Loc 35 - DQ3 quantizer difference signal with delay 3
*                  RAM Loc 36 - DQ2 quantizer difference signal with delay 2
!*                 RAM Loc 37 - DQ1 quantizer difference signal with delay 1
*                  RAM Loc 38 - DQ0 quantizer difference signal with delay 0
*                  RAM Loc 40 - SR0 reconstructed signal with delay 0
*                  RAM Loc 43 - ANSI flag specifying ANSI version (high) or
!*                              CCITT version (low) of the old ADPCM algorithms
*                  RAM Loc 45 - GDC flag specifying selection of 202 modem FIX
!*                 RAM Loc 47 - TR transition detect flag
!*
*       OUTPUTS :  RAM Loc 3  - SEZ updated sixth order predictor partial
!*                              signal estimate
*                  RAM Loc 13 - SE updated signal estimate
*                  RAM Loc 17 - B6 updated sixth order predictor coefficient
*                  RAM Loc 18 - B5 updated sixth order predictor coefficient
*                  RAM Loc 19 - B4 updated sixth order predictor coefficient
*                  RAM Loc 20 - B3 updated sixth order predictor coefficient
*                  RAM Loc 21 - B2 updated sixth order predictor coefficient
*                  RAM Loc 22 - B1 updated sixth order predictor coefficient
*                  RAM Loc 23 - A2 updated second order coefficient
*                  RAM Loc 24 - A1 updated second order coefficient
*                  RAM Loc 32 - DQ6 updated
```

```
!*              RAM Loc 33 - DQ5 updated
!*              RAM Loc 34 - DQ4 updated
!*              RAM Loc 35 - DQ3 updated
!*              RAM Loc 36 - DQ2 updated
!*              RAM Loc 37 - DQ1 updated
!*              RAM Loc 38 - DQ0 updated
!*              RAM Loc 48 - TDP tone detect flag
!*              RAM Loc 51 - TD delayed tone detect flag
!*
!*  CAVEATS :  The SFCNTL subroutine is called from within the predictor
!*
!*             RAM Loc 0  - temporary register 0 is used as a scratch reg
!*
!*  NUMBER OF INSTRUCTIONS : 165
!*
!*  MAX EXECUTION TIME : 26900ns
!*
!*                          INSTR    TIME(ns)
!*
!*       DQ DELAY            15       1500
!*       FIR SECTION         48       5000
!*       BCOEF               16      10800    (6X1800)
!*       A1 COEF             35       3800
!*       A2 COEF             51       5800
!*                          ---      -----
!*                          165      26900
!*
!*
!**********************************************************************
!
APRDCT  LDM:    D,DQ;           TAKE THE LOG OF DQ
        $ELP:
!
        LDM:    C,DQ5;          SHIFT DQn VALUES
        NOP1:
        $STC:   DQ6;
!
        LDM:    C,DQ4;
        NOP1:
        $STC:   DQ5;
!
        LDM:    C,DQ3;
        NOP1:
        $STC:   DQ4;
!
        LDM:    C,DQ2;
        NOP1:
        $STC:   DQ3;
!
        LDM:    C,DQ1;
        NOP1:
        $STC:   DQ2;
!
        LDM:    C,DQ0;
        NOP1:
        $STC:   DQ1;
!
        MVE:    C;              GET THE LOG OF DQ.
        $ELP:
        NOP1:
        $STC:   DQ0;
``` begin FIR filter section first tap

```
LDM:    C,B1;
LDM:    B,DQ1;
CALL:   BCOEF;          UPDATE COEFFICIENT B1
NOP1:
$STC:   B1;
LDM:    D,DQ0;          FMULT 1
$FML:
``` second tap

```
LDM:    C,B2;
LDM:    B,DQ2;
NOP2:
CALL:   BCOEF;          UPDATE COEFFICIENT B2

MVE:    B;              GET WB1
$FML:
CVT:    C;
$STC:   B2;
NOP1:                   ACCUMULATE SE
$STC:   SE;
LDM:    D,DQ1;          FMULT 2
$FML:
``` third tap

```
LDM:    C,B3;
LDM:    B,DQ3;
CALL:   BCOEF;          UPDATE COEFFICIENT B3

MVE:    B;              GET WB2
$FML:
CVT:    A;
$STC:   B3;
LDM:    B,SE;
ADD:    NS,C;           ACCUMULATE SE
NOP1:
$STC:   SE;
LDM:    D,DQ2;          FMULT 3
$FML:
``` fourth tap

```
LDM:    C,B4;
LDM:    B,DQ4;
CALL:   BCOEF;          UPDATE COEFFICIENT B4

MVE:    B;              GET WB3
$FML:
CVT:    A;
$STC:   B4;
LDM:    B,SE;
ADD:    NS,C;           ACCUMULATE SE
NOP1:
$STC:   SE;
LDM:    D,DQ3;          FMULT 4
$FML:
``` fifth tap

```
LDM:    C,B5;
LDM:    B,DQ5;
CALL:   BCOEF;          UPDATE COEFFICIENT B5

MVE:    B;              GET WB4
$FML:
CVT:    A;
$STC:   B5;
LDM:    B,SE;
ADD:    NS,C;           ACCUMULATE SE
NOP1:
$STC:   SE;
LDM:    D,DQ4;          FMULT 5
$FML:
                sixth tap
LDM:    C,B6;
LDM:    B,DQ6;
CALL:   BCOEF;          UPDATE COEFFICIENT B6

MVE:    B;              GET WB5
$FML:
CVT:    A;
$STC:   B6;
LDM:    B,SE;
ADD:    NS,C;           ACCUMULATE SE
NOP1:
$STC:   SE;
LDM:    D,DQ5;          FMULT 6
$FML:
!
!               begin IIR filter section
!
!
!*************************************************************
!
!               A2 COEF UPDATE                 INSTRUCTIONS = 51
!
!                                              MAX TIME =
!
!*************************************************************
!
A2COEF  LDM:    A,PK0;
        LDM:    B,PK1;
        XOR:    NS,C;           FORM PSK1
        LDM:    B,PK2;          FORM PSK0
        XOR:    NS,C;
        $STC:   TEMP0;          REG C=PSK0, TEMP0=PSK1
!
        LDM:    A,A1;
        JPSA:   A1POS;          IF A1S=1 THEN A1NEG ELSE A1POS
!
A1NEG   LDD:    P,57345;        A1S=1
        AGTE:   B;              IF A1=>57345 FA1=A1 ELSE FA1=57345
        $MVA:   NS;
        $MVB:   NS;
        JUMP:   CT00;
!
```

```
A1POS   LDD:    B,08191;        A1S=0
        ALTE:   B;              IF A1<=8191 THEN FA1=A1 ELSE FA1=8191
        $MVA:   NS;
        #MVB:   NS;

CT00    LDM:    A,TEMP0;
        APSA:   B;              IF PSK1=0 THEN FA=NEG(FA1) ELSE FA=FA1
        $NEG:   NS;
        #MVB:   NS;
        MVC:    A;
        JPSA:   UGA2AP;

UGA2N   LDD:    A,61440;        IF PSK2=1 THEN UGA2A=61440
        JUMP:   CT01;

UGA2AP  LDD:    A,04096;        IF PSK2=0 THEN UGA2A=4096
CT01    ADD:    NS,A;           UGA2B=UGA2A+FA

LDM:    B,SIGPK;        IF GDC=0 THEN SIGPK=0
        APSB:   B;              IF SIGPK=0 THEN UGA2=UGA2B>>5 ELSE UGA2=0
        $MVA:   R5;
        #MVNB:  NS;
        LDM:    A,A3;
        SBB:    R7,B;           UGA2=UGA2-A2
        ADD:    NS,A;           A2T=A2+UA2

IMC     LDD:    B,12288;
        JNGA:   NEGB;
        AGTE:   A;              A2P
        $MVB:   NS;
        #MVA:   NS;
        JUMP:   A2EM;

NEGB    NEG:    B;
        ALTE:   A;              A2P
        $MVB:   NS;
        #MVA:   NS;

A2EM    JPSA:   A2CONT1;        IF A2 IS POS THEN TDP=0
        LDM:    RC,GDC;
        JPSB:   A2CONT2;        GDC=0 THEN TDP=0
        LDD:    B,53760;
        JLST:   A2CONT2;        IF GDC=-1 & AP2<53760 THEN TDP=-1

A2CONT1 LDD:    C,00000;
A2CONT2 NOP1:                   UPDATE TDP
        $STC:   TDP;

LDM:    B,TR;           IF GDC=0 THEN TR=0
        APSB:   AC;             IF TR=0 THEN A2=A2P ELSE A2=0
        $MVA:   NS;
        #MVNB:  NS;

update A2

MVA:    R2,B;           AP>>2=AP2>>2
        $STC:   A2;             A2=A2P
        CVT:    D;              MAG(AP>>2)
        $ELP:
```

```
!
!               update TD
!
        LDM:    B,TR;
        LDM:    A,TDP;          IF GDC=0 THEN TDP=0
        APSB:   C;              IF TR=0 THEN TD=TDP ELSE TD=0
        $MVA:   NS;
        $MVNB:  NS;
!
!               resume A2 COEF
!
        MVE:    B;              GET WBG
        $EML:
        CVT:    A;
        $STC:   TD;             UPDATE TD
        LDM:    B,SE;
        ADD:    NS,AC;          ACCUMULATE SE
        MVA:    R1,C;
        $STC:   SE;
        LDM:    D,SR1;          FMULT 7
        $EML:
!
!****************************************************************
!
!               A1 COEF UPDATE              INSTRUCTIONS = 36
!
!                                           MAX TIME = 3600ns
!
!****************************************************************
!
A1COEF  LDM:    A,TEMPO;
        LDD:    B,00192;
        APSA:   B;              UGA1
        $MVB:   NS;
        #NEG:   NS;
!
        LDM:    A,SIGPK;        IF GDC=0 THEN SIGPK=0
        APSA:   B;              IF SIGPK=0 THEN UGA1=UGA1 ELSE UGA1=0
        $MVB:   NS;
        $MVNA:  NS;
!
        LDM:    A,A1;
        SBB:    R8,B;
        ADD:    NS,C;
        $STC:   SEZ;
!
LIMD    LDD:    A,15360;
        LDM:    B,A2;
        SUB:    NS,B;
        MVC:    A;
        JNGA:   NEGA1;
!
POSA1   AGTE:   A;
        $MVB:   NS;
        #MVA:   NS;
        JUMP:   A1EM;
!
NEGA1   NEG:    B;
```

```
           ALTE:   A;
           $MVB:   NS;
           #MVA:   NS;

:1EM       LDM:    B,TR;           IF GDC=0 THEN TR=0
           APSB:   AC;
           $MVA:   NS;
           #MVNB:  NS;

update A1

:1CONT     MVA:    R2,B;
           $STC:   A1;
           CVT:    D;
           $FLP:

MVE:    B;              GET WA2
           $FML:
           CVT:    A;
           LDM:    B,SE;
           ADD:    NS,C;           ACCUMULATE SE
           NOP1:
           $STC:   SE;
           LDM:    D,SR0;
           $FML:                   FMULT 6

CALL:   SPCNTL;

MVE:    B;              GET WA1
           $FML:
           CVT:    A;
           LDM:    B,SE;           FINAL ACCUMULATION OF SE
           ADD:    NS,A;
           MVA:    R1,C;
           NOP1:                   UPDATE SE
           $STC:   SE;

RETN:
```

!******************************************************************************

RCOEF CALCULATION

INSTRUCTIONS = 46

MAX TIME = 1800ns

INPUTS: ACC3 = Bn
                        TR00 = Tn

OUTPUT: ACC0 = Bn UPDATE

******************************************************************************

```
:COEF      LDM:    A,DG;
           XOR:    NS,A;
           LDQ:    B,00128;
           AFSA:   B;
           $MVB:   NS;
           #NEG:   NS;
```

```
        LDM:    A,DQZEG;            CCITT  DQZEG=FFFFH
        AND:    NS,B;               ANSI   DQZEG=0000H IF DQMAG=0

MVC:    A;
        SBB:    R8,B;
        ADD:    NS,A;               CALCULATE Bn
        LDM:    B,TR;               IF GDC=0 THEN TR=0
        APSB:   AC;                 IF TR=0 THEN Bn=Bn else Bn=0
        $MVA:   NS;
        #MVNB:  NS;
        MVA:    R2,B;
        CVT:    B;
        LDD:    A,40959;
        AND:    NS,D;
        $ELP:
        RETN:
```

!****************************************************************************
!*
!*      NAME     : COMPRS SUBROUTINE
!*
!*      FUNCTION : Output PCM Format Conversion : converts the reconstructed
!*                 uniform PCM value SR into a Mu-law or A-Law PCM signal SP.
!*
!*      INPUTS   : RAM Loc 25 - SR reconstructed signal
!*
!*                 ALAW flag
!*
!*      OUTPUTS  : RAM Loc 26 - SP+ next more positive PCM reconstructed signal
!*                 RAM Loc 27 - SP  PCM reconstructed signal
!*                 RAM Loc 28 - SP- next more negative PCM reconstructed signal
!*
!*      CAVEATS  : The values SP+ and SP- are used by the sync module. SP values
!*                 are sign extended to 16 bits.
!*
!*      NUMBER OF INSTRUCTIONS : 112
!*
!*      MAX EXECUTION TIME : 4000ns
!*
!*
!****************************************************************************
!
COMPRS  LDM:    AB,SR;
        ABS:    B;
!
        JALW:   ALAWC;
!
!
!       ------------------
!       Mu_law compression
!       ------------------
!
!
        LDD:    A,00033;
        ADD:    NS,B;
        LDD:    A,08031;
        ALST:   D;

```
        $MVA:   NS;
        $MVB:   NS;
!
        NOP1:
        $LOG:
!
!       wait for log conversion
!
        NOP2:
        NOP2:
        NOP2:
        NOP2:
!
!
        MVE:    A;
        $LOG:
        LDD:    B,00080;
        SUB:    R3,A;
        LDM:    B,SR;
        JPSB:   MPOS;
!
!
MNEG    LDD:    B,00127;
        XOR:    NS,BC;
!
!       test if SR=-0
!
        LDD:    A,00127;
        JEQU:   MNZER;
!
!       test if SR=-8031
!
        LDD:    A,00000;
        JEQU:   MNEND;
!
!       calculate SP+ & SP-
!
        DEC:    C;
        $STC:   SP;
        INC:    C;
        $STC:   SP-;
        NOP1:
        $STC:   SP+;
        RETN:
!
!
MNZER   NOP1:
        $STC:   SP;
        LDD:    C,00254;
        DEC:    C;
        $STC:   SP+;
        NOP1:
        $STC:   SP-;
        RETN:
!
!
MNEND   NOP1:
        $STC:   SP;
        INC:    C;
```

```
           $STC:   SP-;
           NOP1:
           $STC:   SP+;
           RETN:
   !
   !
   !
   MPOS    MVNA:   NS,BC;
   !
   !       test for SR=0
   !
           LDD:    A,65535;
           JEQU:   MPZER;
   !
   !       test for SR=2031
   !
           LDD:    A,63408;
           JEQU:   MPEND;
   !
   !       calculate SP+ & SP-
   !
           INC:    C;
           $STC:   SP;
           DEC:    C;
           $STC:   SP-;
           NOP1:
           $STC:   SP+;
           RETN:
   !
   !
   MPZER   NOP1:
           $STC:   SP;
           LDD:    C,00126;
           DEC:    C;
           $STC:   SP-;
           NOP1:
           $STC:   SP+;
           RETN:
   !
   !
   MPEND   NOP1:
           $STC:   SP;
           INC:    C;
           $STC:   SP+;
           NOP1:
           $STC:   SP-;
           RETN:
   !
   !
   !       ------------------
   !       A_law compression
   !       ------------------
   !
   !
   ALAWC   JPSA:   PQST;
           INC:    A;
           MVA:    R1,B;
           DEC:    B;
           JUMP:   CONT1;
```

```
POST    MVB:    A;
        MVA:    B1,B;
!
CONT1   LDD:    A,00064;
        JGIT:   SEGO;
        LDD:    A,04032;
        ALST:   B;
        $MVA:   NS;
        $MVB:   NS;
!
        NOP1;
        $LOG;
!
!       wait for log conversion
!
        NOP2;
        NOP2;
        NOP2;
        NOP2;
!
        MVB:    A;
        $LOG;
!
        LDD:    B,00064;
        SUB:    R3,BC;
!
CNT2    LDM:    A,SR;
        JPSA:   APOS;
!
!       test if SR=-1
!
ANEG    LDD:    A,00000;
        JEQU:   ANONE;
!
!       test if SR=-4032
!
        LDD:    A,00127;
        JEQU:   ANEND;
!
!       calculate SP+ & SP-
!
        INC:    C;
        $STC:   SP;
        DEC:    C;
        $STC:   SP-;
        NOP1;
        $STC:   SP+;
        RETN;
!
ANONE   NOP1;
        $STC:   SP;
        LDD:    C,00128;
        INC:    C;
        $STC:   SP+;
        NOP1;
        $STC:   SP-;
        RETN;
```

```
ANEND   NOP1;
        $STC:   SP;
        DEC:    C;
        $STC:   SP-;
        NOP1;
        $STC:   SP+;
        RETN;
!
BEGO    MVR:    A;
        MVA:    R1,RC;
        JUMP:   CNT3;
!
APOS    LDD:    A,00128;
        XOR:    NS,PC;
!
!       test if SP=128
!
        JEQU:   APONE;
!
!       test if SP=255
!
        LDD:    A,00255;
        JEQU:   APEND;
!
!       calculate SP+ & SP-
!
        DEC:    C;
        $STC:   SP;
        INC:    C;
        $STC:   SP-;
        NOP1;
        $STC:   SP+;
        RETN;
!
APONE   NOP1;
        $STC:   SP;
        LDD:    C,00000;
        INC:    C;
        $STC:   SP-;
        NOP1;
        $STC:   SP+;
        RETN;
!
APEND   NOP1;
        $STC:   SP;
        DEC:    C;
        $STC:   SP+;
        NOP1;
        $STC:   SP-;
        RETN;
!
```

```
!*****************************************************************
!*
!*      NAME    : SYNC SUBROUTINE
!*
!*      FUNCTION : The module expands the value of SP and then re-encodes
!*                 this expanded value to yield a local value of I . The
!*                 magnitude of this new local I is then compared to that
!*                 received from the line. Depending on this comparison,
!*                 SP, SP+ or SP- is output.
!*
!*      INPUTS  : Reg B - I value (derived from the re-encode PCM value)
!*                RAM Loc 26 - SP+ next more positive PCM reconstructed signal
!*                RAM Loc 27 - SP  PCM reconstructed signal
!*                RAM Loc 28 - SP- next more negative PCM reconstructed signal
!*                RAM Loc 30 - IRX received value of I
!*                RAM Loc 25 - SR reconstructed signal
!*                RAM Loc 50 - IMASK data mask value for the selected
!*                             bit-rate value of I
!*
!*                MLW flag
!*
!*      OUTPUTS : RAM Loc 31 - SD decoder output PCM value
!*
!*      CAVEATS : The SP, SP+ & SP- values have already been created
!*                in SUBROUTINE COMPRS.
!*
!*                The value SD is output in the decode routine through
!*                output port 3.
!*
!*
!*      NUMBER OF INSTRUCTIONS : 28
!*
!*      MAX EXECUTION TIME : 8400ns
!*
!*
!*              SYNC         TIME = 2600ns
!*
!*              EXPAND/QUAN TIME = 5800ns
!*
!*****************************************************************
!
SYNC    JMLW:   MULAW:
!
!
!       must even_bit invert the A_law output of COMPRS.
!       must also make sure that SP is passed to EXPORN
!       in appropriate form, i.e:
!
!                       SP(8)   --->   ACCB(15)
!                       SP(7:0) --->   ACCB(7:0)
!
        LDM:    A,SR:
        JMGA:   ALNEG:
!
        LDD:    A,33981:
        XOR:    NS,B:
        JUMP:   MULAW:
!
ALNEG   LDD:    A,00085:
        XOR:    NS,B:
```

```
!       re-encode the expanded value to yield a local value of I.
!       the magnitude of this local value is returned from EXPQRN in
!       ACCB
!
MULAW   CALL:   EXPQRN;
!
!       ACCB now contains the locally encoded I value I_local.
!
        LDM:    A,IMASK;
        AND:    NS,B;
        LDM:    A,IRX:          Received value of I
!
        JPSB:   ILPOS:          If I_local is positive goto IPOS
!
        JPSA:   SPPLUS:         IRX > I_local --> output SP+
!
SPSEL   JLST:   SPMINUS:        IRX < I_local --> output SP-
        JGTT:   SPPLUS;         IRX > I_local --> output SP+
!
        LDM:    AC,SP:          IRX = I_local --> output SP
!
ALWCHK  JMLW:   MULW;           If A_law even_bit invert SP
        LDD:    B,00085;
        XOR:    NS,C;
MULW    NOP1:
        $STC:   SD;
        RETN:
!
ILPOS   JNGA:   SPMINUS:        IRX < I_local --> output SP-
        JUMP:   SPSEL;
!
SPPLUS  LDM:    AC,SP+;
        JUMP:   ALWCHK;
!
SPMINUS LDM:    AC,SP-;
        JUMP:   ALWCHK;
!
!*******************************************************************
!*
!*      NAME    : INVERSE ADAPTIVE QUANTIZER SUBROUTINE
!*
!*      FUNCTION: A quantized version DQ of the difference signal is
!*                produced by scaling of any I the normalized quantized
!*                difference signal DQLN.
!*
!*      INPUTS  : RAM Loc  4 - I value
!*                RAM Loc  5 - DQLN normalized quantizer difference signal
!*                             to log base 2
!*                RAM Loc 41 - Y quantizer scale factor
!*
!*      OUTPUTS : RAM Loc  2 - DQ quantized difference signal
!*
!*      CAVEATS :
!*
!*      NUMBER OF INSTRUCTIONS : 16
!*
!*      MAX EXECUTION TIME : 1600ns
!*
!*
!*******************************************************************
```

```
!
IAQUAN   LDM:    A,Y;                ADD THE Y SCALE OUTPUT TO THE DQLN VALUE
         LDM:    B,DQLN;             THE RESULT IS PASSED ALONG TO THE SERIAL
         ADD:    R2,CD;              PROCESSOR FOR THE ANTILOG OPERATION.
         $ALOG:
!
         LDM:    B,I;
         LDD:    A,32768;
         AND:    NS,A;
         MVC:    B;
!
         JPSR:   ANWAIT;             IF THE RESULT OF THE ADDITION IS NOT
!                                    POSITIVE, IGNORE THE RESULT OF THE
         LDD:    B,00000;            ANTILOG OPERATION.
         JUMP:   NEXT;
!
ANWAIT   NOP2;
         NOP1;
!
         MVE:    B;                  GET ANTILOG
         $ALOG:
!
NEXT     ORR:    NS,C;               ATTACH SIGN TO RESULT
         NOP1;
         $STC:   DQ;                 UPDATE DQ
!
         RETN;
!
```

```
!***********************************************************************
!*
!*      NAME       : RAM DIAGNOSTIC SUBROUTINE
!*
!*      FUNCTION   : The subroutine is called as part of the device
!*                   initialization procedure following a device reset.
!*
!*                   Each location of page 0 is written an alternating sequence
!*                   of ones and zeros with the corresponding value of the
!*                   of the address occupying the least significant bit
!*                   positions. While into page 1 is written the compliment
!*                   value of the above. Page 0 is checked by reading each
!*                   successive location and comparing the read value against
!*                   the alternating bit sequence and the value of the address.
!*                   Similarly, page 1 is checked by comparing the compliment
!*                   of the read sequence value against the alternating
!*                   bit sequence and the value of the address.
!*
!*                   The test procedure is repeated with page 0 receiving the
!*                   complimented sequence and page 1 the actual sequence.
!*
!*                   The value of the addressed location written with each
!*                   bit sequence serves as a discriminator for the location.
!*
!*                   Successful completion of the test result in the ROK, AOK,
!*                   and SOK flags being set, which in turn results in the
!*                   external active low device fail signal going high.
!*
!*      INPUTS     : none
!*
!*      OUTPUTS    : ROK, AOK, SOK flags
!*
!*      CAVEATS    :
!*
!*      NUMBER OF INSTRUCTIONS : 44
!*
!*      MAX EXECUTION TIME : not applicable
!*
!*
!***********************************************************************
!
RAMTST  CALL:   WAIT;
        LDD:    BC,21845;
        LDD:    A,21909;
        $PAG0:
        CALL:   RAMLD;
        LDD:    BC,43690;
        LDD:    A,43754;
        $PAG1:
        CALL:   RAMLD;
!
!       VERIFY DATA
!
        LDD:    B,21845;
        LDD:    C,21909;
        $PAG0:
        CALL:   VERIFY;
        LDD:    B,43690;
        LDD:    C,43754;
```

```
        $PAG1:
        CALL:   VERIFY;

WRITE TO RAM THE COMPLIMENT OF THE ABOVE

LDD:    BC,43690;
        LDD:    A,43754;
        $PAG0:
        CALL:   RAMLD;
        LDD:    BC,21845;
        LDD:    A,21909;
        $PAG1:
        CALL:   RAMLD;
!
!       VERIFY  DATA;
!
        LDD:    B,43690;
        LDD:    C,43754;
        $PAG0:
        CALL:   VERIFY;
        LDD:    B,21845;
        LDD:    C,21909;
        $PAG1:
        CALL:   VERIFY;
!
PASS    NOP1:
        $ROK:                           SET RAM O.K. BIT
        NOP1:
        $AOK:
        NOP1:
        $SOK:
        RETN:
!
RAMLD   MVB:    A;
        INC:    BC;
        $STCB:
        REQU:
        JUMP:   RAMLD;
!
VERIFY  MVB:    A;
        LDMB:   A;
        JFOUN:  RFAIL;                  RAM TEST FAILED
        INC:    B;
        MVC:    A;
        REQU:
        JUMP:   VERIFY;
!
!       3 microsec Wait
!
WAIT    LDD:    B,00004;                LOOP COUNT VALUE
WLP1    DEC:    B;
        JPEQ:   WLP1;
        RETN:
```

```
!****************************************************************
!*
!*      NAME    : INITIALIZED SUBROUTINE
!*
!*      FUNCTION : Initializes both pages of RAM to the reset values
!*                 prescribed by G.721. First page0 then page1.
!*
!*      NUMBER OF INSTRUCTIONS : 36
!*
!*      MAX EXECUTION TIME : not applicable
!*
!*
!****************************************************************
!
INIT    LDD:    AB,00000;           CLEAR A AND B AND SELECT RAM PAGE 0
        $PAG0:
        CALL:   ALGIDNT;
        LDM:    A,ANSI;             !RESET PORT 4 (ADPCM OUTPUT)
        LDD:    B,00000;            PORT 4 = 0x00 (ANSI)
        JNGA:   ANSI;
        MVB:    *;                  CLEAR PORT 4 (ENCODE ADPCM OUTPUT)
        $PT4:
        JUMP:   ONWARD;
ANSI    MVNB:   *;                  PORT 4 = 0xFF (G.721)
        $PT4:
ONWARD  JALW:   ALAWP;              PRESET PORT 3 (PCM OUTPUT)
        MVNB:   *;                  SET PORT 3=0xFF (Mu-LAW)
        $PT3:
        JUMP:   RAMSET;
ALAWP   LDD:    B,00213;            SET PORT 3=0x15 (A-LAW)
        MVB:    *;
        $PT3:
!
RAMSET  CALL:   RPASS;              RESET MEMORY PAGE 0
!
        NOP1;                       SELECT PAGE 1
        $PAG1:
!
        CALL:   RPASS;              RESET MEMORY PAGE 1
!
        RETN;
!
RPASS   LDD:    BC,00000;           C=RESET VALUE, B=MEM_PTR
        LDD:    A,00064;            TERMINATE VALUE
!
        CALL:   RRTLP;              SET MEMORY LOCATIONS TO RESET VALUE
!
        LDD:    A,00041;            NEW TERMINATE VALUE
        LDD:    BC,00080;           C=RESET VALUE, B=MEM_PTR
!
        CALL:   RRTLP;              SET MEMORY LOCATIONS TO RESET VALUE
!
        LDD:    C,00544;
        NOP1;
        $STC:   Y;
!
        LDD:    C,34816;
        NOP1;
        $STC:   YLL;
```

```
    LIO:    (,00000;
    NOP1:
    $STC:   TDP;
    NOP1:
    $STC:   TR;
    NOP1:
    $STC:   SIGPK;

RETN:
                                    OVERFLOW OCCURS
RSTLP MVB:   *;                     LOAD MEM_PTR
    INC:    B;                      MEM_PTR + 1
    $STCB:                          LOAD RAM (MEM_PTR)
    JEQUN:  RSTLP;                  IF MEM_PTR=/=TERMINATE VALUE DO AGAIN
    RETN:

ENDP

!************************************************************

DEFINITION OF RAM LOCATIONS (SAME FOR BOTH RAM PAGES)

!************************************************************

TEMP0=00; TEMP1=01; DQ=02; SEZ=03; I=04; DELM=05; ET=06; EI=07; PMS=08;
DML=09; AP=10; AL=11; YLM=12; SE=13; PK2=14; PK1=15; PK0=16; B6=17; B5=18;
B4=19; B3=20; B2=21; B1=22; A2=23; A1=24; SR=25; SP+=26; SP=27; SP-=28;
DQZEG=29; IRK=30; SD=31; D06=32; D05=33; D04=34; D03=35; D02=36; D01=37;
D00=38; SR1=39; SR0=40; Y=41; YLL=42; ANST=43; SIGFRM=44; GDC=45; AIDNT=46;
TR=47; TDP=48; SIGPK=49; IMASK=50; TE=51; FLG=52;

ENDS
```

I claim:

1. A digital signal processor, comprising:
   (a) a data bus;
   (b) a microinstruction sequencer means for controlling the functioning of the digital signal processor, including a coded ROM, means for addressing the ROM, means for decoding the ROM code into control and data signals, and means for sending the control and data signals to desired locations via said data bus;
   (c) arithmetic logic unit (ALU) means coupled to said data bus for performing arithmetic and logic functions under the control of said control signals;
   (d) an arithmetic processor section means coupled to said data bus for conducting under the control of said control signals arithmetically complex functions; and
   (e) a RAM means coupled to said data bus for receiving and storing data which is sent to the RAM means via said data bus under control of said control signals from at least one of said microinstruction sequencer, said ALU means, said arithmetic processor section means, and circuitry exterior to said digital signal processor, and for sending data via said data bus to at least one of said ALU means, said arithmetic processor section means, said microinstruction sequencer and said circuitry exterior to said digital signal processor under control of said control signals, wherein
   said data bus is written to and read by said arithmetic processor means, said ALU means, said microinstruction sequencer and said RAM means,
   said arithmetic processor section means and said ALU means function in parallel,
   said RAM means includes a RAM and a RAM data register coupled to said RAM for storing data output by said RAM and for storing data to be input into said RAM,
   said arithmetic-logic unit means includes an arithmetic-logic core and first and second ALU data registers coupled to said arithmetic-logic core for at least storing data which is to be processed by said ALU means, and
   said arithmetic processor section means includes a serial arithmetic processor and a serial arithmetic processor data register coupled to said serial arithmetic processor for storing data to be processed by said serial arithmetic processor.

2. A digital signal processor according to claim 1, wherein:
   said RAM means further includes a bidirectional buffer, a controller, and an internal bus which connects said RAM, said controller and said bidirectional buffer.

3. A digital signal processor according to claim 1, wherein:

said arithmetic processor section means is a serial arithmetic processor having converting means for converting an unsigned magnitude value received via said data bus into a logarithmic value, for converting a signed magnitude value received via said data bus into a floating point value, and for converting a logarithmic value received via said data bus into an unsigned value, and a multiplication means for multiplying two signed magnitude values received via said data bus, and for multiplying two floating point values received via said data bus to provide a product, wherein said converting means converts said product into a signed magnitude value.

4. A digital signal processor according to claim 1, wherein:

said arithmetic logic unit means further includes a comparator for comparing the values in said first and second ALU data registers and for sending the result of said comparison to said microinstruction sequencer means.

5. A digital signal processor according to claim 4, wherein:

said microinstruction sequencer means includes means for instructing said arithmetic logic unit means to conduct a conditional operation on data in at least one of said first and second ALU data registers.

6. A digital signal processor according to claim 5, wherein:

said means for instructing said ALU means to conduct a conditional operation uses the result of said comparison made by said comparator in determining the conditional operation said ALU is to conduct.

7. A digital signal processor according to claim 6, wherein:

said arithmetic processor section means is a serial arithmetic processor having converting means for converting an unsigned magnitude value received via said data bus into a logarithmic value, for converting a signed magnitude value received via said data bus into a floating point value, and for converting a logarithmic value received via said data bus into an unsigned value, and a multiplication means for multiplying two signed magnitude values received via said data bus, and for multiplying two floating point values received via said data bus to provide a product, wherein said converting means converts said product into a signed magnitude value.

8. A digital signal processor according to claim 7, where said digital signal processor receives data from input/output circuitry coupled to said digital signal processor, wherein:

said microinstruction sequencer is programmed with a plurality of microinstructions which control said digital signal processor and cause said data received by said digital signal processor from said input/output circuitry to be encoded and decoded according to an ADPCM algorithm, such that in encoding and decoding said data, said data is processed by said ALU means and said arithmetic processor section means.

* * * * *